US011534802B2

(12) United States Patent (10) Patent No.: US 11,534,802 B2
Chandler (45) Date of Patent: Dec. 27, 2022

(54) AUTOMATED METHOD AND SYSTEM FOR SORTING AND COMBINING VARYING DENSITY PAYLOADS

(71) Applicant: Steven Theodore Chandler, Seattle, WA (US)

(72) Inventor: Steven Theodore Chandler, Seattle, WA (US)

( * ) Notice: Subject to any disclaimer, the term of this patent is extended or adjusted under 35 U.S.C. 154(b) by 474 days.

(21) Appl. No.: 15/929,557

(22) Filed: May 9, 2020

(65) Prior Publication Data

US 2020/0353510 A1 Nov. 12, 2020

Related U.S. Application Data

(60) Provisional application No. 62/845,714, filed on May 9, 2019.

(51) Int. Cl.
*B07C 5/38* (2006.01)
*B07C 5/20* (2006.01)
*B25J 9/16* (2006.01)
*G01G 13/02* (2006.01)

(52) U.S. Cl.
CPC .............. *B07C 5/20* (2013.01); *B07C 5/38* (2013.01); *B25J 9/1602* (2013.01); *G01G 13/026* (2013.01); *B07C 2501/0063* (2013.01)

(58) Field of Classification Search
CPC .... B07C 5/20; B07C 5/38; B07C 5/36; B07C 2501/0063; G01G 19/32; G01G 19/387; B25J 9/1602
See application file for complete search history.

(56) References Cited

U.S. PATENT DOCUMENTS

| 5,889,235 | A | * | 3/1999 | Kawanishi | G01G 19/387 |
| | | | | | 177/52 |
| 6,374,984 | B1 | * | 4/2002 | Nagler | A22C 11/008 |
| | | | | | 198/395 |
| 6,881,907 | B2 | * | 4/2005 | Winkelmolen | G01G 15/00 |
| | | | | | 209/582 |
| 8,869,990 | B2 | * | 10/2014 | Skyum | A22C 17/0093 |
| | | | | | 177/245 |
| 9,228,884 | B2 | | 1/2016 | Kawanishi | |
| 10,036,664 | B2 | * | 7/2018 | Chandler | G01G 19/393 |
| 10,422,687 | B1 | * | 9/2019 | Olgeirsson | G01G 19/393 |
| 10,712,195 | B2 | * | 7/2020 | Skrædderdal | B26D 7/0625 |
| 2020/0354168 | A1 | * | 11/2020 | Yamamoto | G01G 19/393 |

\* cited by examiner

*Primary Examiner* — Patrick H MacKey

(74) *Attorney, Agent, or Firm* — Willie Jacques; Emanus, LLC

(57) ABSTRACT

An automated continuous or near-continuous system for sorting and combining varying density payloads comprises a buffer area including a work surface having a plurality of holes for storing a plurality of cups with weighed payloads, a shuttle, and scale system configured for weighing and near continuously or continuously delivering the plurality of cups with the payloads, to the buffer area, at least one robot provided within the buffer area, wherein the at least one robot is configured for picking a cup carrying a payload, from either one of the shuttle and scale system and the work surface, and transporting the payload from the cup into an accumulator. The at least one robot is configured for delivering one or more of the payloads into the accumulator to achieve a predetermined Target Weight Range (TWR).

29 Claims, 54 Drawing Sheets

| "INVENTORY" 21a | | | | "COMBINATION ASSEMBLY" 21b | | | | | | "ROBOT DRIVER LIST" 21c | | | | | |
|---|---|---|---|---|---|---|---|---|---|---|---|---|---|---|---|---|
| Inventory of Payloads | | | | Assembly of Sets | | | | | | Robot Instructions | | | | | | |
| Column | Row | Wt | Robot# | # | Column | Row | Wt | Robot# | Total Wt | | Robot | Inv Col | Inv Row | Total Wt | Funnel | Trap Door |
| O (shuttle) | 1 | 0.54 | 1 | | O (shuttle) | 1 | 0.54 | 1 | | | 1 | O (shuttle) | 1 | | A | Close |
| O (shuttle) | 2 | 0.66 | 1 | 1 | C | 16 | 0.46 | 1 | 1.00 | | 1 | C | 16 | 1.00 | A | Release |
| O (shuttle) | 3 | 0.97 | 1 | | O (shuttle) | 2 | 0.66 | 1 | | | 1 | O (shuttle) | 2 | | B | Close |
| P (shuttle) | 1 | 0.15 | 1 | 2 | A | 13 | 0.34 | 1 | 1.00 | | 1 | A | 13 | 1.00 | B | Release |
| P (shuttle) | 2 | 0.39 | 1 | | O (shuttle) | 3 | 0.97 | 1 | | | 1 | O (shuttle) | 3 | | A | Close |
| P (shuttle) | 3 | 0.26 | 1 | 3 | M | 16 | 0.04 | 2 | 1.01 | | 2 | M | 16 | 1.01 | A | Release |
| Q (shuttle) | 1 | 0.31 | 2 | | P (shuttle) | 1 | 0.15 | 1 | | | 1 | P (shuttle) | 1 | | A | Close |
| Q (shuttle) | 2 | 0.80 | 2 | 4 | E | 14 | 0.85 | 1 | 1.00 | | 1 | E | 14 | 1.00 | A | Release |
| Q (shuttle) | 3 | 0.87 | 2 | | P (shuttle) | 2 | 0.39 | 1 | | | 1 | P (shuttle) | 2 | | B | Close |
| R (shuttle) | 1 | 0.96 | 2 | 5 | B | 11 | 0.61 | 1 | 1.00 | | 1 | B | 11 | 1.00 | B | Release |
| R (shuttle) | 2 | 0.04 | 2 | | P (shuttle) | 3 | 0.26 | 1 | | | 1 | P (shuttle) | 3 | | A | Close |
| R (shuttle) | 3 | 0.04 | 2 | 6 | N | 15 | 0.74 | 2 | 1.00 | | 2 | N | 15 | 1.00 | A | Release |
| S (shuttle) | 1 | OUT | 1 | | Q (shuttle) | 1 | 0.31 | 2 | | | 2 | Q (shuttle) | 1 | | A | Close |
| S (shuttle) | 2 | OUT | 1 | 7 | C | 11 | 0.69 | 1 | 1.00 | | 1 | C | 11 | 1.00 | A | Release |
| S (shuttle) | 3 | OUT | 1 | | Q (shuttle) | 2 | 0.80 | 2 | | | 2 | Q (shuttle) | 2 | | B | Close |
| T (shuttle) | 1 | OUT | 1 | 8 | F | 10 | 0.20 | 1 | 1.00 | | 1 | F | 10 | 1.00 | B | Release |
| T (shuttle) | 2 | OUT | 1 | | Q (shuttle) | 3 | 0.87 | 2 | | | 2 | Q (shuttle) | 3 | | A | Close |
| T (shuttle) | 3 | OUT | 1 | 9 | A | 9 | 0.13 | 1 | 1.00 | | 1 | A | 9 | 1.00 | A | Release |
| U (shuttle) | 1 | OUT | 2 | | R (shuttle) | 1 | 0.96 | 2 | | | 2 | R (shuttle) | 1 | | A | Close |
| U (shuttle) | 2 | OUT | 2 | 10 | D | 10 | 0.05 | 1 | 1.01 | | 1 | D | 10 | 1.01 | A | Release |
| U (shuttle) | 3 | OUT | 2 | | R (shuttle) | 2 | 0.04 | 2 | | | 2 | R (shuttle) | 2 | | A | Close |
| V (shuttle) | 1 | OUT | 2 | 11 | H | 12 | 0.96 | 2 | 1.00 | | 2 | H | 12 | 1.00 | A | Release |
| V (shuttle) | 2 | OUT | 2 | | R (shuttle) | 3 | 0.04 | 2 | | | 2 | R (shuttle) | 3 | | B | Close |
| V (shuttle) | 3 | OUT | 2 | 13 | G | 1 | 0.97 | 1 | 1.01 | | 1 | G | 1 | 1.01 | B | Release |
| B | 3 | OPEN | 1 | 14 | J | 11 | 1.03 | 2 | 1.03 | | 2 | J | 11 | 1.03 | B | Release |
| M | 1 | OPEN | 2 | 15 | C | 5 | 1.03 | 1 | 1.03 | | 1 | C | 5 | 1.03 | A | Release |
| J | 11 | 1.03 | 2 | 16 | E | 4 | 1.02 | 1 | 1.02 | | 1 | E | 4 | 1.02 | A | Release |
| C | 5 | 1.03 | 1 | 17 | G | 16 | 1.02 | 1 | 1.02 | | 1 | G | 16 | 1.02 | A | Release |
| E | 4 | 1.02 | 1 | 18 | K | 10 | 1.02 | 2 | 1.02 | | 2 | K | 10 | 1.02 | B | Release |
| G | 16 | 1.02 | 1 | 19 | A | 7 | 1.02 | 1 | 1.02 | | 1 | A | 7 | 1.02 | A | Release |
| K | 10 | 1.02 | 2 | 20 | L | 6 | 1.02 | 2 | 1.02 | | 2 | L | 6 | 1.02 | B | Release |
| A | 7 | 1.02 | 1 | 21 | H | 9 | 1.01 | 2 | 1.01 | | 2 | H | 9 | 1.01 | B | Release |
| L | 6 | 1.02 | 2 | 22 | N | 4 | 1.01 | 2 | 1.01 | | 2 | N | 4 | 1.01 | B | Release |
| H | 9 | 1.01 | 2 | 23 | J | 14 | 1.01 | 2 | 1.01 | | 2 | J | 14 | 1.01 | B | Release |
| N | 4 | 1.01 | 2 | 24 | G | 9 | 1.01 | 1 | 1.01 | | 1 | G | 9 | 1.01 | A | Release |

FIG. 21

| | | | | | | | | | | | | | | |
|---|---|---|---|---|---|---|---|---|---|---|---|---|---|---|
| J | 14 | 1.01 | 2 | 12 | J | 5 | 1.00 | 2 | 1.00 | 2 | J | 5 | 1.00 | B | Release |
| G | 9 | 1.01 | 1 | 13 | M | 9 | 1.00 | 2 | 1.00 | 2 | M | 9 | 1.00 | B | Release |
| J | 5 | 1.00 | 2 | 14 | C | 9 | 1.00 | 1 | 1.00 | 1 | C | 9 | 1.00 | A | Release |
| M | 9 | 1.00 | 2 | 15 | E | 12 | 1.00 | 1 | 1.00 | 1 | E | 12 | 1.00 | A | Release |
| C | 9 | 1.00 | 1 | 16 | H | 3 | 0.99 | 2 | | 2 | H | 3 | | B | Close |
| E | 12 | 1.00 | 1 | 17 | D | 9 | 0.01 | 1 | 1.00 | 1 | D | 9 | 1.00 | A | Release |
| H | 3 | 0.99 | 2 | 18 | G | 15 | 0.99 | 1 | | 1 | G | 15 | | A | Close |
| G | 15 | 0.99 | 1 | | J | 6 | 0.02 | 2 | 1.01 | 2 | J | 6 | 1.01 | B | Release |
| K | 6 | 0.99 | 2 | 19 | K | 6 | 0.99 | 2 | | 2 | K | 6 | | B | Close |
| A (unusable) | 2 | 0.99 | 1 | | H | 4 | 0.02 | 2 | 1.01 | 2 | H | 4 | 1.01 | B | Release |
| J | 12 | 0.98 | 2 | 20 | J | 12 | 0.98 | 2 | | 2 | J | 12 | | B | Close |
| L | 14 | 0.98 | 2 | | L | 4 | 0.03 | 2 | 1.03 | 2 | L | 4 | 1.03 | B | Release |
| E | 3 | 0.97 | 1 | 21 | L | 14 | 0.97 | 2 | | 2 | L | 14 | | B | Close |
| M | 5 | 0.97 | 2 | | C | 14 | 0.05 | 1 | 1.03 | 1 | C | 14 | 1.03 | A | Release |
| K | 3 | 0.97 | 2 | 22 | E | 3 | 0.97 | 1 | | 1 | E | 3 | | A | Close |
| B (unusable) | 14 | 0.97 | 1 | | G | 12 | 0.06 | 1 | 1.03 | 1 | G | 12 | 1.03 | A | Release |
| M (unusable) | 15 | 0.97 | 2 | 23 | M | 5 | 0.97 | 2 | | 2 | M | 5 | | B | Close |
| D (unusable) | 7 | 0.97 | 1 | | G | 11 | 0.06 | 1 | 1.03 | 1 | G | 11 | 1.03 | A | Release |
| G | 1 | 0.97 | 1 | 24 | I | 7 | 0.94 | 2 | | 2 | I | 7 | | B | Close |
| H | 12 | 0.96 | 2 | | K | 12 | 0.09 | 2 | 1.03 | 2 | K | 12 | 1.03 | B | Release |
| J | 1 | 0.95 | 2 | 25 | A | 12 | 0.93 | 1 | | 1 | A | 12 | | A | Close |
| J | 4 | 0.95 | 2 | | M | 13 | 0.10 | 2 | 1.03 | 2 | M | 13 | 1.03 | B | Release |
| I | 7 | 0.94 | 2 | 26 | F | 9 | 0.92 | 1 | | 1 | F | 9 | | A | Close |
| A | 12 | 0.93 | 1 | | N | 1 | 0.11 | 2 | 1.03 | 2 | N | 1 | 1.03 | B | Release |
| F | 9 | 0.92 | 1 | 27 | N | 16 | 0.92 | 2 | | 2 | N | 16 | | B | Close |
| N | 16 | 0.92 | 2 | | N | 10 | 0.11 | 2 | 1.03 | 2 | N | 10 | 1.03 | B | Release |
| F | 3 | 0.91 | 1 | 28 | F | 3 | 0.91 | 1 | | 1 | F | 3 | | A | Close |
| J | 2 | 0.91 | 2 | | B | 12 | 0.11 | 1 | 1.02 | 1 | B | 12 | 1.02 | A | Release |
| E | 2 | 0.91 | 1 | 29 | J | 2 | 0.91 | 2 | | 2 | J | 2 | | B | Close |
| I | 2 | 0.91 | 2 | | E | 11 | 0.11 | 1 | 1.02 | 1 | E | 11 | 1.02 | A | Release |
| B | 15 | 0.90 | 1 | 30 | E | 2 | 0.91 | 1 | | 1 | E | 2 | | A | Close |
| A | 3 | 0.90 | 1 | | F | 7 | 0.11 | 1 | 1.02 | 1 | F | 7 | 1.02 | A | Release |
| N | 12 | 0.89 | 2 | 31 | I | 2 | 0.91 | 2 | | 2 | I | 2 | | B | Close |
| B | 7 | 0.88 | 1 | | B | 8 | 0.12 | 1 | 1.03 | 1 | B | 8 | 1.03 | A | Release |
| M | 8 | 0.88 | 2 | 32 | B | 15 | 0.90 | 1 | | 1 | B | 15 | | A | Close |
| K | 7 | 0.87 | 2 | | F | 5 | 0.12 | 1 | 1.02 | 1 | F | 5 | 1.02 | A | Release |

FIG. 21 CONTD

| | | | | | | | | | | | | | |
|---|---|---|---|---|---|---|---|---|---|---|---|---|---|
| K (unusable) | 16 | 0.87 | 2 | 33 | A | 3 | 0.90 | 1 | | 1 | A | 3 | | A | Close |
| A | 11 | 0.87 | 1 | | A | 9 | 0.13 | 1 | 1.03 | 1 | A | 9 | 1.03 | A | Release |
| K (unusable) | 2 | 0.86 | 2 | 34 | N | 12 | 0.89 | 2 | | 2 | N | 12 | | B | Close |
| D | 13 | 0.86 | 1 | | I | 9 | 0.12 | 2 | 1.01 | 2 | I | 9 | 1.01 | B | Release |
| J | 13 | 0.85 | 1 | 35 | B | 7 | 0.88 | 1 | | 1 | B | 7 | | A | Close |
| H | 14 | 0.85 | 2 | | C | 4 | 0.13 | 1 | 1.01 | 1 | C | 4 | 1.01 | A | Release |
| E | 14 | 0.85 | 1 | 36 | M | 8 | 0.86 | 2 | | 2 | M | 8 | | B | Close |
| E | 6 | 0.84 | 1 | | D | 4 | 0.13 | 1 | 1.01 | 1 | D | 4 | 1.01 | A | Release |
| N | 6 | 0.84 | 2 | 37 | K | 7 | 0.87 | 2 | | 2 | K | 7 | | B | Close |
| F (unusable) | 16 | 0.84 | 1 | | N | 9 | 0.14 | 2 | 1.01 | 2 | N | 9 | 1.01 | B | Release |
| E (unusable) | 5 | 0.84 | 2 | 38 | D | 13 | 0.86 | 1 | | 1 | D | 13 | | A | Close |
| I | 1 | 0.83 | 2 | | M | 6 | 0.16 | 1 | 1.02 | 1 | M | 6 | 1.02 | A | Release |
| C | 6 | 0.83 | 1 | 39 | F | 13 | 0.85 | 1 | | 1 | F | 13 | | A | Close |
| L (unusable) | 7 | 0.83 | 2 | | I | 15 | 0.17 | 2 | 1.02 | 2 | I | 15 | 1.02 | B | Release |
| M | 3 | 0.82 | 2 | 40 | H | 14 | 0.85 | 2 | | 2 | H | 14 | | B | Close |
| E | 13 | 0.81 | 1 | | D | 5 | 0.17 | 1 | 1.02 | 1 | D | 5 | 1.02 | A | Release |
| | | | | 41 | E | 14 | 0.85 | 1 | | 1 | E | 14 | | A | Close |
| K | 13 | 0.79 | 2 | | A | 1 | 0.18 | 1 | 1.03 | 1 | A | 1 | 1.03 | A | Release |
| J (unusable) | 7 | 0.79 | 2 | 42 | E | 6 | 0.84 | 1 | | 1 | E | 6 | | A | Close |
| N | 14 | 0.79 | 2 | | B | 16 | 0.19 | 1 | 1.03 | 1 | B | 16 | 1.03 | A | Release |
| B | 9 | 0.79 | 1 | 43 | I | 1 | 0.82 | 2 | | 2 | I | 1 | | B | Close |
| F (unusable) | 14 | 0.78 | 1 | | F | 10 | 0.20 | 1 | 1.03 | 1 | F | 10 | 1.03 | A | Release |
| B | 13 | 0.78 | 1 | 44 | C | 6 | 0.83 | 1 | | 1 | C | 6 | | A | Close |
| G | 6 | 0.77 | 1 | | B | 10 | 0.20 | 1 | 1.04 | 1 | B | 10 | 1.04 | A | Release |
| D (unusable) | 15 | 0.77 | 1 | 45 | M | 3 | 0.82 | 2 | | 2 | M | 3 | | B | Close |
| C (unusable) | 7 | 0.77 | 1 | | L | 16 | 0.21 | 2 | 1.03 | 2 | L | 16 | 1.03 | B | Release |
| B (unusable) | 1 | 0.77 | 1 | 46 | E | 13 | 0.81 | 1 | | 1 | E | 13 | | A | Close |
| K | 11 | 0.76 | 2 | | M | 12 | 0.21 | 2 | 1.03 | 2 | M | 12 | 1.03 | B | Release |
| L | 9 | 0.76 | 2 | 47 | M | 3 | 0.82 | 2 | | 2 | M | 3 | | B | Close |
| E | 15 | 0.76 | 1 | | G | 14 | 0.21 | 1 | 1.03 | 1 | G | 14 | 1.03 | A | Release |
| H | 13 | 0.76 | 2 | 48 | K | 13 | 0.79 | 2 | | 2 | K | 13 | | B | Close |
| N | 15 | 0.74 | 2 | | D | 6 | 0.22 | 1 | 1.01 | 1 | D | 6 | 1.01 | A | Release |
| C | 12 | 0.73 | 1 | 49 | M | 14 | 0.79 | 2 | | 2 | M | 14 | | B | Close |
| G | 4 | 0.73 | 1 | | G | 14 | 0.22 | 1 | 1.01 | 1 | G | 14 | 1.01 | A | Release |
| F | 11 | 0.73 | 1 | 50 | B | 9 | 0.79 | 1 | | 1 | B | 9 | | A | Close |

FIG. 21 CONTD

| | | | | | | | | | | | | | | | |
|---|---|---|---|---|---|---|---|---|---|---|---|---|---|---|---|
| E | 10 | 0.73 | 1 | | D | 6 | 0.22 | 1 | 1.01 | 1 | D | 6 | 1.01 | A | Release |
| J | 13 | 0.73 | 2 | 51 | B | 13 | 0.78 | 1 | | 1 | B | 13 | | A | Close |
| N | 11 | 0.72 | 2 | | D | 1 | 0.25 | 1 | 1.03 | 1 | D | 1 | 1.03 | A | Release |
| A | 4 | 0.72 | 1 | 52 | G | 6 | 0.77 | 1 | | 1 | G | 6 | | A | Close |
| N | 2 | 0.72 | 2 | | K | 5 | 0.25 | 2 | 1.03 | 2 | K | 5 | 1.03 | B | Release |
| K | 1 | 0.70 | 2 | 53 | K | 11 | 0.76 | 2 | | 2 | K | 11 | | B | Close |
| C | 3 | 0.70 | 1 | | N | 7 | 0.27 | 2 | 1.03 | 2 | N | 7 | 1.03 | B | Release |
| E | 16 | 0.70 | 1 | 54 | L | 9 | 0.76 | 2 | | 2 | L | 9 | | B | Close |
| E | 8 | 0.70 | 1 | | E | 7 | 0.28 | 1 | 1.03 | 1 | E | 7 | 1.03 | A | Release |
| L | 11 | 0.70 | 2 | 55 | E | 15 | 0.76 | 1 | | 1 | E | 15 | | A | Close |
| I (unusable) | 3 | 0.69 | 2 | | ff | 11 | 0.28 | 2 | 1.03 | 2 | ff | 11 | 1.03 | B | Release |
| C | 11 | 0.69 | 1 | 56 | H | 13 | 0.76 | 2 | | 2 | H | 13 | | B | Close |
| A | 6 | 0.68 | 1 | | D | 12 | 0.28 | 1 | 1.03 | 1 | D | 12 | 1.03 | A | Release |
| I | 4 | 0.68 | 2 | 57 | C | 12 | 0.73 | 1 | | 1 | C | 12 | | A | Close |
| G | 7 | 0.68 | 1 | | K | 4 | 0.29 | 2 | 1.02 | 2 | K | 4 | 1.02 | B | Release |
| D | 8 | 0.68 | 1 | 58 | G | 4 | 0.73 | 1 | | 1 | G | 4 | | A | Close |
| F | 8 | 0.67 | 1 | | C | 1 | 0.29 | 1 | 1.02 | 1 | C | 1 | 1.02 | A | Release |
| H | 1 | 0.67 | 2 | 59 | F | 11 | 0.73 | 1 | | 1 | F | 11 | | A | Close |
| A | 15 | 0.66 | 1 | | B | 4 | 0.29 | 1 | 1.02 | 1 | B | 4 | 1.02 | A | Release |
| A | 8 | 0.65 | 1 | 60 | E | 10 | 0.73 | 1 | | 1 | E | 10 | | A | Close |
| M | 11 | 0.65 | 2 | | J | 3 | 0.30 | 2 | 1.02 | 2 | J | 3 | 1.02 | B | Release |
| H | 10 | 0.64 | 2 | 61 | N | 11 | 0.72 | 2 | | 2 | N | 11 | | B | Close |
| M | 2 | 0.64 | 2 | | L | 15 | 0.30 | 2 | 1.03 | 2 | L | 15 | 1.03 | B | Release |
| G | 10 | 0.63 | 1 | 62 | N | 11 | 0.72 | 2 | | 2 | N | 11 | | B | Close |
| L | 3 | 0.63 | 2 | | J | 10 | 0.31 | 2 | 1.03 | 2 | J | 10 | 1.03 | B | Release |
| I | 16 | 0.62 | 2 | 63 | A | 4 | 0.72 | 1 | | 1 | A | 4 | | A | Close |
| F | 13 | 0.61 | 1 | | C | 8 | 0.31 | 1 | 1.03 | 1 | C | 8 | 1.03 | A | Release |
| I | 6 | 0.61 | 2 | 64 | N | 2 | 0.72 | 2 | | 2 | N | 2 | | B | Close |
| J | 8 | 0.61 | 2 | | E | 5 | 0.31 | 1 | 1.03 | 1 | E | 5 | 1.03 | A | Release |
| B | 11 | 0.61 | 1 | 65 | K | 1 | 0.70 | 2 | | 2 | K | 1 | | B | Close |
| I | 14 | 0.60 | 2 | | L | 10 | 0.31 | 2 | 1.02 | 2 | L | 10 | 1.02 | B | Release |
| I | 5 | 0.60 | 2 | 66 | C | 3 | 0.70 | 1 | | 1 | C | 3 | | A | Close |
| F | 4 | 0.60 | 1 | | E | 9 | 0.33 | 1 | 1.03 | 1 | E | 9 | 1.03 | A | Release |
| C | 2 | 0.59 | 1 | 67 | E | 16 | 0.70 | 1 | | 1 | E | 16 | | A | Close |
| A | 16 | 0.59 | 1 | | F | 2 | 0.33 | 1 | 1.03 | 1 | F | 2 | 1.03 | A | Release |

FIG. 21 CONTD

SHUTTLE CUP TRANSFER PRIORITIZATION

AUTOMATED METHOD AND SYSTEM FOR SORTING AND COMBINING VARYING DENSITY PAYLOADS

CROSS-REFERENCE TO RELATED APPLICATIONS

This application claims the benefit of and is a non-provisional of a U.S. Provisional Application Ser. No. 62/845,714 filed on May 9, 2019, which is hereby expressly incorporated by reference in its entirety for all purposes.

TECHNICAL FIELD

The disclosure relates generally to a system and method for weighing a plurality of payloads having different weights and/or densities and determining a combination of the payloads for subsequent processing of the combination of payloads.

BACKGROUND ART

In the world of packaging agricultural products, there are many types of weighing, sorting, and combining designs. Unfortunately, the designs do not address the requirements of certain types of products. For example, *cannabis*, for which the industry and consumer requirements are unique compared to most other products. Plus, the product characteristics of *cannabis* pose unique processing challenges.

The industry requirements for *cannabis* processing include variance requirements surrounding package weight targets, underweight and overweight levels. Processors and retailers both require packages to be at or above the printed weight. So, the fill weight distribution does not utilize the printed weight as a mean, but rather a lower control limit, which then causes higher overfill than other consumer packaged goods. Further, the high cost of raw material drives significant process costs. The industry is also concerned with quality, which means that whole pieces are expected and small particulates are considered scrap or of perceived low value. Quality also resides in the retention of Tetra-Hydro-Cannabinol (THC) and Cannabidiol (CBD) crystals on pieces of *cannabis*, which can be lost if there is friction, compression or high impacts during the processing activities, such as drop points.

The accuracy of weighing is a critical component of a system for this specific industry due to the high value of the raw material and the end product, and implemented regulations. Most of the current technology utilizes multi-head units (i.e. containing 8-32 buckets) to achieve combinations of the pieces to achieve a package weight. Unfortunately sticking and clumping of the pieces creates issues in achieving tight weight tolerances, which in turn causes the recycling of the raw material through the system, thus resulting in product quality degradation and wastage.

The raw material in itself poses unique and challenging characteristics. It varies significantly in density, size, and shape. *Cannabis* has THC and CBD crystals throughout the material which has a consistency similar to crystalized molasses, i.e., being sticky and accumulating. So to achieve whole piece weight combinations at high accuracy and within target weight range, the current equipment is not adequate to successfully deliver continuous combinations that meet the industry, retail, regulatory, and process requirements.

Labor efficiency is also a factor. Most machines require multiple people to run the machines. Providing solutions that minimize labor is fundamental to achieving high productivities in industrial processes. Some existing methods and apparatuses for weighing and sorting such products are; manual substitution, automated multi-head weighing, and a sort and combine method.

The manual method uses substitution and guessing to meet the intended final weight target. A person uses a manual scale, visual inspection, or guesses weight of a piece and places it on the scale, and then the person picks another piece and places on the scale, if final weight fits within target weight range then the process is complete. If weight is exceeded, the person removes a piece and substitutes with another piece of smaller size and continues this process until the weight target is achieved. If weight is too low, the person adds more pieces, back and forth piece substitution on scale continues until the target range is achieved. Thus the manual method of substitution is time-consuming and lends itself to drop off in accuracy as human beings are susceptible to losses in focus and energy after extended periods of labor. As a cascading consequence, inefficiency and inaccuracy cost time and money for the operation.

Automated multi-head weighing: Utilizes a vibratory plate to distribute pieces into several buckets and contents of the buckets are then weighed. The system uses weight data from each bucket to determine the combination of discrete bucket content weights which would enable the target weight range to be achieved. When determined, the appropriate buckets open and drop contents to complete a set at weight for packaging or further processing.

Multi-port system: The system utilizes, typically sixteen holes, each with a light to indicate which port or receiver to manually drop a whole piece in and when. The system then weighs each piece and identifies another piece from the other fifteen remaining holes considered as inventory, to pair with the first weighed piece to make a combination. The multi-port system is again labor-intensive and inherently is incapable of making combinations of tight tolerance at high volume or throughput. Quality is also an issue, as transport systems utilized typically in the multi-port system can cause high impacts on the pieces, thus causing some of the high-value product to be damaged.

In the U.S. Pat. No. 10,036,664 B2 Steven T. Chandler et. al discloses a method and apparatus for sorting and combining fragile and varying density payloads. The method and the apparatus utilize one robot, wherein the method involves a batch process with manual removal of each cup set and manual resetting of the system to begin a new cycle. Combinations are exhausted after a percentage of payloads are utilized and no combination of remaining payloads can achieve target weight range. Further, the system also uses trays to carry cups. The process involves manual removal of cups with the payloads which did not achieve target weight range accuracy. The single robot batch system utilizes trays to introduce cups with the payloads. The method utilizes a batching approach which limits the number of combinations and accuracy. The trays also create additional manual steps and an increased potential for system error. The number of possible combinations is limited.

In another U.S. Pat. No. 9,228,884 B2 Shozo Kawanishi discloses a weighing system that comprises a platform scale on which a container containing objects are placed. The platform scale is a part of a hand-operated combination weigher including a plurality of weighing trays on which the objects are put. A controller of the weighing system derives a target weight of the objects in the combination weigher using a weight of the container which is weighed by the platform scale and the controller selects a combination of the weighing trays so that combined weight of the objects on the weighing trays falls within an allowable range of the target weight. But the suggested solution involves hand-operated weighers that are comparatively more prone to errors due to human involvement.

Hence there are challenges with current solutions including that they are labor-intensive and relatively more prone to errors due to human involvement, thereby causing overheads and wastage due to poor process accuracy. Automated systems that currently exist are reapplications of existing technology generally used for pieces that are uniform in size, shape, and weight, plus not generally fragile or prone to clumping. Accuracy at a sub-gram level is difficult to achieve and inconsistent which leads to high levels of recycling.

Other problems besides these may also exist, the above is not exhaustive but exemplary of the problems with current methodologies.

SUMMARY OF THE DISCLOSURE

The present disclosure relates to a method and system for near continuously or continuously sorting and combining the varying weight payloads and supplying them to a packaging area. The system comprises of a shuttle system for transporting empty and refilled cups; the system provides a continuous supply of individually weighed piece(s) into the buffer area while maintaining a constant number of cups in supply. The system has at least one robot that conveys cups between a cup buffer inventory area and shuttles, each cup payload has a predetermined destination for the purpose of being deposited into a package or inventoried to be combined with another payload and then deposited in a package.

The mathematical algorithm is used to identify the payload/piece combinations to achieve a predetermined target weight or target weight range and also make sure not to exceed the upper control limit. The dynamic system provides updated weight data from each new set of shuttle cup payloads, which the algorithm then recalculates to determine a newly updated set of combination assemblies. The algorithm utilizes the statistically significant cup buffer inventory size and shuttle cup set to achieve the whole payload/piece combination to achieve sub-gram target weight accuracy. This approach also provides the opportunity to combine "whole" piece weights without the addition of fractional weight particulates or "makeup" weights.

According to a first aspect of the present disclosure, there is provided an automated continuous or near-continuous system for sorting and combining varying density payloads, the system comprising a buffer area including a work surface having a plurality of holes for storing a plurality of cups with weighed payloads, a shuttle and scale system configured for weighing and near continuously or continuously delivering the plurality of cups with the payloads, to the buffer area, at least one robot provided within the buffer area, wherein the at least one robot is configured for picking a cup carrying a payload, from either one of the shuttle and scale system and the work surface, and transporting the payload from the cup into an accumulator, and a controller connected with a computer memory maintaining a combining algorithm, wherein the controller is configured for controlling operations of the shuttle and scale system and the at least one robot, in correlation with data stored in the combining algorithm. The at least one robot is configured for delivering one or more of the payloads into the accumulator to achieve a predetermined Target Weight Range (TWR).

In one embodiment of the invention, a ratio of a number of locations for inventorying the plurality of cups in the buffer area to a number of weighing locations in one or more scales of the shuttle and scale system, is greater than 1:1.

In one embodiment of the invention, the plurality of holes of the work surface, have diameters smaller than largest diameters of the plurality of cups to enable the plurality of cups to be suspended through the plurality of holes, In one embodiment of the invention, the shuttle and scale system includes a plurality of scales and a plurality of shuttles, each one of the plurality of scales provided with an automated weighing mechanism configured for weighing of the payload, and the plurality of shuttles being configured for transporting the plurality of cups in and out of the buffer area.

In one embodiment of the invention, the automated weighing mechanism includes a scale platform and a scale sensor mounted on a scale base, the scale platform being configured for elevating the cup from a corresponding shuttle, thereby separating the cup from the shuttle and thus allowing unhindered weighing of the payload by the scale sensor.

In one embodiment of the invention, the scale platform is connected with the scale sensor through a fixed height stem, the scale sensor being mounted over a scale base common to a plurality of scale platforms.

In one embodiment of the invention, the scale platform is connected with the scale sensor through an extendible stem adapted to extend independent of the scale sensor, to elevate the scale platform independent of other scale platforms.

In one embodiment of the invention, the scale platform is connected with the scale sensor through a fixed height stem, the scale sensor being mounted over a dedicated elevating device capable of elevating the scale platform independent of other scale platforms.

In one embodiment of the invention, a plurality of scale sensors of a scale is connected in one or more of a series configuration, a parallel configuration, and a series-parallel configuration.

In one embodiment of the invention, the scale base has been located on a foundation configured to isolate the scale base and the scale sensor from electrical and mechanical noise generated by a plurality of sources.

In one embodiment of the invention, the shuttle and scale system includes one or more continuous tracks designed to move the plurality of shuttles to directly mechanically engage with the respective plurality of scales.

In one embodiment of the invention, the shuttle and scale system includes one or more tracks designed to move the plurality of shuttles, horizontally, to be positioned over the plurality of respective scales and then be vertically lowered by a plurality of vertical tracks to mechanically engage with the respective plurality of scales.

In one embodiment of the invention, the at least one robot is further configured for returning an empty cup to one or more of the work surface and the shuttle and scale system, after transporting the payload into the accumulator, before picking another cup, carrying another payload, from either one of the shuttle and scale system and the work surface.

In one embodiment of the invention, the buffer area includes a plurality of robots with designated independent segments of the buffer area, wherein the plurality of robots are configured to operate within their respective designated segments, without overlap.

In one embodiment of the invention, the buffer area includes a plurality of robots configured to operate within an integrated space of the buffer area, with overlap.

In one embodiment of the invention, the at least one robot includes a gripper with an internal gas channel configured to deliver gas into the plurality of cups, through a delivery assist nozzle, to assist ejection of the plurality of respective payloads from the plurality of cups.

In one embodiment of the invention, the accumulator is configured to receive the one or more of the payloads through a receiver, the receiver being gas-assisted for flushing of the receiver and emptying of the accumulator once the predetermined TWR has been achieved.

In one embodiment of the invention, the accumulator includes a check scale configured to measure the weight of the payload delivered into the accumulator.

In one embodiment of the invention, the controller is further configured for updating the data in the combining algorithm with an introduction of a new payload.

In one embodiment of the invention, the combining algorithm includes an inventory, a combination assembly and a Robot Driver List (RDL), the RDL including an RDL library corresponding to all coordinate system activity command translations, the RDL library being capable of translating requirement of the combination assembly into a list of instructions for execution by a plurality of robots of distinct design characteristics.

In one embodiment of the invention, the controller is further configured for executing instructions in correlation with the RDL, stored in the combining algorithm, creating a plurality of auxiliary executions.

In one embodiment of the invention, the RDL includes machine-readable instructions for the controller and a plurality of auxiliary executions while optimization is paused.

In one embodiment of the invention, the controller is adapted to actuate the at least one robot and the shuttle and scale system on receiving a cup with a payload into either of the work surface and the shuttle and scale system.

In one embodiment of the invention, the controller is further configured to generate combinations of the one or more payloads, to be delivered into the accumulator, by designs stored in the combining algorithm of non-sequentially queued systems or non-mechanically limited systems.

In one embodiment of the invention, the controller is further configured for operating the at least one robot and the scale and shuttle system, in correlation with shuttle sequencing and timing data stored in the combining algorithm.

In one embodiment of the invention, an End of Arm Tooling (EOAT) of the at least one robot, includes a 3-point contact design including two parallel bars configured to apply distributed pressure on an exterior wall of a cup, and a pin configured to apply distributed pressure on an interior wall relative to exterior parallel bars.

In one embodiment of the invention, the automated system further comprises a Human Machine Interface (HMI) connected with the controller, the HMI configured for receiving input from an operator, and providing an output to the operator.

In one embodiment of the invention, the buffer area comprises one or more of a conveyor and a turntable carrying the plurality of cups.

According to a second aspect of the invention, there is provided a method for sorting and combining varying density payloads, the method comprising steps of weighing each one of a plurality of payloads, provided in a plurality of respective cups, by a plurality of automated weighing mechanisms of a plurality of scales, transporting the plurality of weighed payloads to a buffer area by a plurality of shuttles, the buffer area including a work surface having a plurality of holes for storing the plurality of cups with payloads, picking one or more cups having one or more respective payloads, from either one of the plurality of shuttles and the work surface, by at least one robot, wherein the one or more payloads are selected in correlation with a predetermined Target Weight Range (TWR) provided in a combining algorithm, delivering the one or more payloads into an accumulator, by the at least one robot; and transporting the accumulated one or more payloads for packing.

In one embodiment of the invention, the step of weighing each one of the plurality of payloads includes a taring step involving weighing of the plurality of respective cups when empty.

In one embodiment of the invention, the step of weighing the each one of the plurality of payloads includes weighing of the plurality of cups of known weight, the net weight of each one of the plurality of payloads being determined by subtracting the known weight of a cup from cumulative weight of the cup and a respective payload.

Further, the present disclosure has several features over the existing prior art, here are some of the features:

The present disclosure utilizes a plurality of holes on a work surface for storing cups;

The system is having scale(s) with an automated weighing mechanism, the scale(s) with traversing shuttle that moves cup(s) in and out of buffer area;

The system provides continuous operation enabled by uninterrupted payload supply, cup transferring, and statistically, significant inventory buffer to ensure the combination assembly possibility;

The system provides a continuous output through one cup in and one cup out principle, enabled by the method of robot returning the empty cup to shuttle before picking up another full cup;

The system provides high accuracy due to continuous piece replenishment and statistically significant buffer inventory size and further, due to the dynamic algorithm the system gets updated regularly when each new payload is introduced to the system;

Elimination or reduction in recycling due to the continuous introduction of payloads with random weight;

The system is capable of beginning production/throughput immediately upon arrival of the first cup payload into the system;

Method of near continuously or continuously combining payloads with sub-gram accuracy.

The system reduces multiple handling operations by taking payloads directly from scale shuttles to receiver tubes;

The system doesn't require manual clearing of cups on the work surface due to continuous utilization and recycling of cups in the system;

Scale shuttle(s) provide a continuous and/or near-continuous infeed system, enabled by the simultaneous switching of an inbound shuttle cups with payloads and outbound shuttle with empty cups;

The system has automated scale(s) engagement with the cup(s) that is enabled by the cup and shuttle design and configuration in a way that when force is applied to the bottom of the cup it raises out of shuttle thereby separating cup from a shuttle and thus allowing unhindered weighing;

Further, the automated scale engaged with the cup(s), enabled by the simultaneous and/or near-simultaneous elevation of scale sensor(s) or lowering of shuttle cups onto scale sensors. Previous art utilizes manual loading of the tray with cups onto stationary scales, in the present disclosure, the scales elevate to engage cups without manual assistance or the shuttle mechanically sets cups onto scale sensors;

The scales with the individually elevating mechanism, enabled by each scale sensor platform designed to raise independent of other scale sensors in the system;

The scale electronics speed and accuracy increased through parallel processing of analog data versus serial process which utilizes round-robin sampling methodology;

Algorithm updates/recalculates optimal combination before payload(s) are introduced, enabled by the robot driver list (RDL) creating a plurality of auxiliary executions;

The ratio of scales to buffer inventoried payloads exceeds 1:1, enabled by the decoupling of scales from buffer inventory. Further, a ratio, greater than 1:1, of scale sensors to buffer inventoried weighed payloads is enabled by a transport system that can fully access a statistically significant sized buffer inventory enabling combinations of pieces achieving continuous output at the sub-gram threshold;

Combination target weight is achieved with sub-gram accuracy without a scrap of makeup material added, enabled by statistically significant inventory size and/or scale sensor accuracy;

The system provides unhindered and unobstructed access to a statistically significant cup buffer inventory in a small footprint and/or low height, enabled by robot transport with full-motion, access, and a path to pick, place and combine payloads;

Combinations of payloads can be achieved by utilizing any cups inventoried on shuttle or the work surface, enabled by the design of a non-sequentially queued system or non-mechanically limited system;

Work lighting is positioned overhead and in such a way as to significantly reduce shadowing and operator eye fatigue;

Shuttles can traverse in and out of robot work area without interrupting robot activity, enabled by programming light curtain to ignore cup pattern or silhouette intrusion at certain times;

Shuttles simulate or provide a continuous and/or near-continuous infeed of payloads required by the robot transport to maintain continuous and/or near-continuous output. Continuous and/or near-continuous infeed of payloads is enabled by shuttle sequencing and timing which prevents any incoming payload gaps;

Robot end of arm tooling (EOAT) provides a stable, repeatable and limited motion method for securing, transporting and turning over a cup, enabled by a 3-point or more contact design; including two parallel bars configured to apply distributed pressure on an exterior wall of a cup, and a pin configured to apply distributed pressure on an interior wall relative to exterior parallel bars;

The system comprises a Robot Driver List (RDL) which provides a method of separating optimization program and robotic program, enabled by programming optimization to create and update the RDL, which is then handed off or accessed by a robot system. The RDL contains the execution instructions for robots and provides a plurality of auxiliary executions while optimization is paused;

The system may utilize an inventory flex system designed to enable robots to switch between 3 system phases; phase one utilizes robots to access any cup inventory sections, phase two restricts robot access to its work surface inventory section which creates discrete systems, and phase three is intermittent access of robots to another section of the work surface inventory only when inventory lacks necessary payload to make a combination;

Cup emptying design that utilizes air-sweep during payload dumping function to ensure wedged or stuck payloads receive the necessary assistance to release from the cup and leave the cup, enabled by air channel fabricated at the end of arm tool inside the finger. The finger has an air supply that directs air to a nozzle which is oriented in such a manner to cause air to sweep side and bottom of the cup. Also, the cup dump mechanism enables an alternate method for dumping payloads into receivers;

The sort and combine system provides one-touch payload conveyance and transfer. Once the payload is in the cup, it remains until dumped in the receiver and no conveyor, pneumatics, etc. are used to prevent multiple high impacts, drop points and friction during transfer to avoid product degradation and THC or CBD (tetrahydrocannabinol or cannabidiol) crystalline lose;

Combination assembly weight tolerance range can be sub-gram, due to statistically significant sample inventory size which provides a high probability of achieving target weight range;

Control of individual pieces entering in the system to enable whole piece combining versus scrap or unwanted low-quality entering system; and The system uses a foundation that is designed for maintaining low noise weighing apparatus.

BRIEF DESCRIPTION OF ACCOMPANYING DRAWINGS

So that the manner in which the above-recited features of the present disclosure can be understood in detail, a more particular description of the disclosure, briefly summarized above, may have been referred by embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

These and other features, benefits, and advantages of the present disclosure will become apparent by reference to the following text figure, with like reference numbers referring to like structures across the views, wherein.

Figure 1:
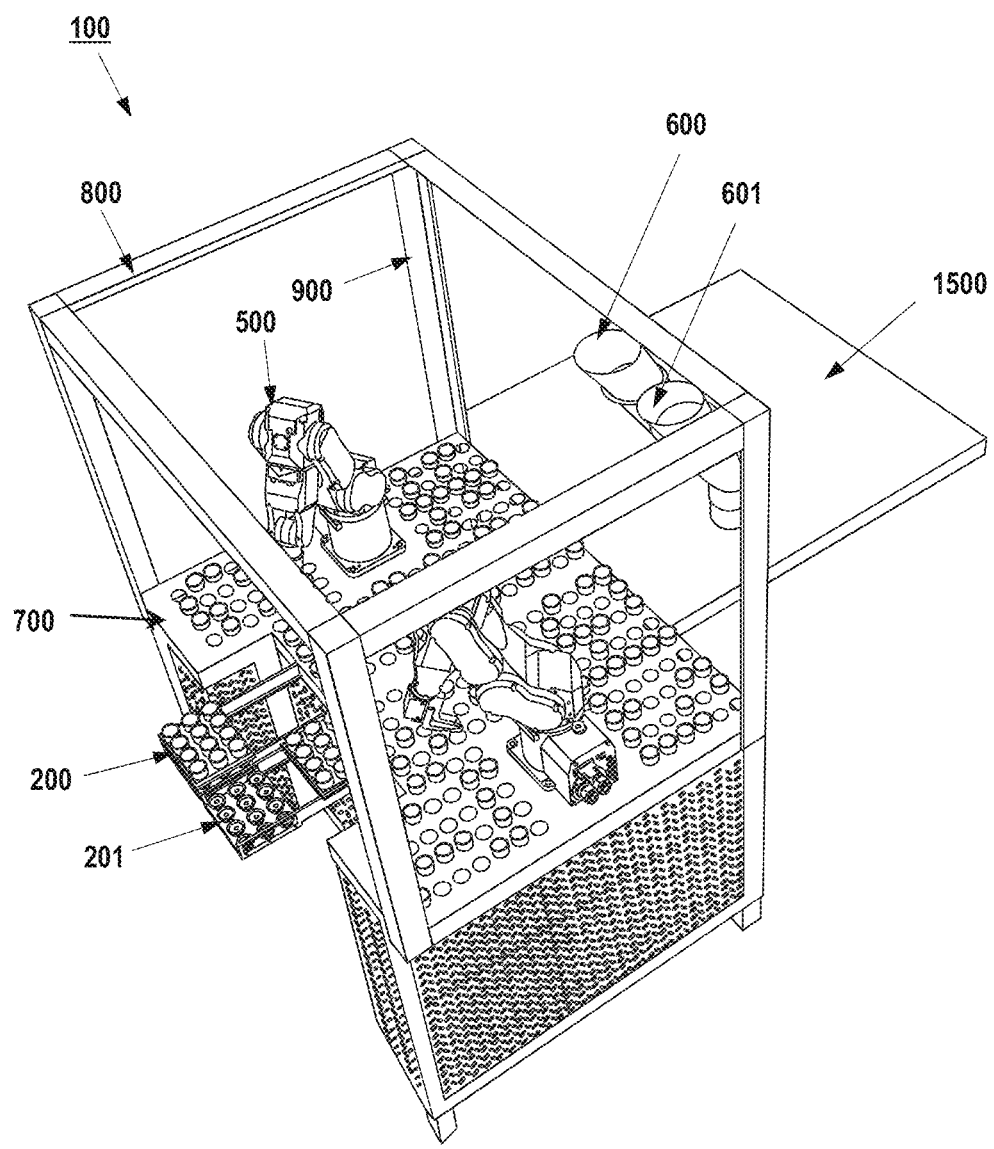
FIG. 1 illustrates a top perspective view of an automated continuous or near-continuous system for sorting and combining varying density payloads, according to an embodiment of the present disclosure.
Figure 2A:
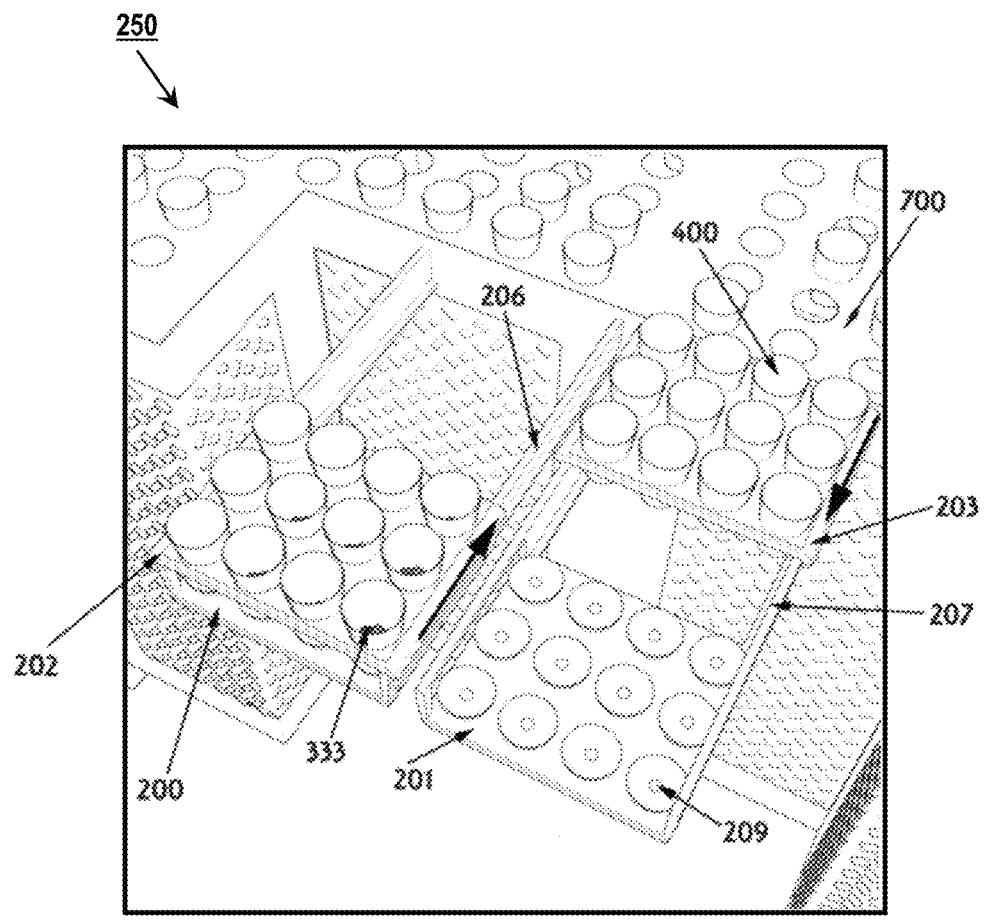
FIG. 2A illustrates a partial perspective view of a shuttle and scale system for the automated system for sorting and combining varying density payloads, of FIG. 1.
Figure 3:
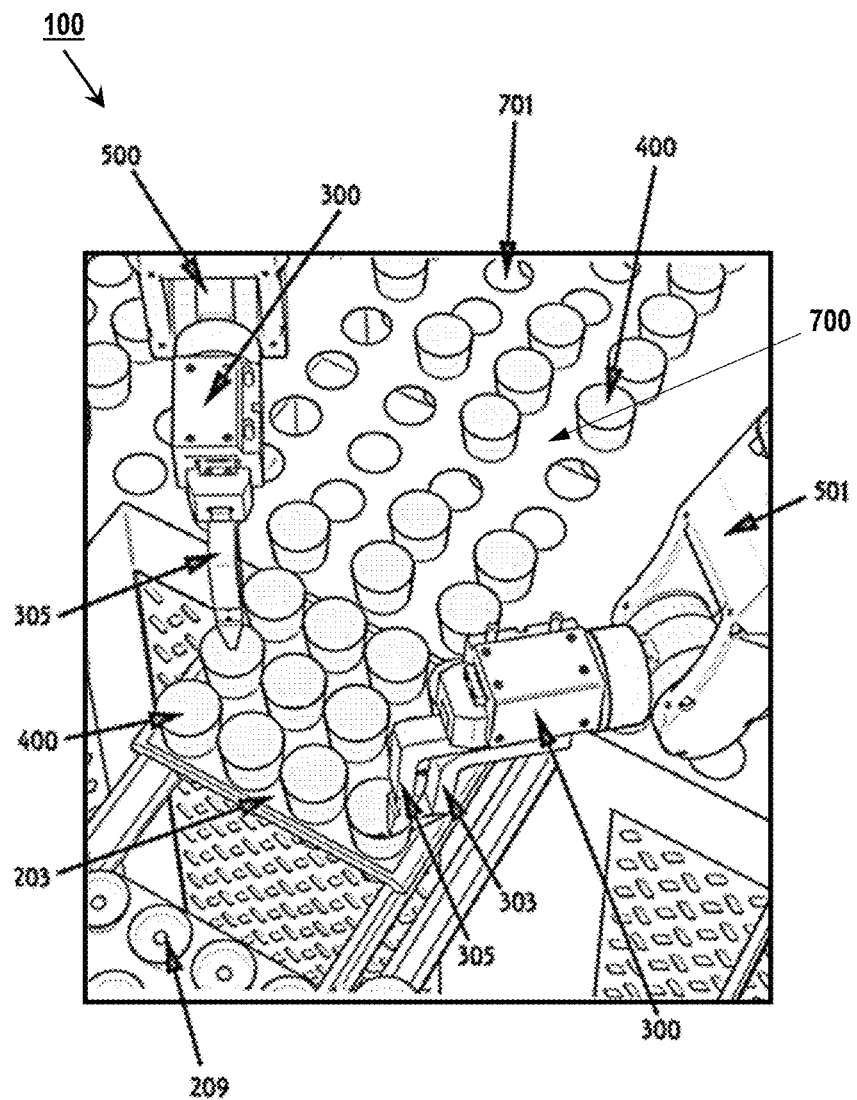
FIG. 3 illustrates a perspective view of two robots configured for removing and replacing cups for the automated system of FIG. 1.
Figure 10A:
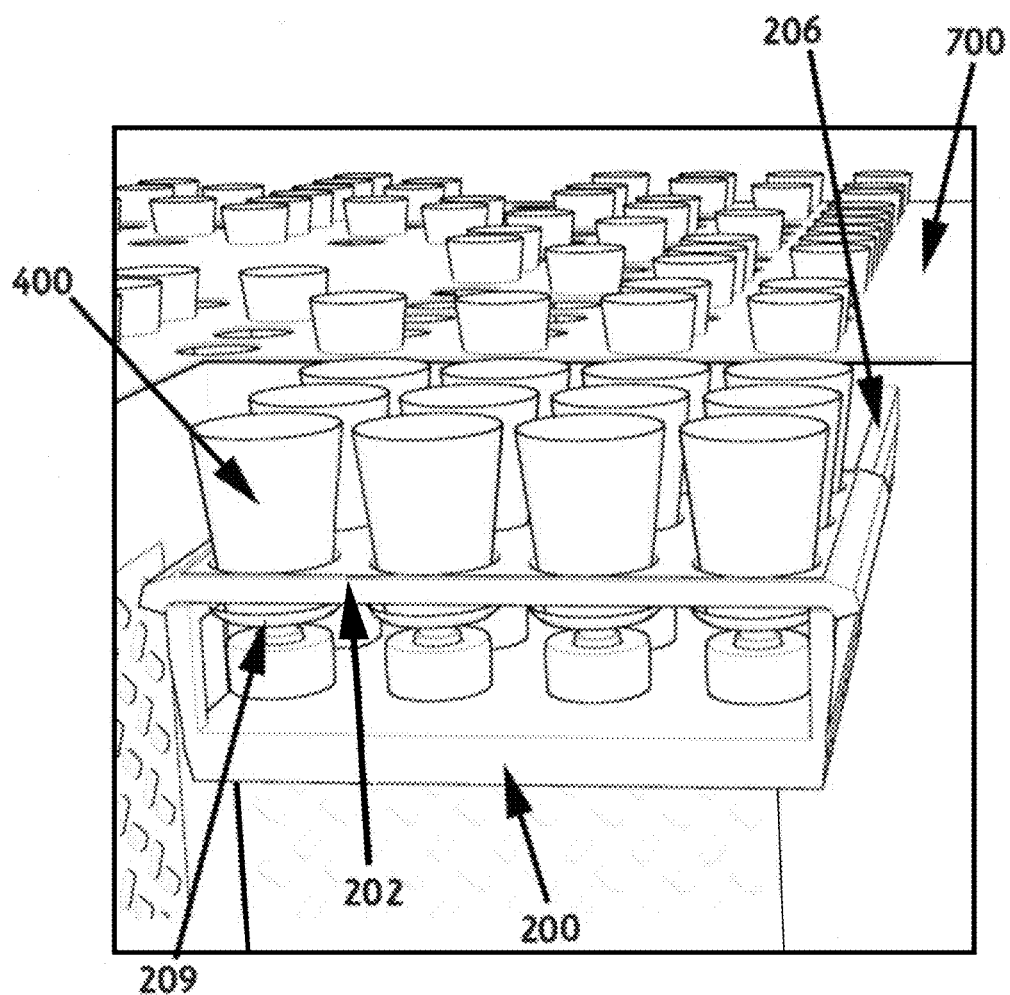
Figure 10B:
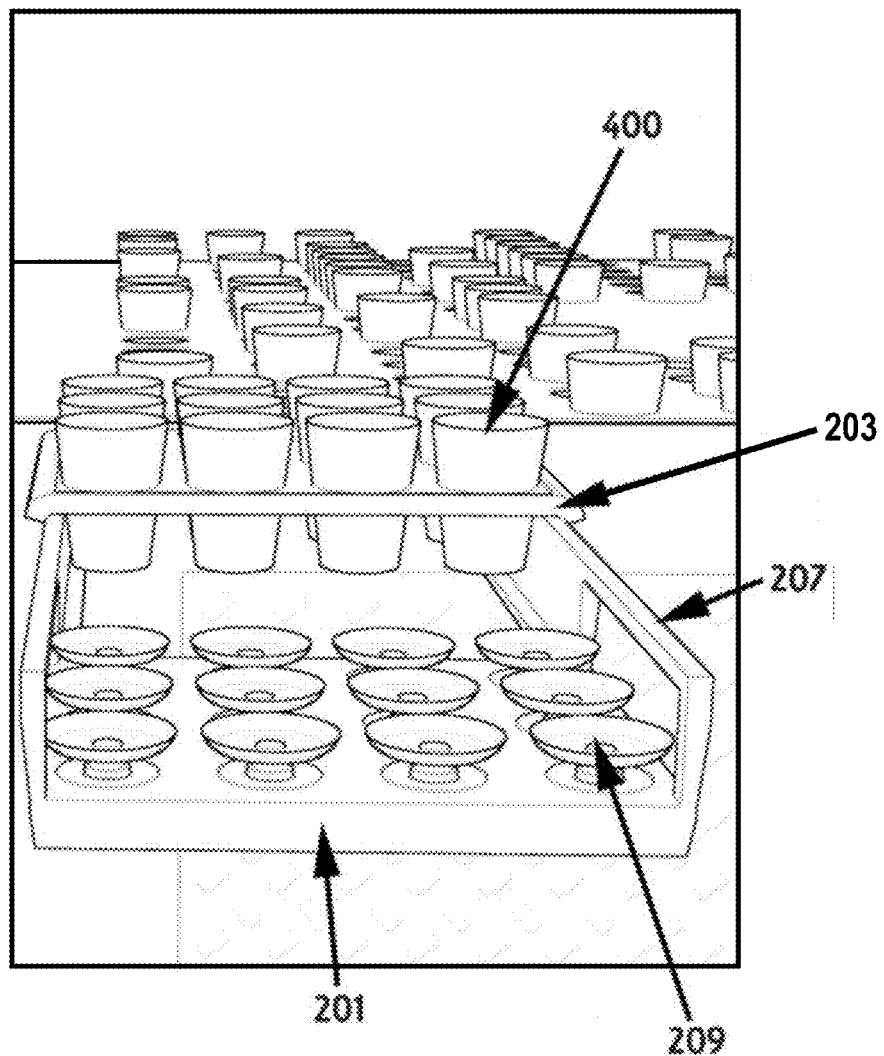
Figure 11A:
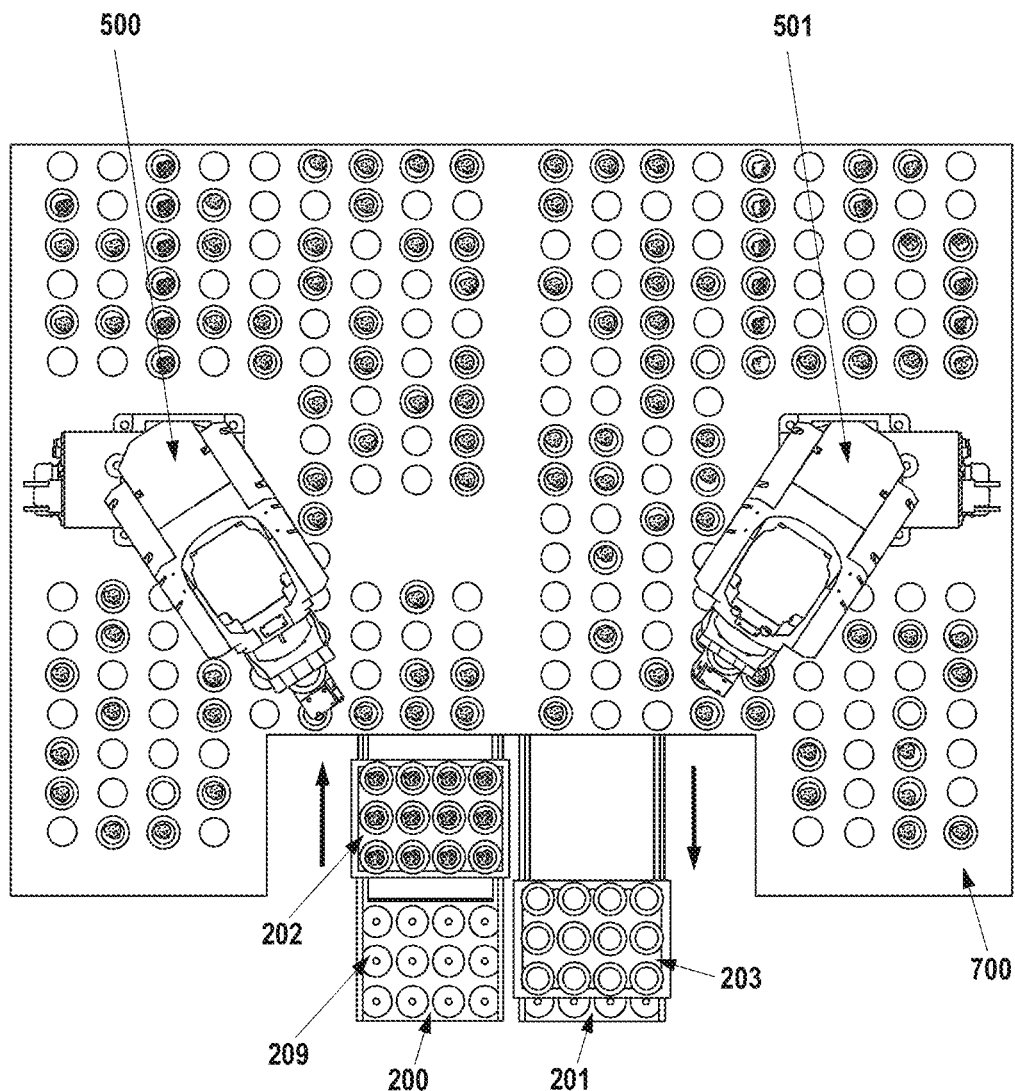
Figure 11B:
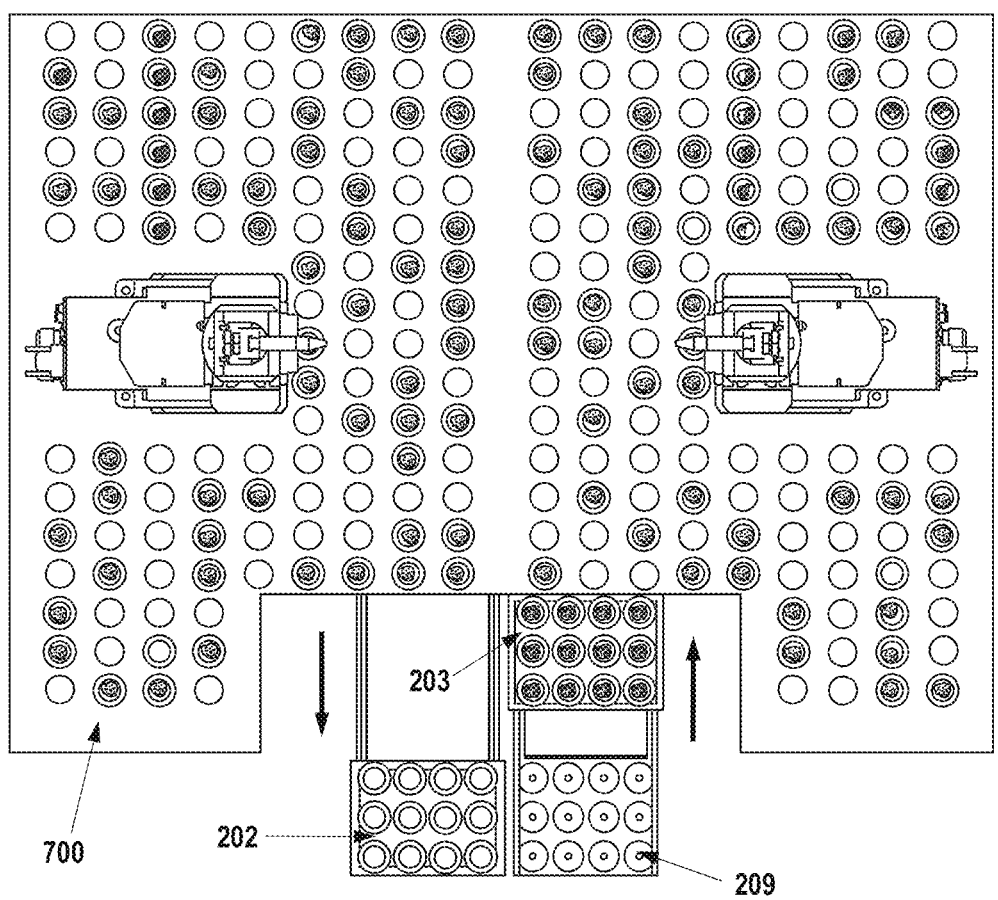
Figure 12A:
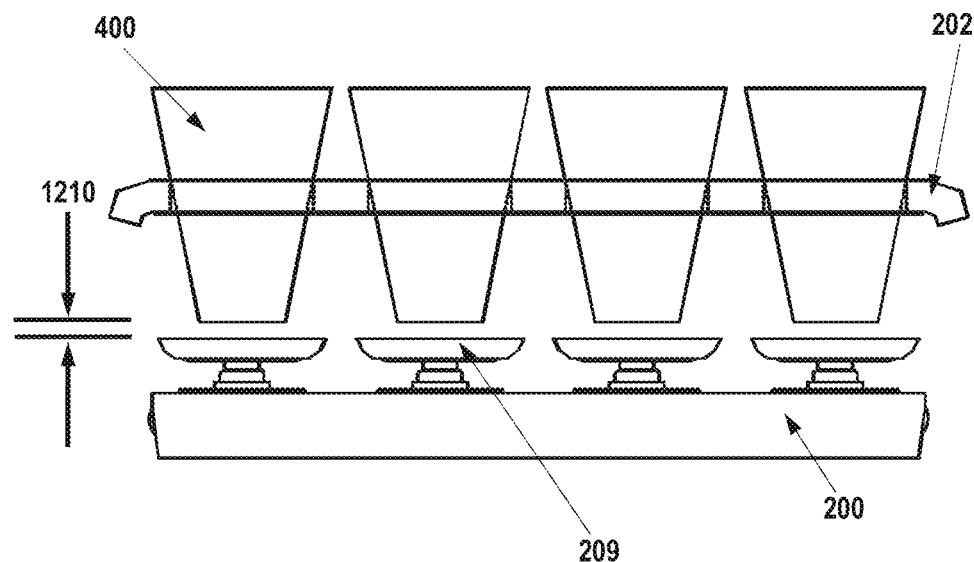
Figure 12B:
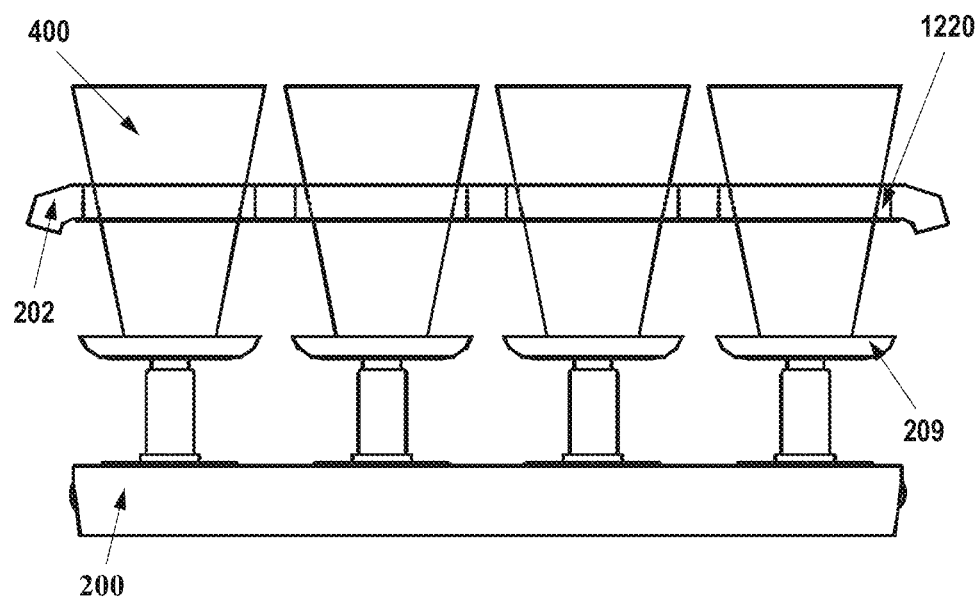
Figure 12C:
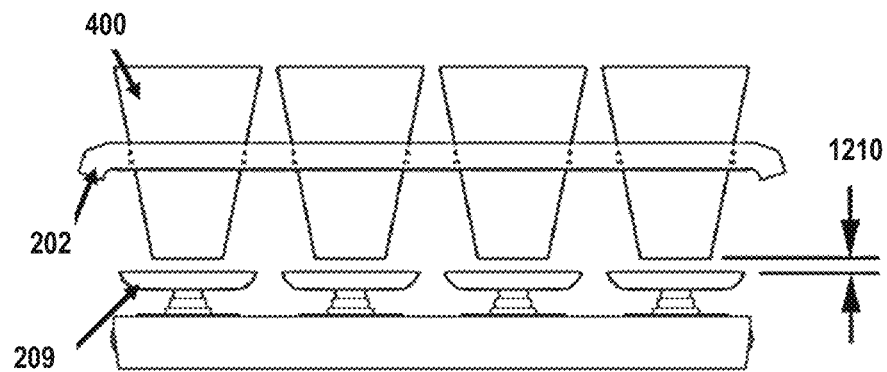
Figure 12D:
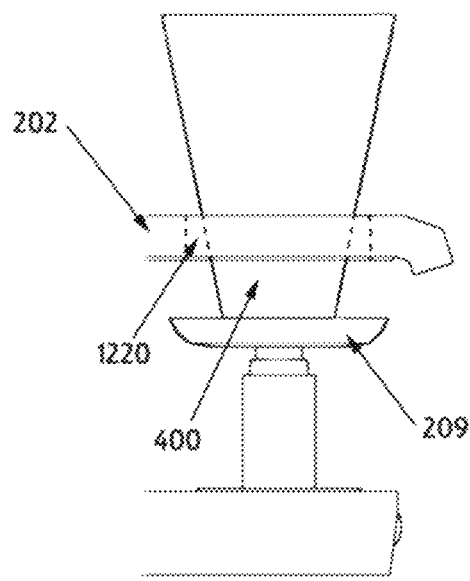
Figure 13A:
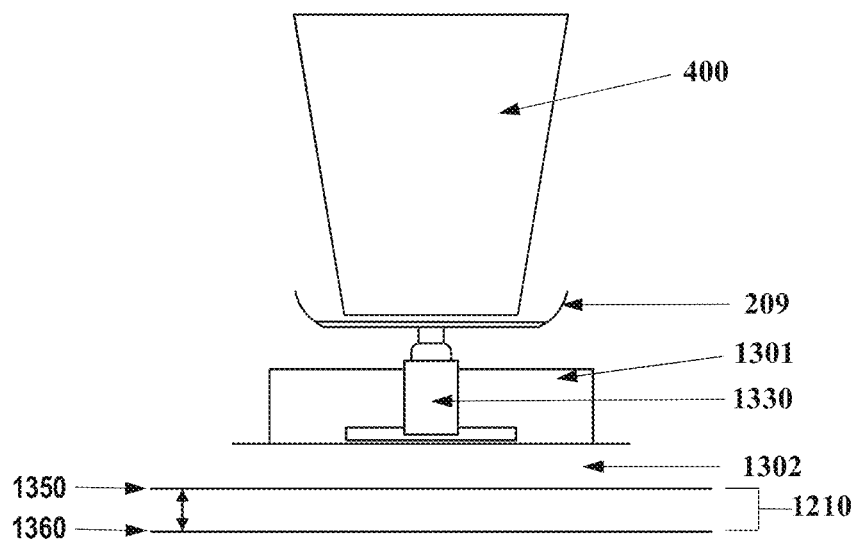
Figure 13B:
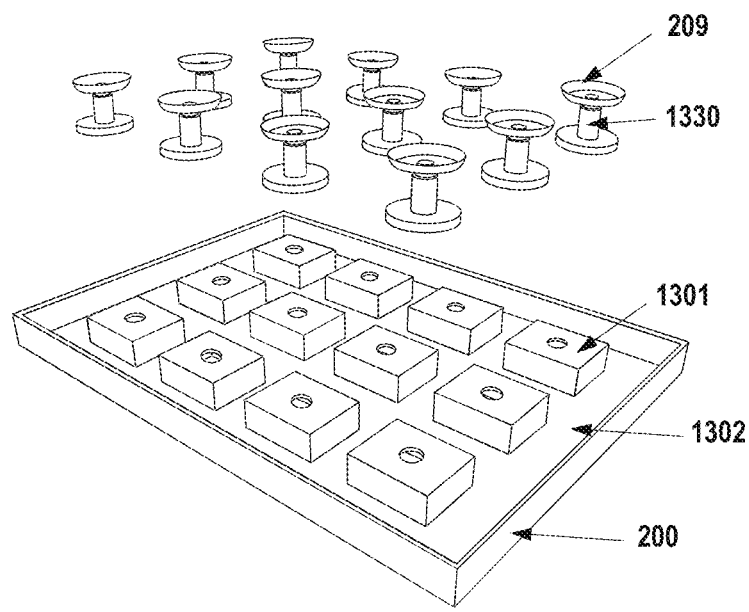
Figure 14A:
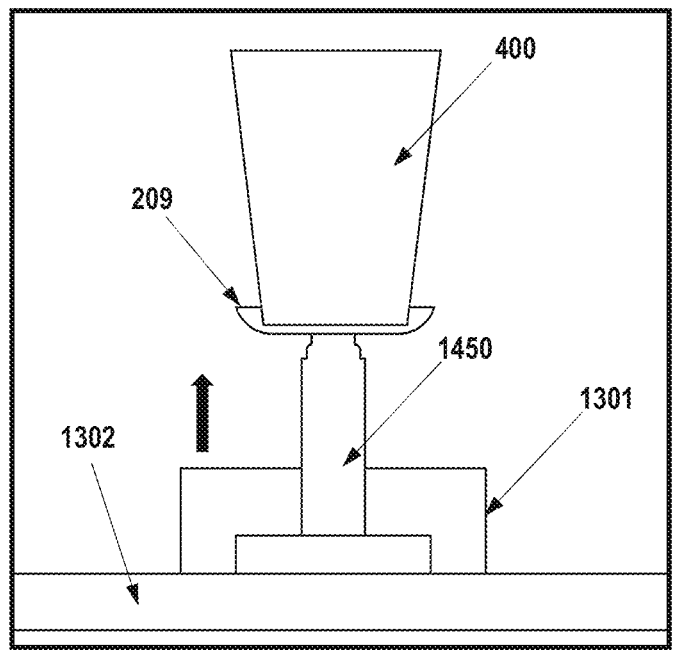
Figure 14B:
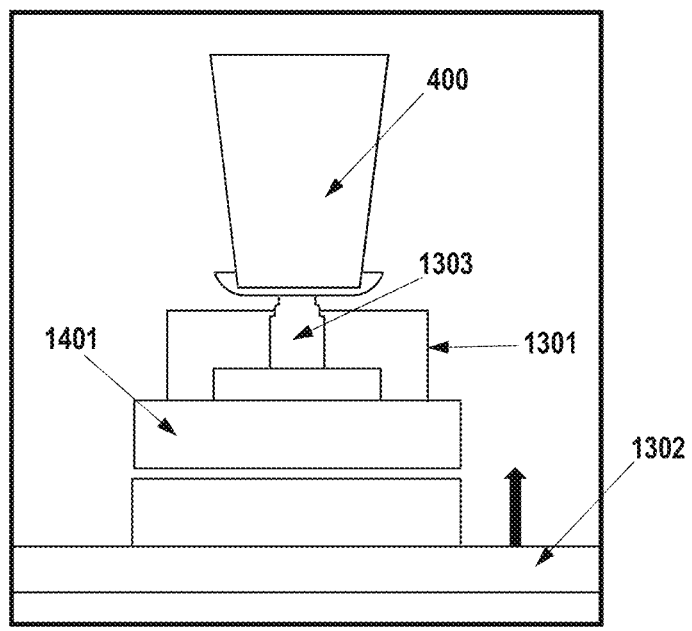
Figure 14C:
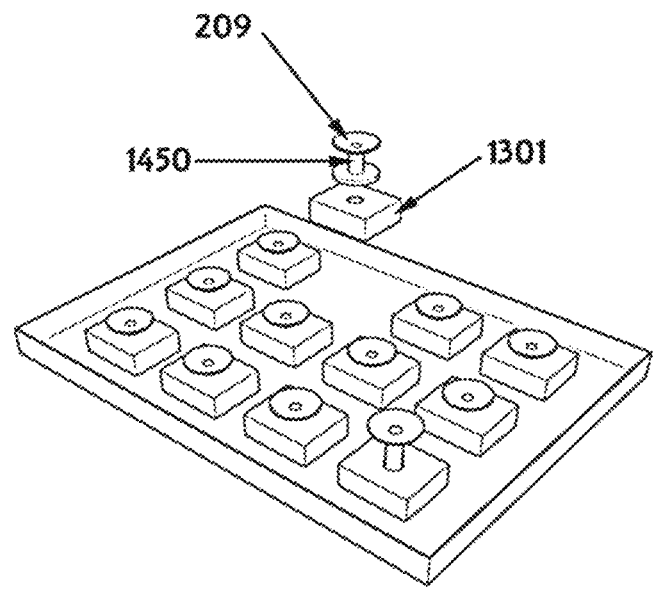
Figure 14D:
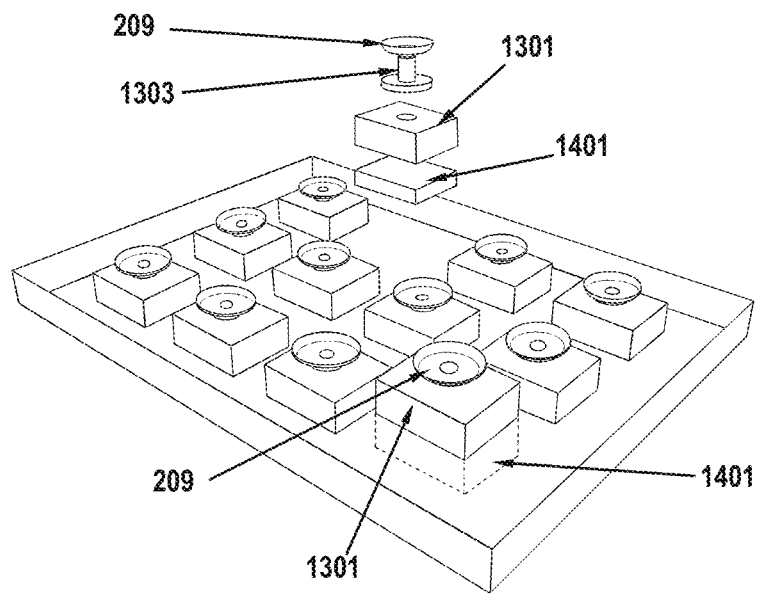
Figure 15A:
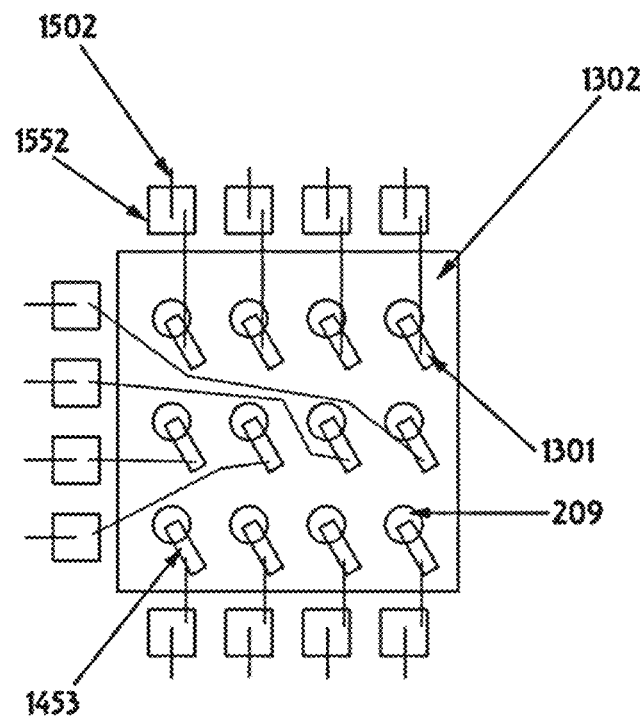
Figure 15B:
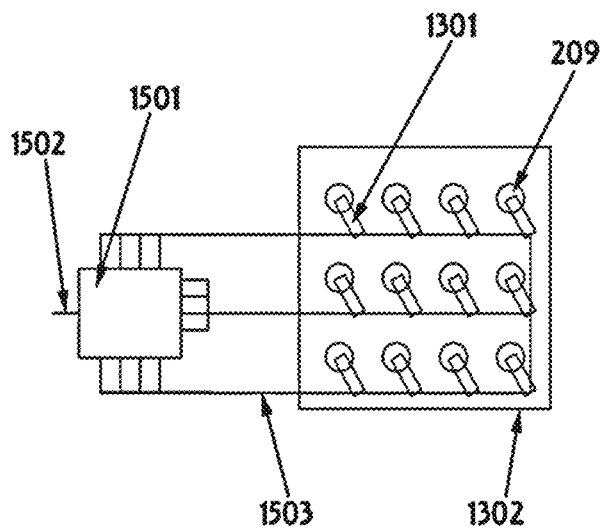
Figure 16A:
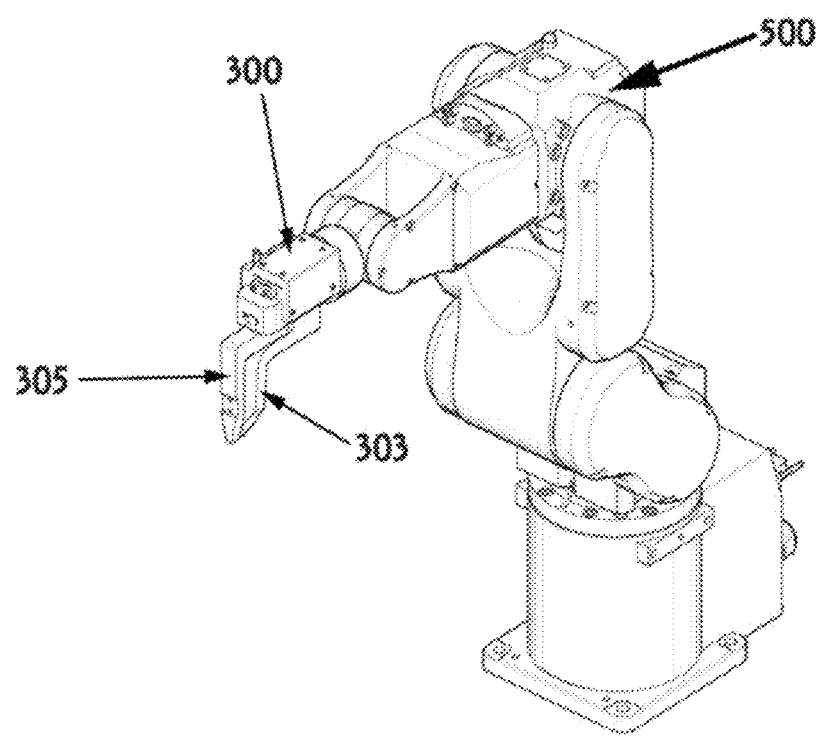
Figure 16B:
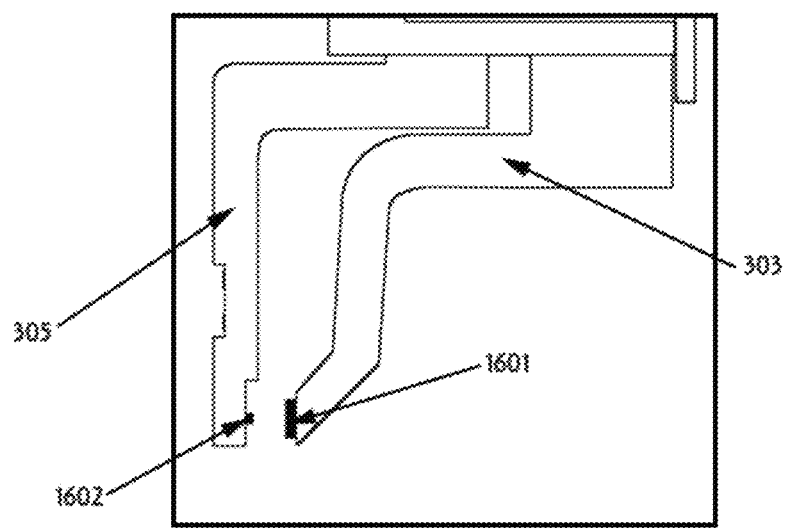
Figure 16C:
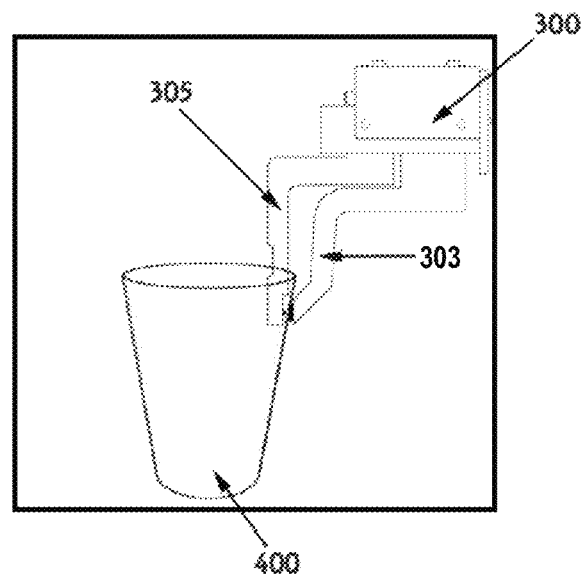
Figure 17A:
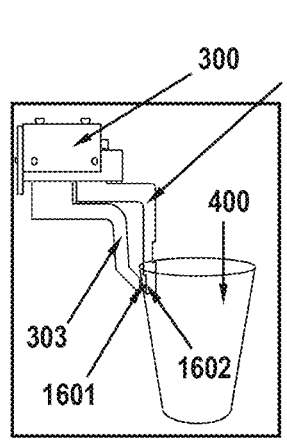
Figure 17B:
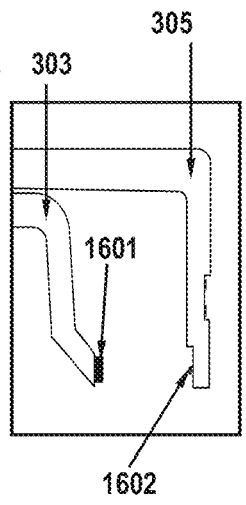
Figure 17C:
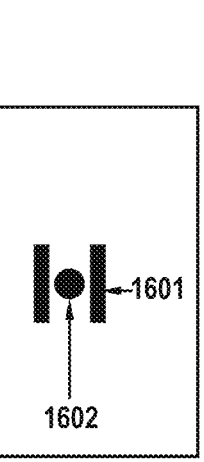
Figure 17D:
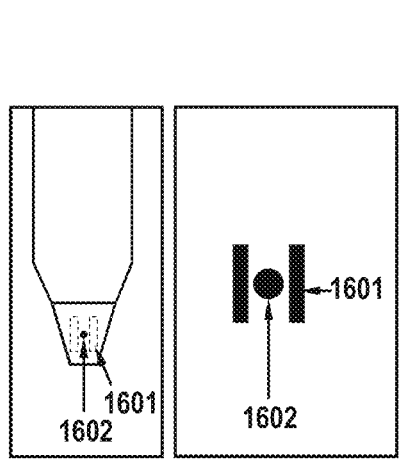
Figure 17E:
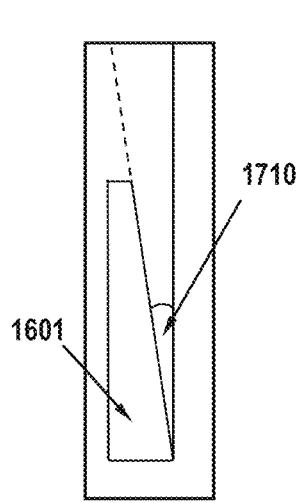
Figure 17F:
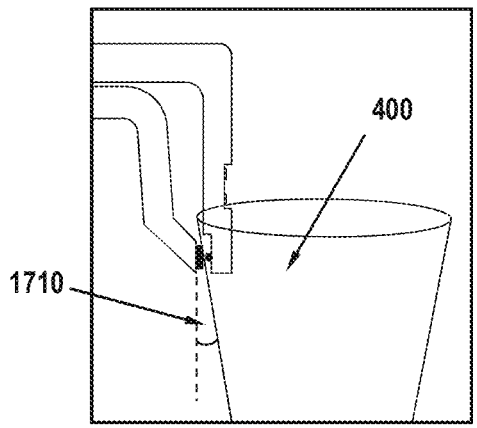
Figure 18:
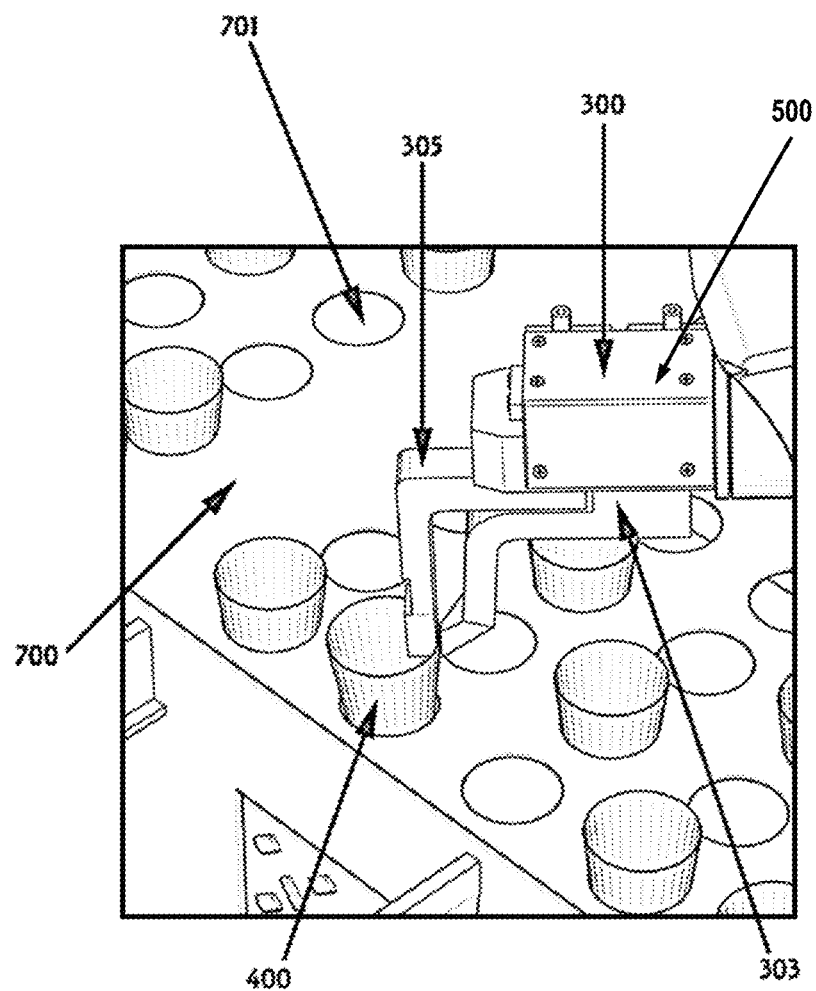
Figure 19:
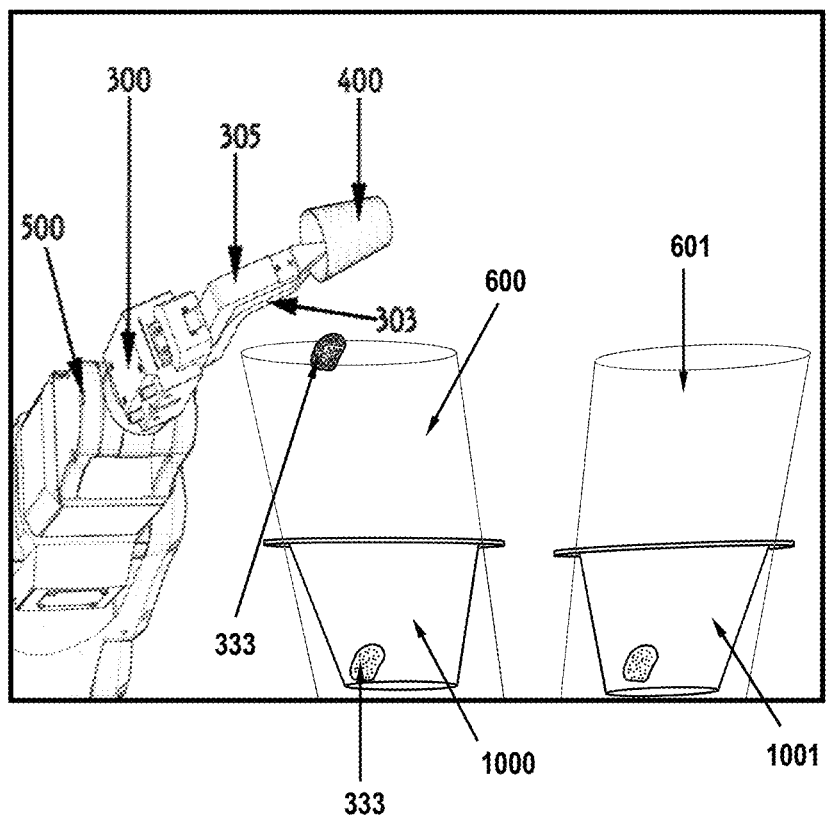
Figure 20:
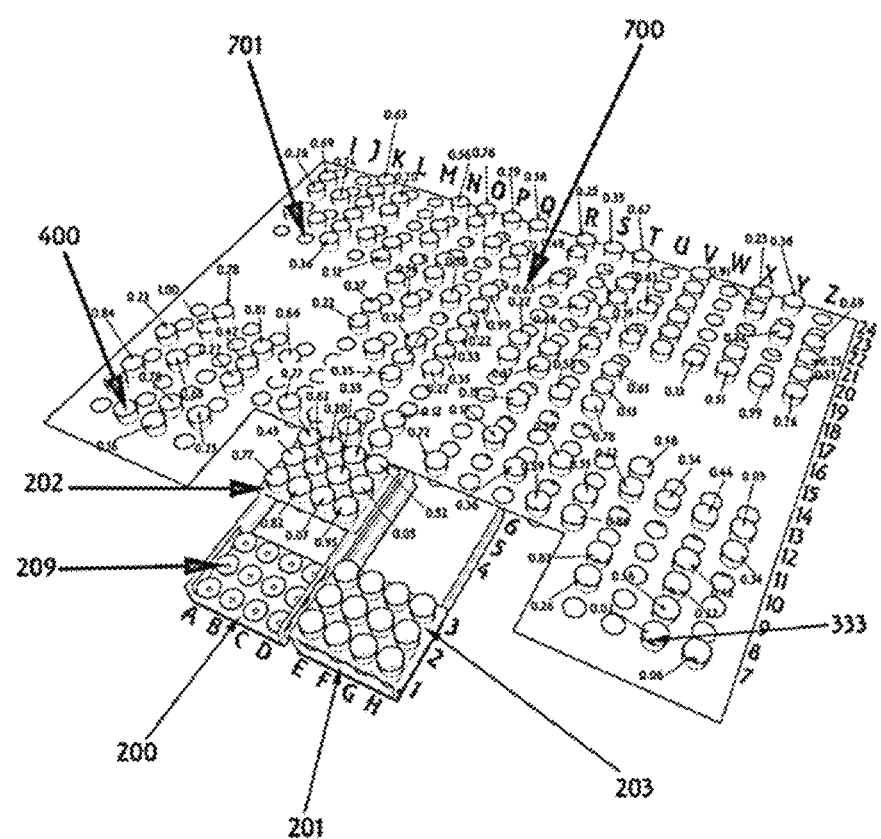
Figure 22:
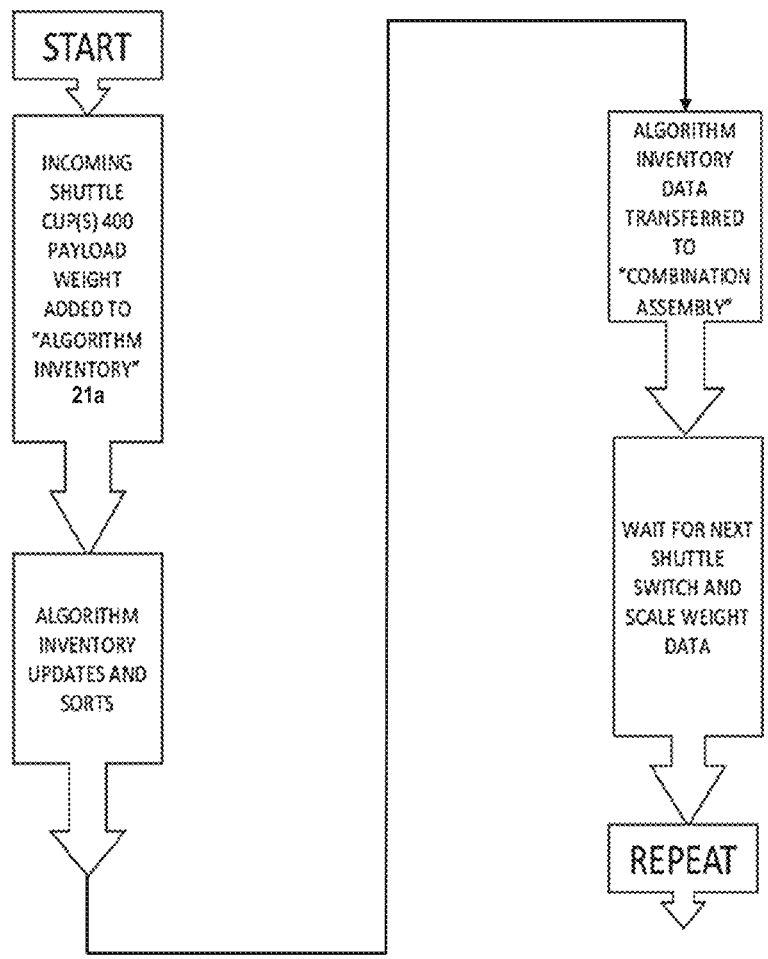
Figure 23:
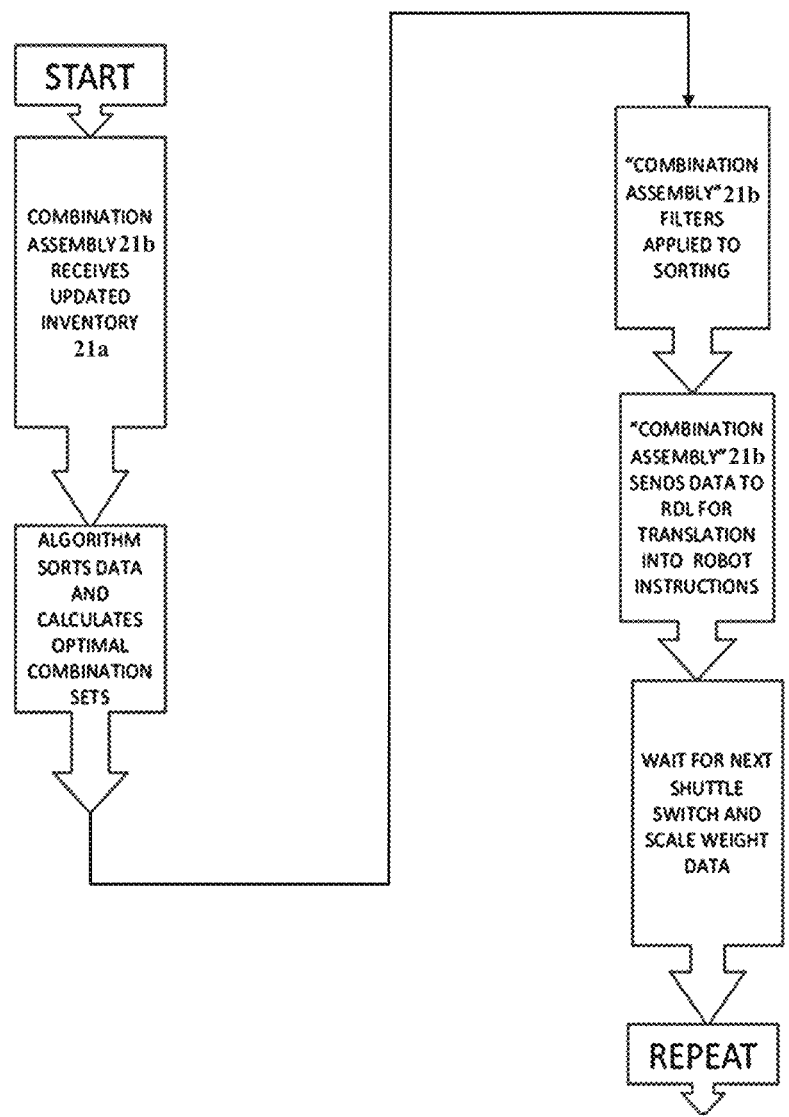
Figure 24:
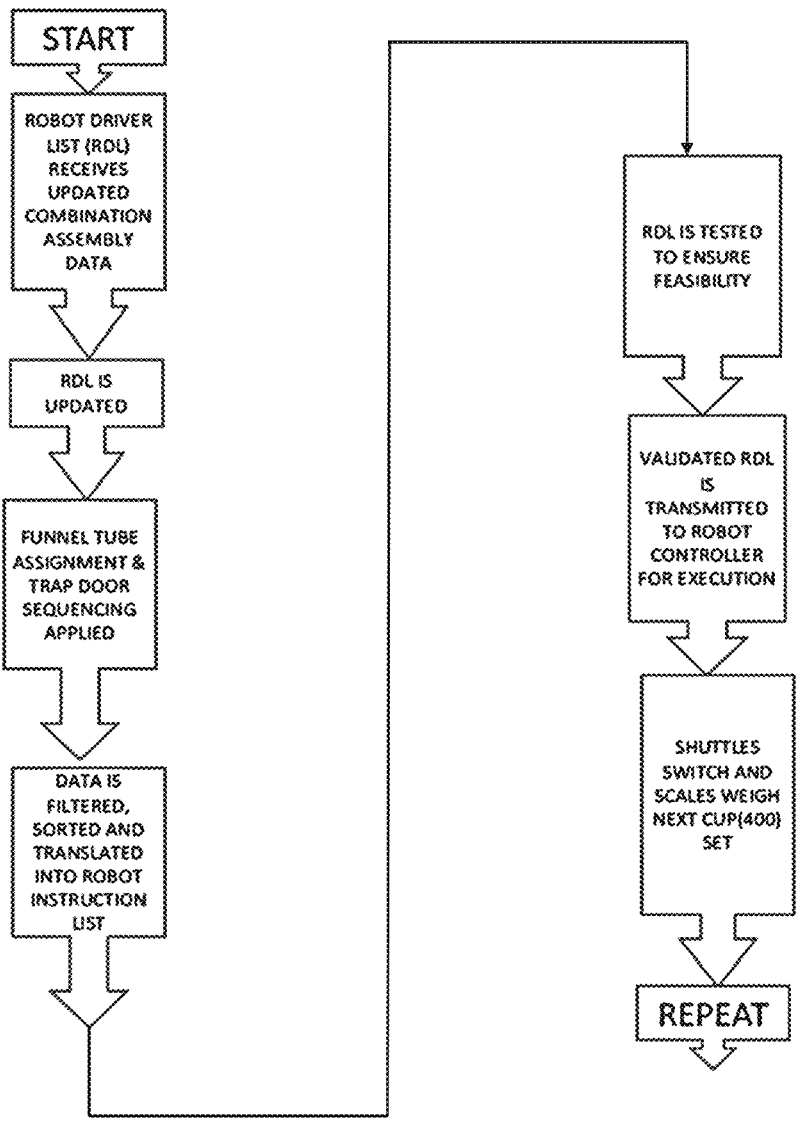
Figure 25:
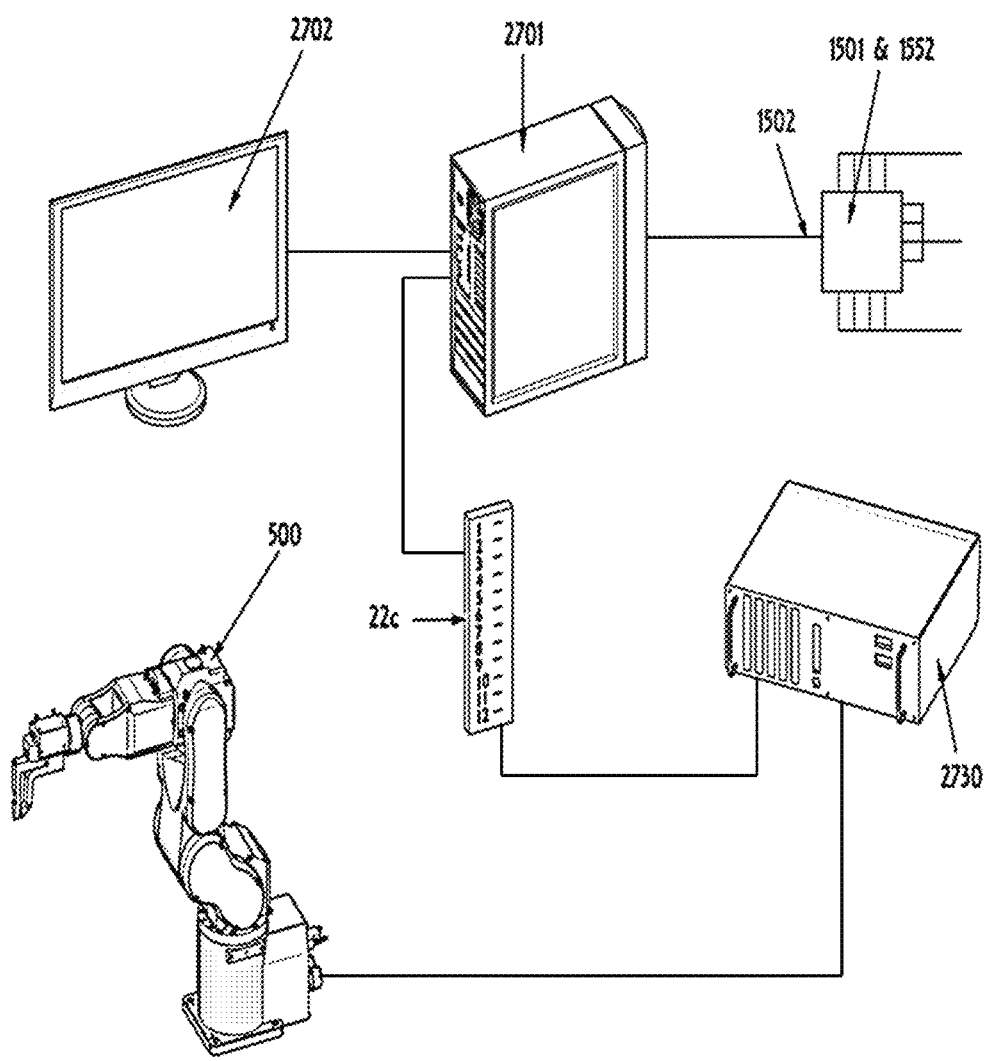
Figure 26A:
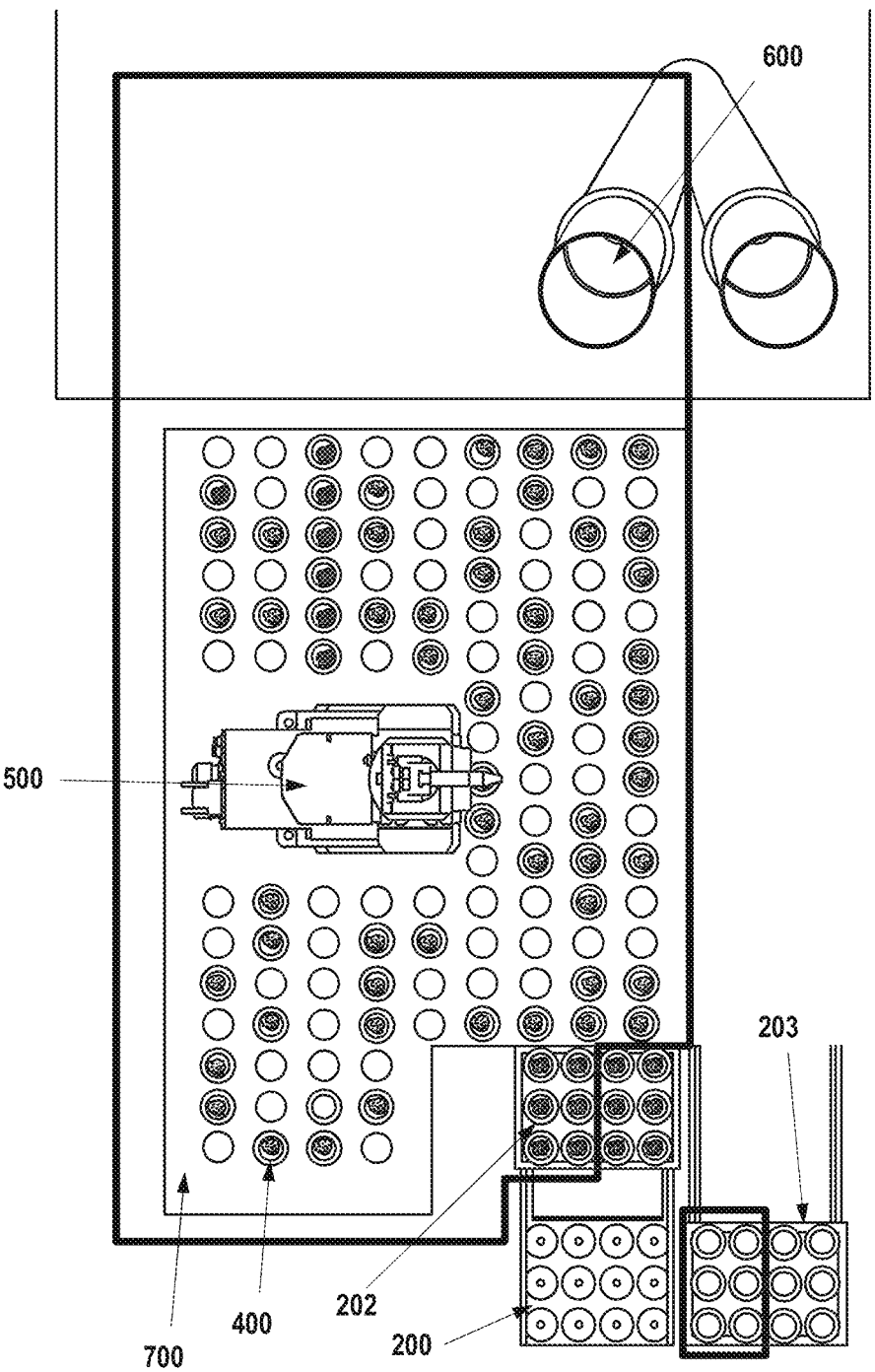
Figure 26B:
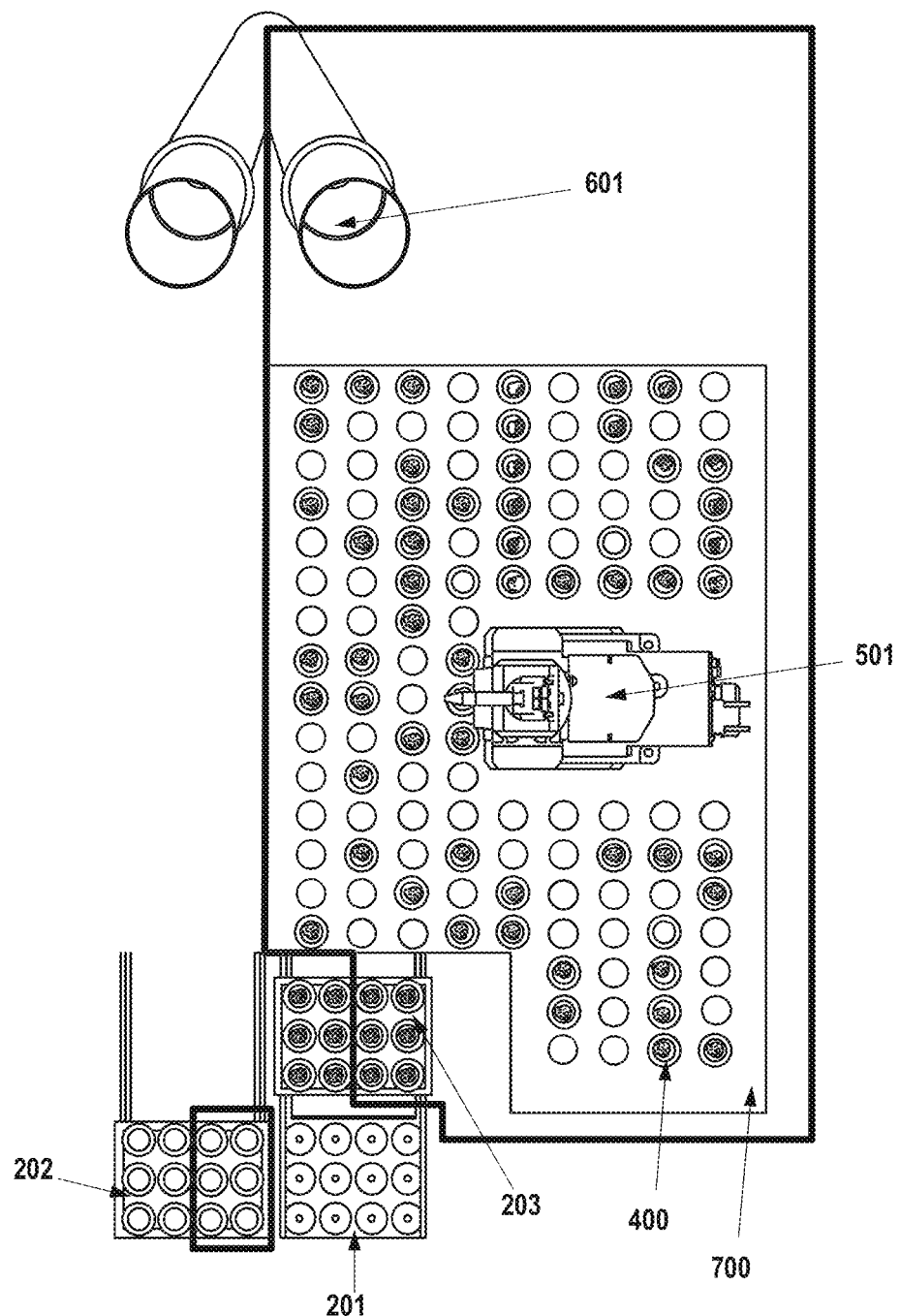
Figure 27:
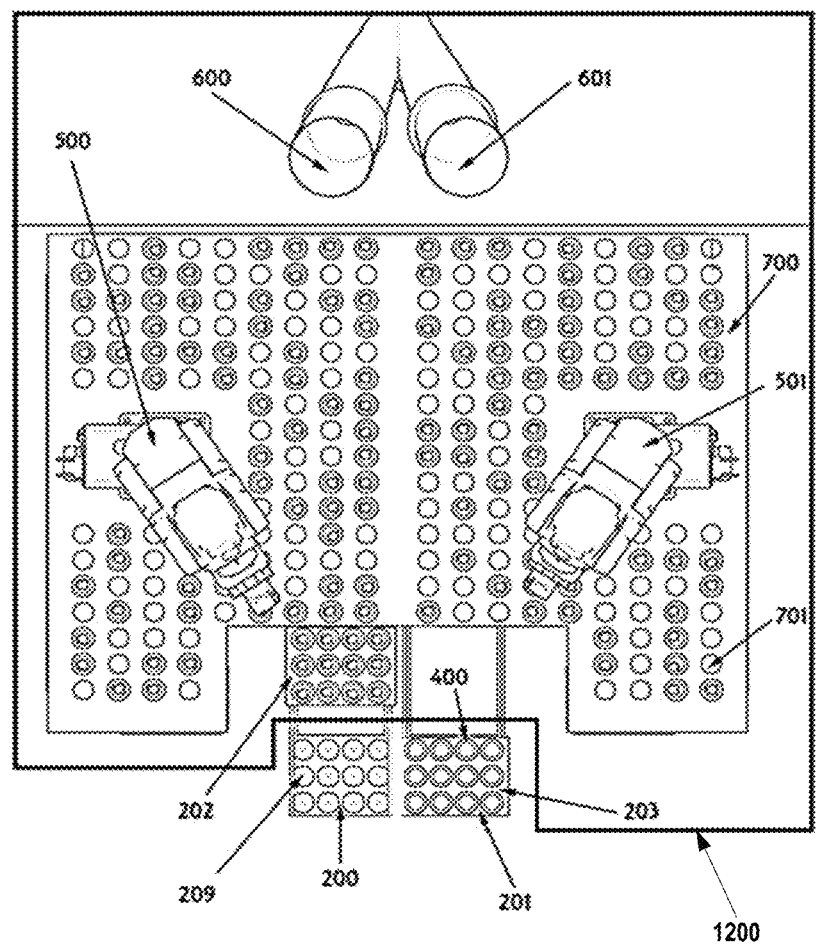
Figure 28A:
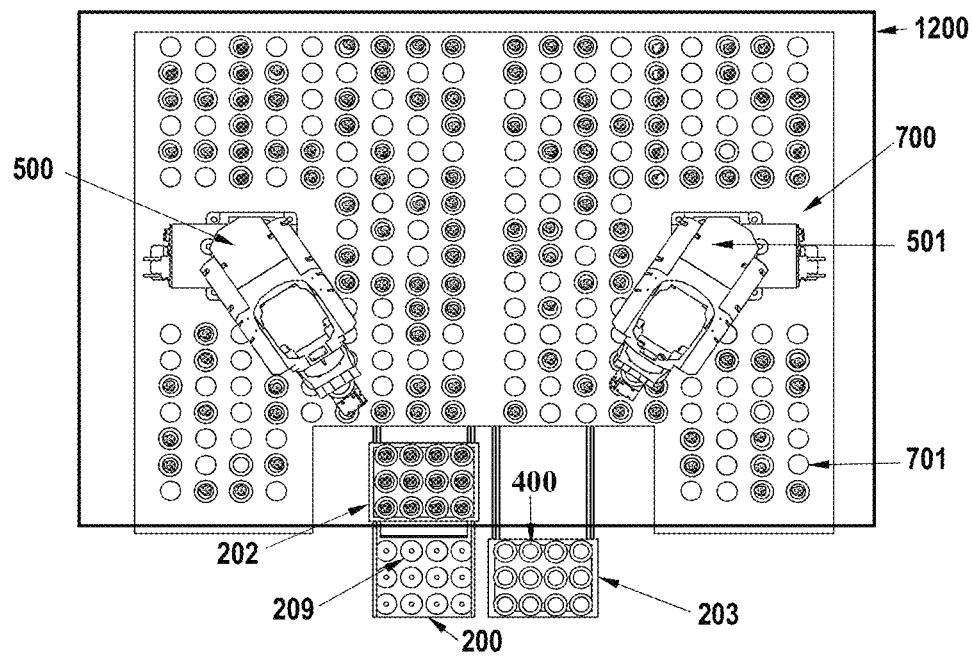
Figure 28B:
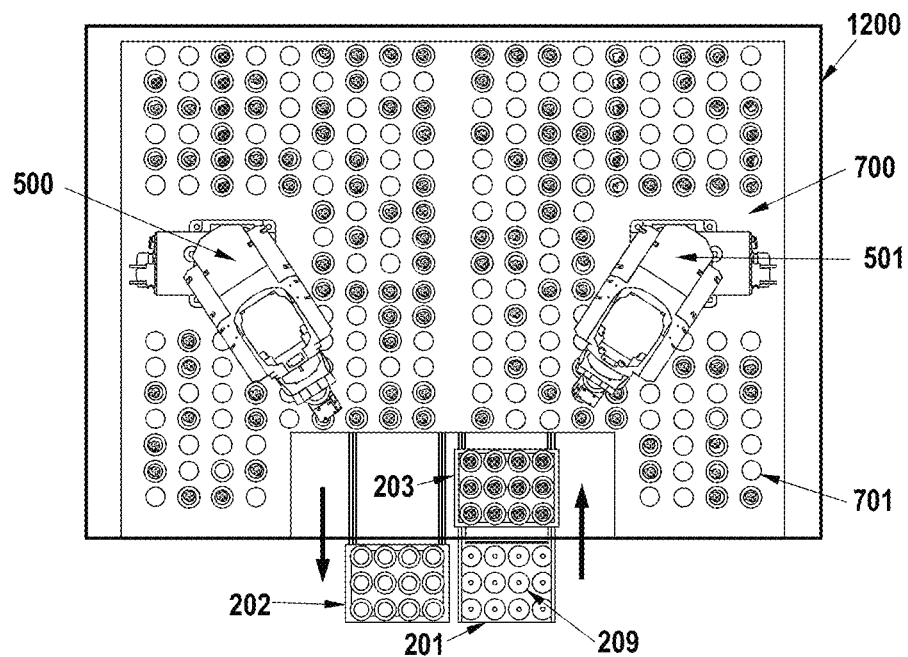
Figure 29:
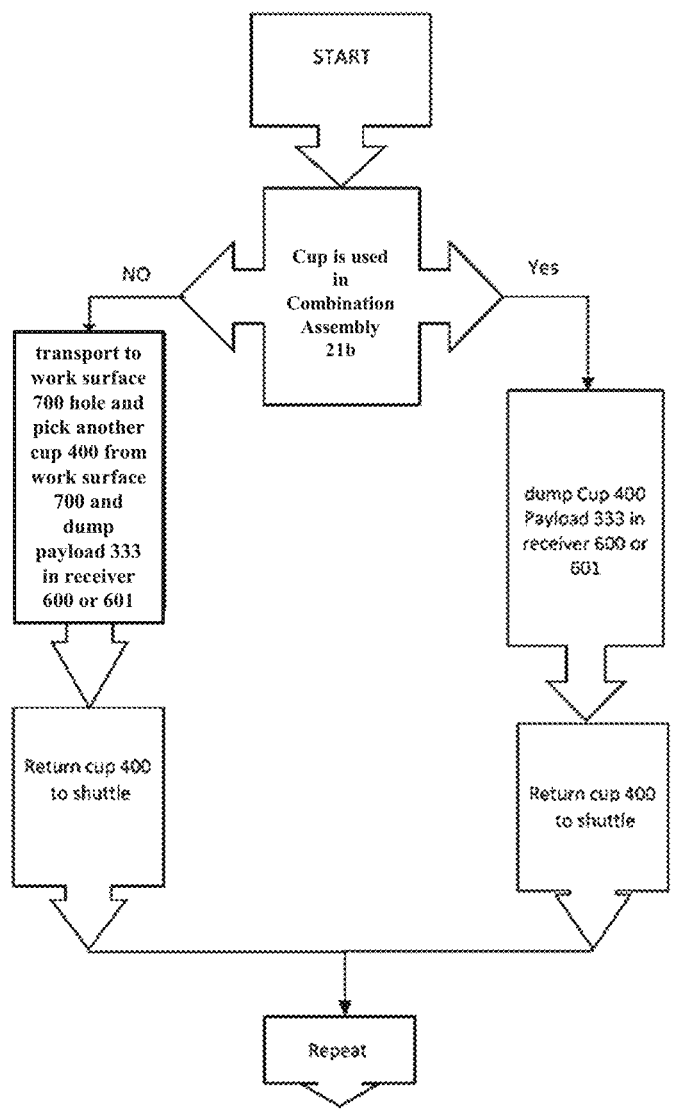
Figure 30:
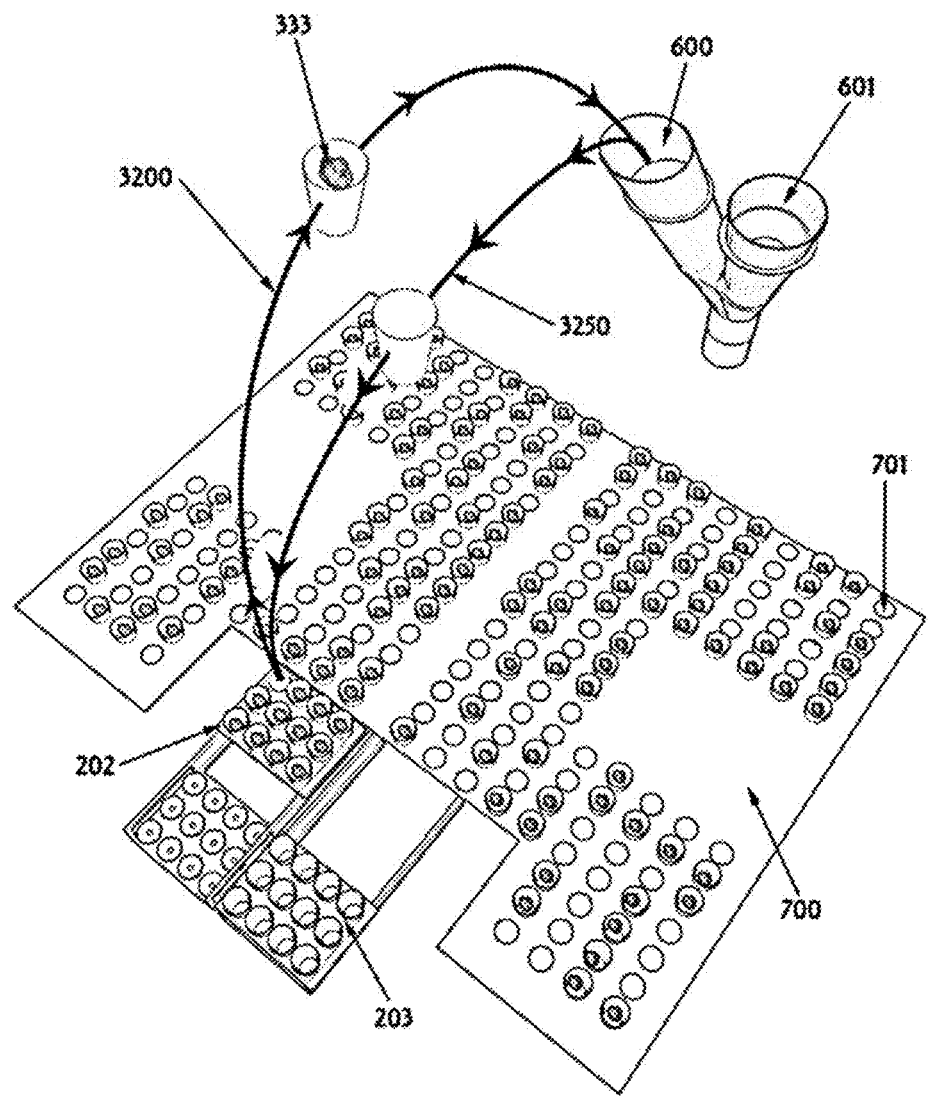
Figure 31:
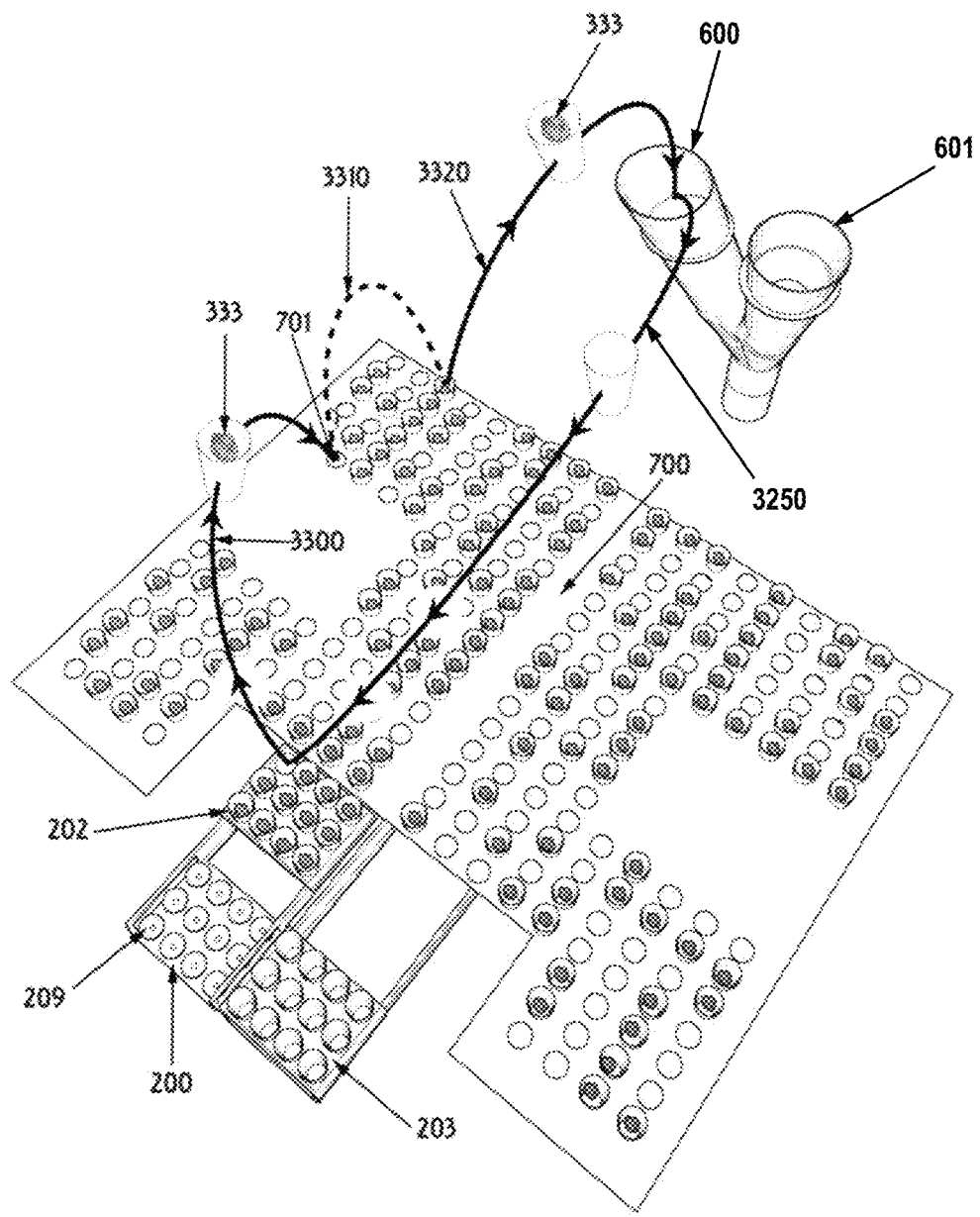
Figure 32A:
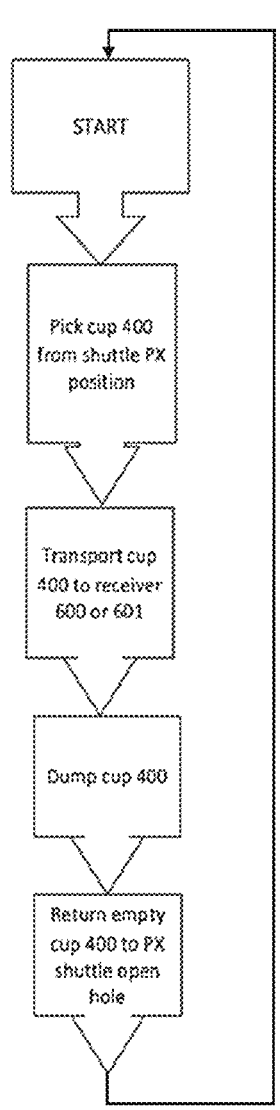
Figure 32B:
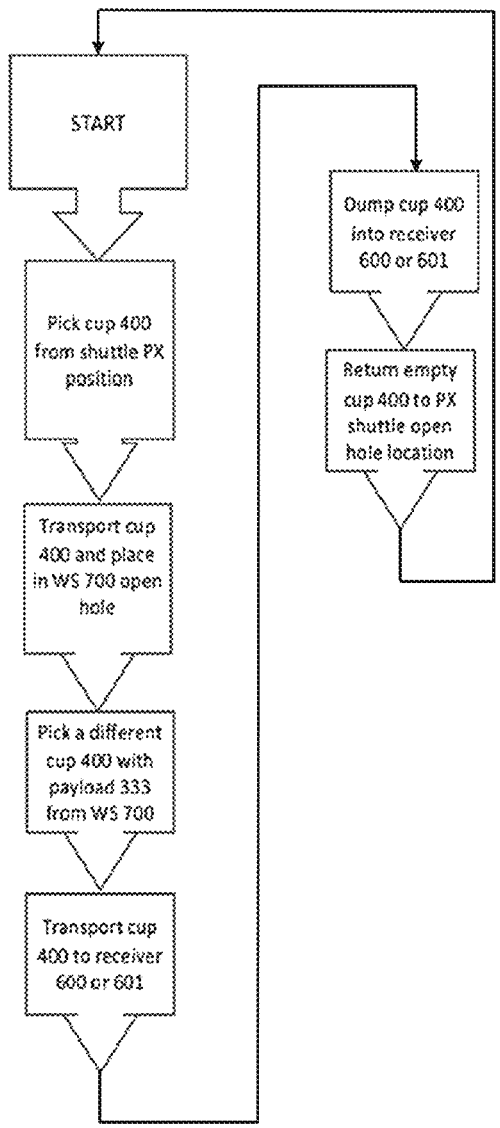
Figure 33:
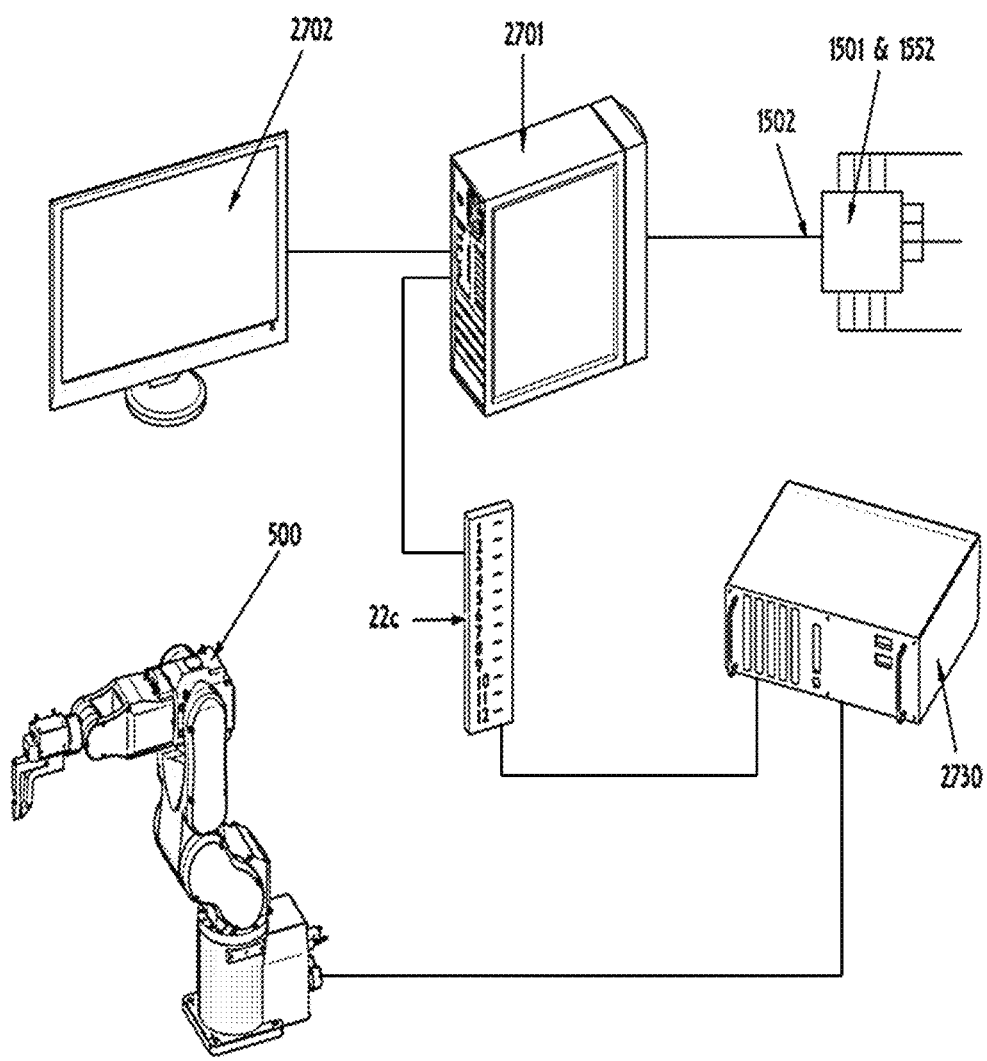
Figures 34A, 34B, 34C:
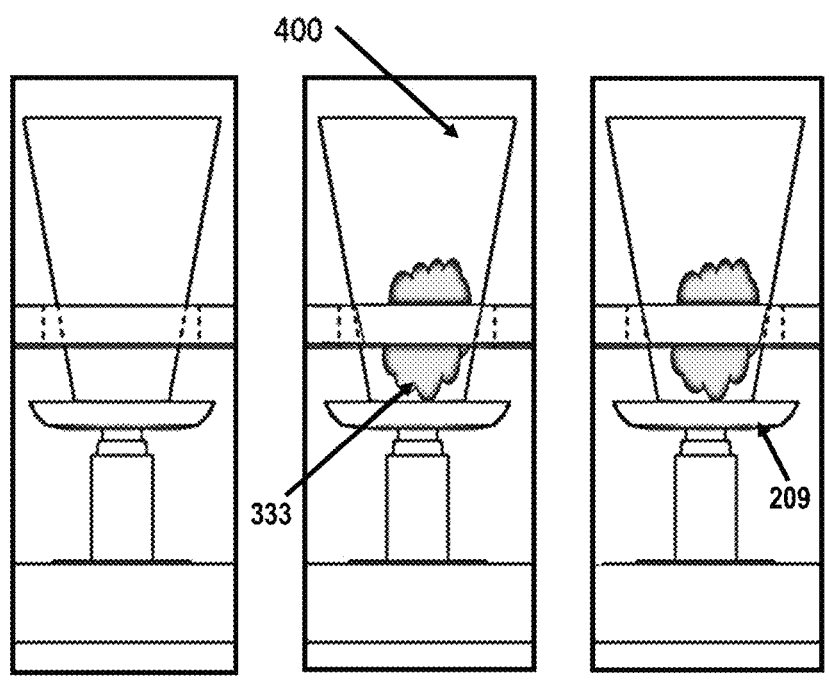
Figures 35A, 35B:
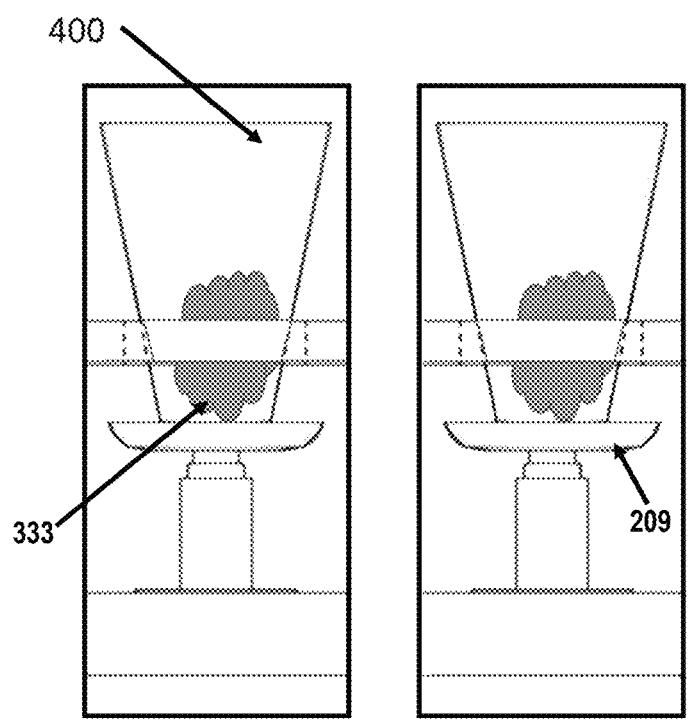
Figure 36:
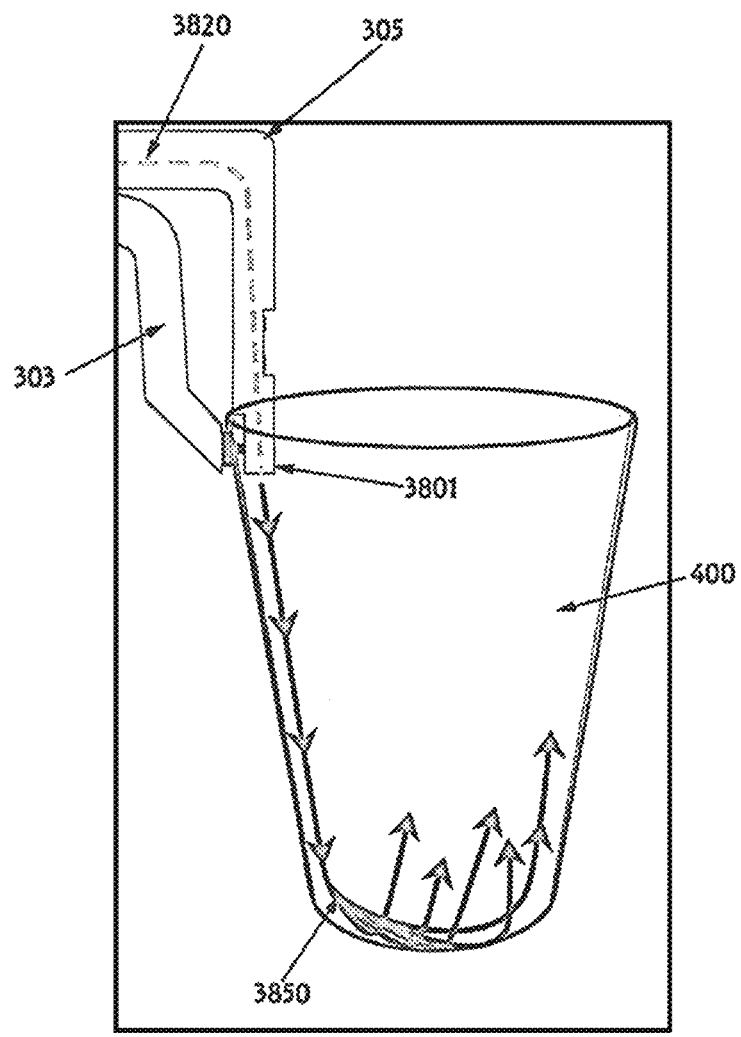
Figure 37:
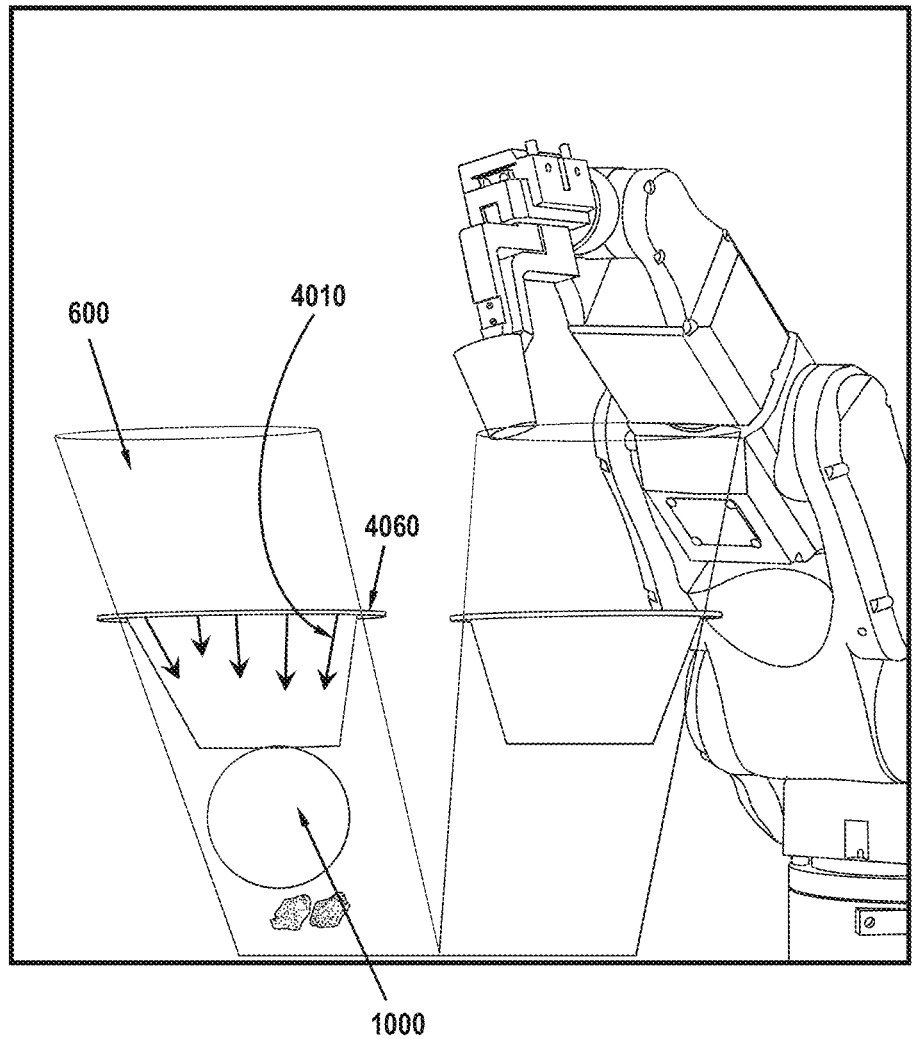
Figure 38A:
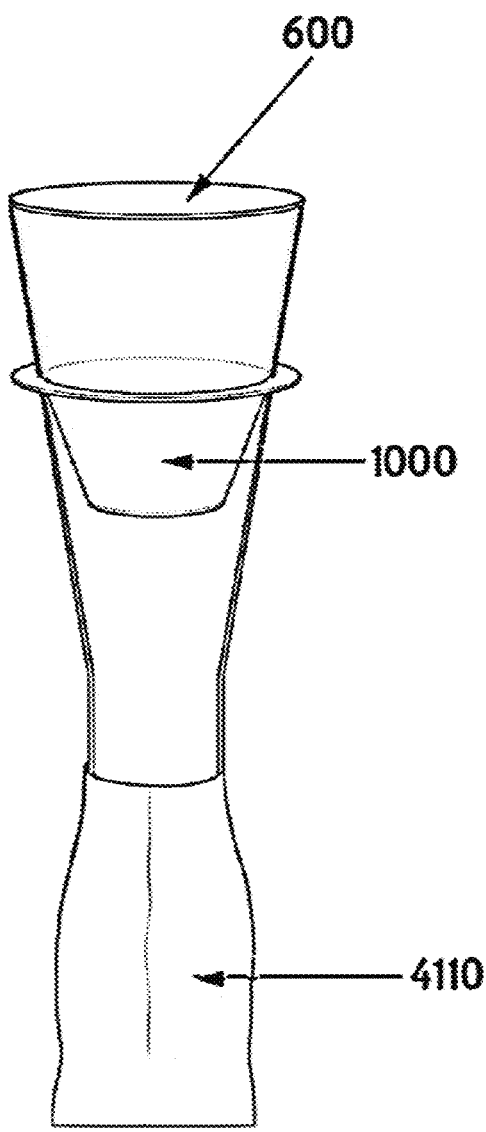
Figure 38B:
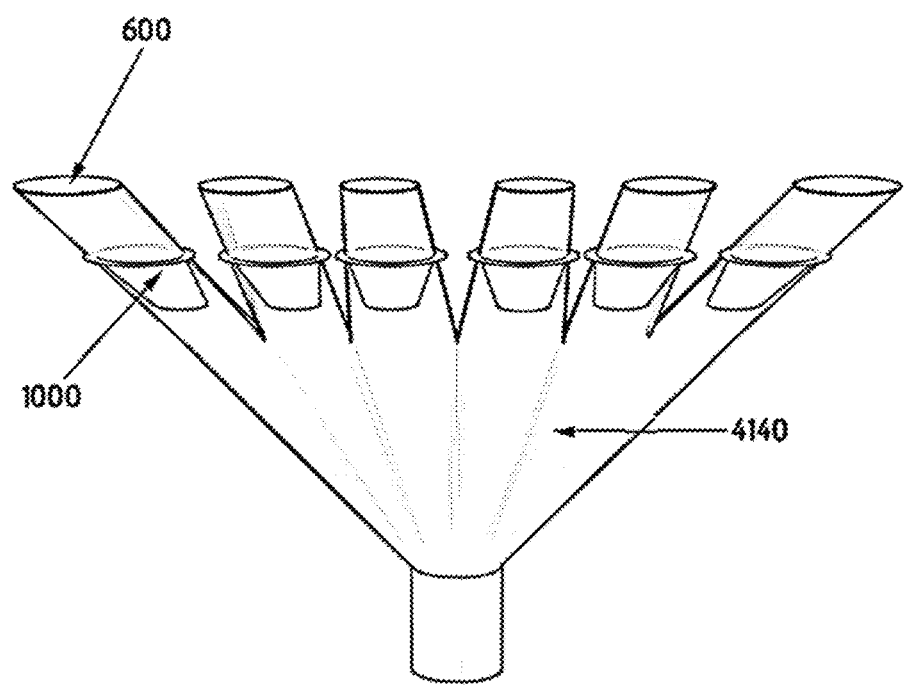
Figure 39:
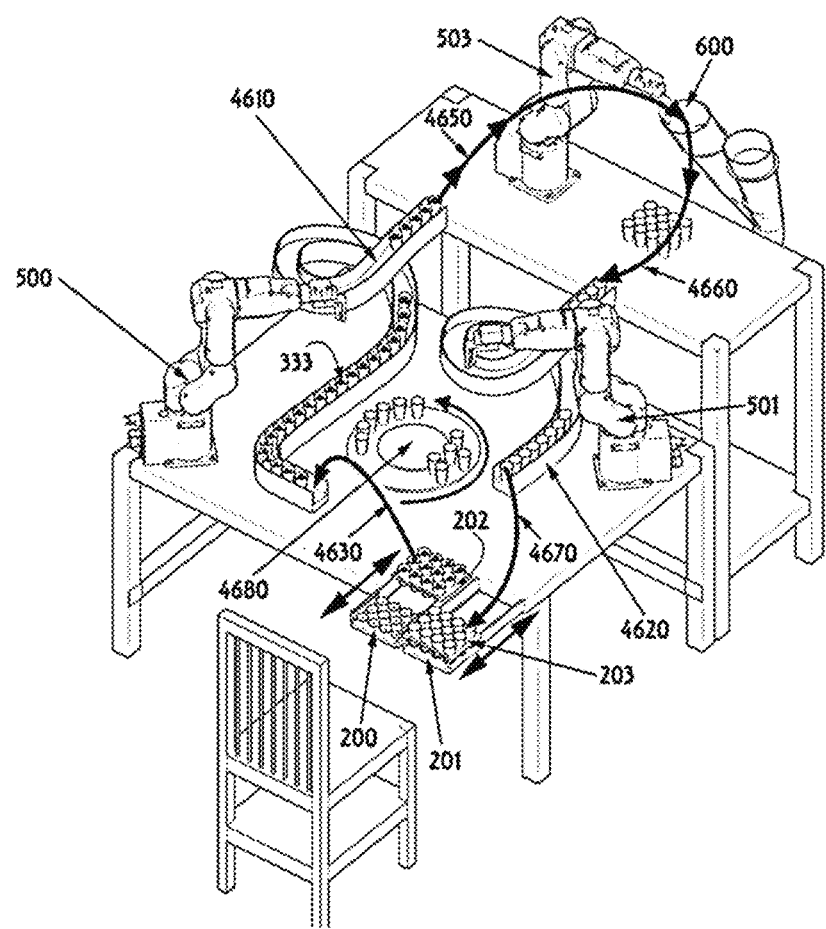
Figure 40:
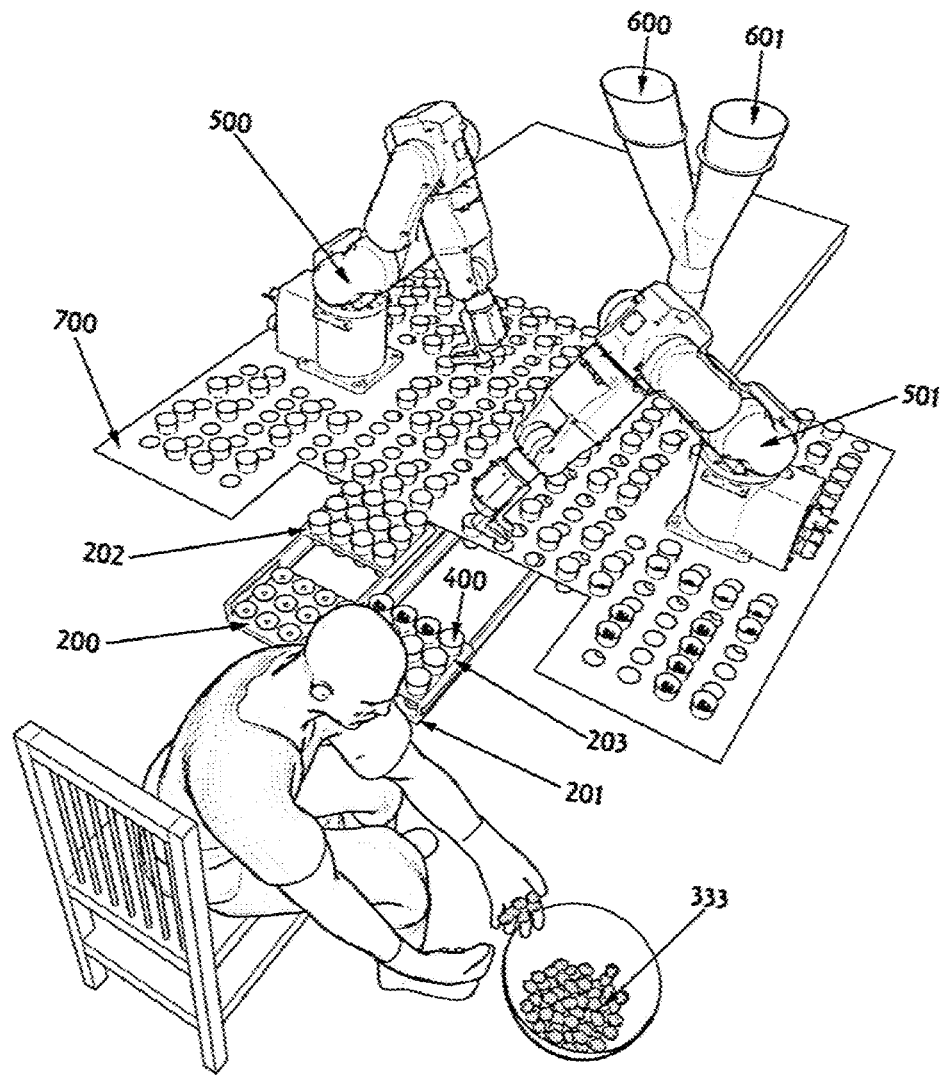
Figure 41A:
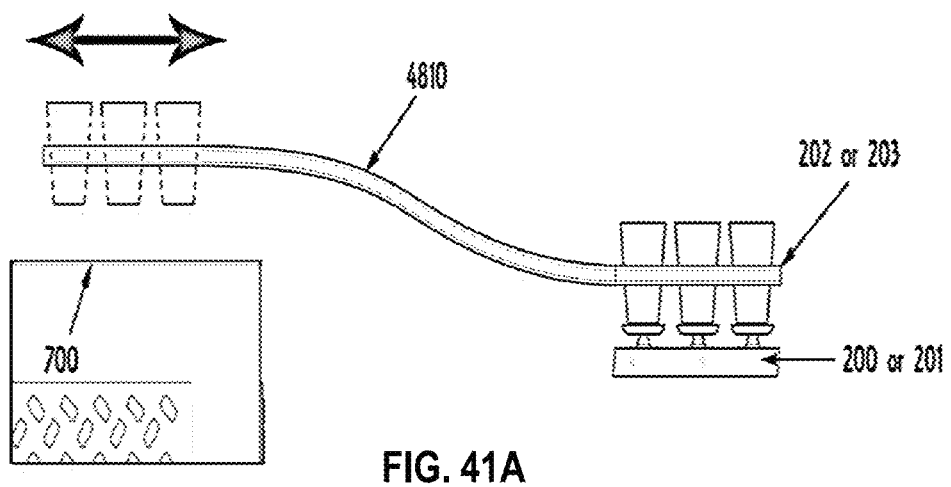
Figure 41B:
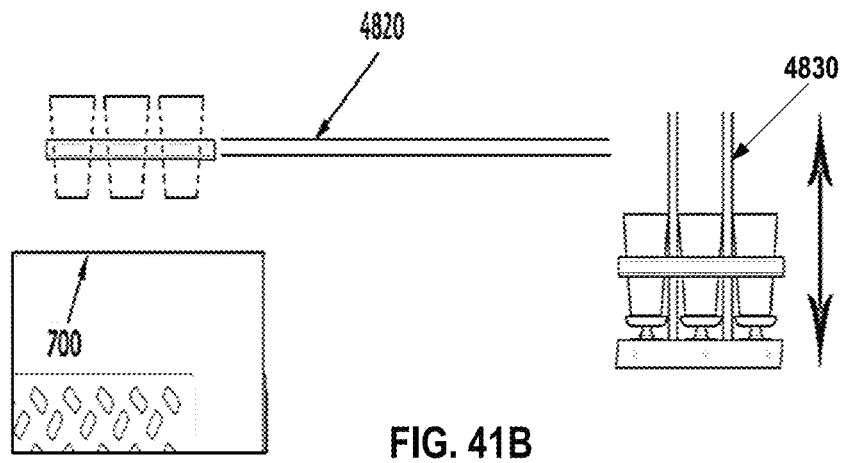
Figure 42:
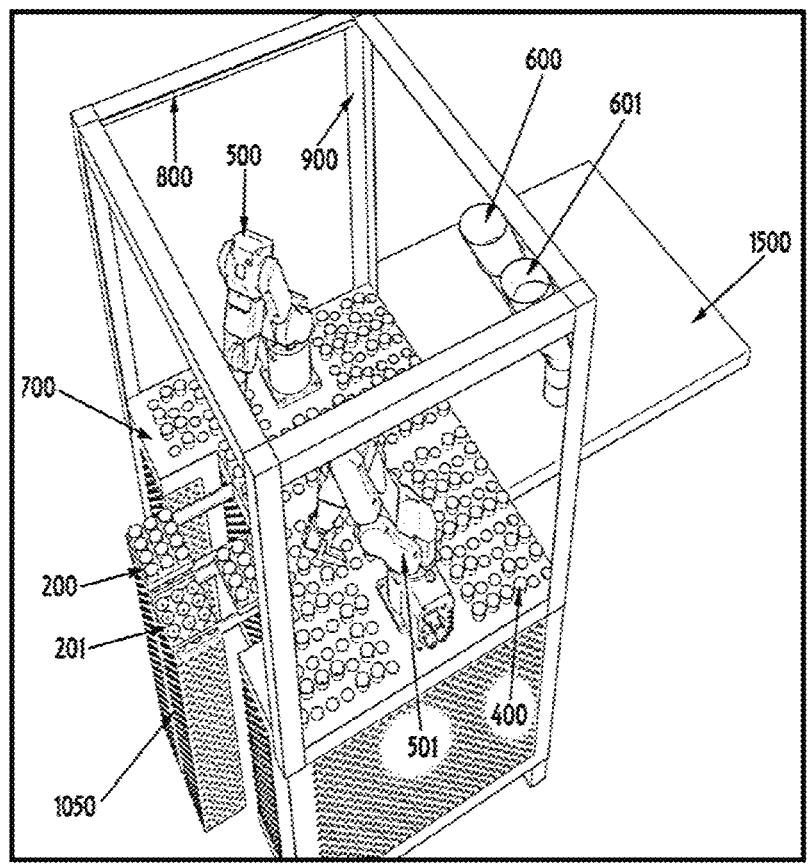

FIGS. 9A, 9B, 9C, and 9D illustrate a working principle of a safety system for the automated system of FIG. 1;

FIG. 10A illustrates a perspective view of a scale system of FIG. 2A, when engaged with the plurality of cups;

FIG. 10B illustrates a perspective view of the shuttle and scale system of FIG. 2A, when disengaged with the plurality of cups;

FIGS. 11A and 11B illustrate top views of the automated system of FIG. 1, with alternating positions of two shuttles of the shuttle and scale system of FIG. 2A;

FIGS. 12A and 12B illustrate front views of scale platforms, of the shuttle and scale system of FIG. 10A, in a first disengaged and then an engaged position, with the respective cups, respectively;

FIG. 12C illustrates resumption of the disengaged position of the scale platforms of the shuttle and scale system of FIG. 10A;

FIG. 12D illustrates a partially enlarged view depicting engagement of a scale platform with a respective cup causing disengagement of the cup with a shuttle of the shuttle and scale system of FIG. 10A;

FIG. 13A illustrates a partial front view depicting a scale platform with a fixed height stem, according to an embodiment of a scale of the shuttle and scale system;

FIG. 13B illustrates an exploded view of the scale of FIG. 13A;

FIG. 14A illustrates a partial front view depicting a scale platform with an extendible stem, according to another embodiment of the scale of the shuttle and scale system;

FIG. 14B illustrates a partial front view depicting a scale platform with a fixed height stem mounted on a dedicated elevating device, according to yet another embodiment of the scale of the shuttle and scale system;

FIG. 14C illustrates an exploded view of the scale of FIG. 14A;

FIG. 14D illustrates an exploded view of the scale of FIG. 14B;

FIG. 15A illustrates a top view of a parallel configuration of scale sensors of the shuttle and scale system for the automated apparatus of FIG. 2A;

FIG. 15B illustrates a top view of a series configuration of the scale sensors of the shuttle and scale system for the automated apparatus of FIG. 1;

FIG. 16A illustrates a perspective view of a robot of FIG. 3;

FIG. 16B illustrates a gripping arrangement for the robot of FIG. 16A;

FIG. 16C illustrates a cup being held by the gripping arrangement of FIG. 16B;

FIGS. 17A and 17B illustrate side views of the gripping arrangement of FIG. 16B, in open and closed positions, respectively;

FIG. 17C illustrates a front view of the gripping arrangement of FIG. 16B, in the closed position;

FIG. 17D illustrates a geometrical relationship between flat parallel bars and a pin of the gripping arrangement of FIG. 16B;

FIGS. 17E and 17F illustrate geometrical relationships of the flat parallel bars and the pin of FIG. 17D, with inner and outer surfaces of a cup, respectively;

FIG. 18 illustrates a partial perspective view of the robot of FIG. 16A, with a cup held with the gripping arrangement;

FIG. 19 illustrates a front perspective view of a robot delivering payload into a receiver of the automated system of FIG. 1;

FIG. 20 illustrates a perspective view of physically inventoried cups with respective payload weight values, and a location coordinate system for locating a cup, in accordance with an embodiment of the present disclosure;

FIG. 21 illustrates an example of a combining algorithms configured to store data for the operation of the automated system 100 of FIG. 1;

FIG. 22 illustrates a process flow diagram for inventorying the plurality of cups in a buffer area of the automated system of FIG. 1, according to an embodiment of the present disclosure;

FIG. 23 illustrates a process flow diagram generating combinations of payload for delivery into the receiver of the automated system of FIG. 1, according to an embodiment of the present disclosure;

FIG. 24 illustrates a process flow diagram for modifying and validating a Robot Drive List (RDL), according to an embodiment of the present disclosure;

FIG. 25 illustrates an environment diagram for enablement of an operator to operate, control and/or monitor the system of FIG. 1, using a Human Machine Interface (HMI);

FIGS. 26A and 26B illustrate top perspective views two independent segments of a buffer area, where the two robots work independently and without overlap, within confines of their respective segments, according to an embodiment of the present disclosure;

FIG. 27 illustrates a top perspective view of an integrated buffer area, according to an embodiment of the present disclosure;

FIGS. 28A and 28B illustrate two exemplary states of the integrated buffer area of FIG. 27;

FIG. 29 illustrates a process flow diagram for transfer of payload arriving into the buffer area, for inventorying onto the work surface or delivering into the receiver, according to an embodiment of the present disclosure;

FIG. 30 illustrates a perspective view of the automated system, depicting direct delivery of the payload of FIG. 29, into the receiver;

FIG. 31 illustrates a perspective view of the automated system, depicting inventorying of the payload of FIG. 29, onto the work surface;

FIG. 32A illustrates a process for direct delivery of a payload that individually meets the target weight range, into the receiver, according to an embodiment of the present disclosure;

FIG. 32B illustrates a process for delivery of a payload that does not individually or in combination with another payload, meets the target weight range, into the receiver, according to an embodiment of the present disclosure;

FIG. 33 illustrates an environment diagram for the implementation of the RDL, according to an embodiment of the present disclosure;

FIGS. 34A, 34B, and 34C illustrate a pictorial representation of weighing of the payload with a taring step involving weighing of an empty cup, according to an embodiment of the present disclosure;

FIGS. 35A and 35B illustrate a pictorial representation of weighing of the payload without a taring step involving the weighing of a filled cup of known weight, according to an embodiment of the present disclosure;

FIG. 36 illustrates a delivery assist nozzle provided within the gripping arrangement of FIG. 16B;

FIG. 37 illustrates a front perspective view of a gas-assisted receiver, according to an embodiment of the present disclosure;

FIGS. 38A and 38B illustrate two exemplary designs of the receiver, according to several embodiments of the present disclosure;

FIG. 39 illustrates a front perspective view of an automated system for sorting and combining varying density payloads, employing one or more of a conveyor and a turntable, according to yet another embodiment of the present disclosure;

FIG. 40 illustrates a manual filling of cups, according to several embodiments of the present disclosure;

FIGS. 41A and 41B illustrate two embodiments of a rail system for the translation of the shuttles and mechanical engagement with the scales of the shuttle and scale system for the automated system, according to several embodiments of the present disclosure; and FIG. 42 illustrates a scale platform using a foundation, according to several embodiments of the present disclosure.

DETAILED DESCRIPTION

While the present disclosure is described herein by way of example using embodiments and illustrative drawings, those skilled in the art will recognize that the disclosure is not limited to the embodiments of drawing or drawings described, and are not intended to represent the scale of the various components. Further, some components that may form a part of the disclosure may not be illustrated in certain figures, for ease of illustration, and such omissions do not limit the embodiments outlined in any way. It should be understood that the drawings and detailed description thereto are not intended to limit the disclosure to the particular form disclosed, but on the contrary, the disclosure is to cover all modifications, equivalents, and alternatives falling within the scope of the present disclosure as defined by the appended claims. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited, and is not intended to exclude other additives, components, integers or steps. Likewise, the term "comprising" is considered synonymous with the terms "including" or "containing" for applicable legal purposes. Any discussion of documents acts, materials, devices, articles, and the like is included in the specification solely to provide a context for the present disclosure. It is not suggested or represented that any or all of these matters form part of the prior art base or were common general knowledge in the field relevant to the present disclosure.

In this disclosure, whenever a composition or an element or a group of elements is preceded with the transitional phrase "comprising", it is understood that we also contemplate the same composition, element or group of elements with transitional phrases "consisting of, "consisting", "selected from the group of consisting of, "including", or "is" preceding the recitation of the composition, element or group of elements and vice versa.

The present disclosure is described hereinafter by various embodiments with references to the accompanying drawings, wherein reference numerals used in the accompanying drawing correspond to the like elements throughout the description. This disclosure may, however, be embodied in many different forms and should not be construed as limited to the embodiment set forth herein. Rather, the embodiment is provided so that this disclosure will be thorough and complete and will fully convey the scope of the disclosure to those skilled in the art. In the following detailed description, numeric values and ranges are provided for various aspects of the implementations described. These values and ranges are to be treated as examples only and are not intended to limit the scope of the claims. Also, several materials are identified as suitable for various facets of the implementations. These materials are to be treated as exemplary and are not intended to limit the scope of the disclosure.

As used herein, the term "operation" includes "continuous," "near-continuous," "continuously," or "near continuously," which means the machine is intended to run and/or produce nonstop, but do not preclude pausing, stopping or interruption may occur. It will be further understood that the term "operation" includes "continuous," "near-continuous," "continuously," or "near continuously" to differentiate the machine from a "batch," type, which runs a cycle or a limited number of activities, but once exhausted it then requires resetting, clearing, or purging before initiating a new cycle.

The present disclosure discloses a packaging filler system that performs operations of weighing, sorting, and combining a piece or pieces (alternatively termed as 'payloads' in the specification), as discussed herein. The pieces/products/materials are not limited to *cannabis*, agricultural products, precious metal, radioactive materials, pharmaceuticals, and other high-value or hazardous materials/products/pieces which can be processed with this system. In the following description, for purposes of explanation, numerous specific details are outlined to provide a thorough understanding of the present invention. It will be evident to one skilled in the art that the present invention may be practiced without these specific details.

The present disclosure is to be considered as an exemplification of the invention, is not intended to limit the invention to the specific embodiments illustrated by the figures or description below. The present disclosure will now be described by referencing the appended figures representing preferred embodiments.

The disclosure according to the various embodiment provides a system, method, and apparatus for performing operations, such as, but not limited to, evaluation, weighing, sorting, inventorying, combining, and depositing of individual pieces or assembly of piece combinations which meet a Target Weight Range (TWR). One or more pieces of same or distinct weights are combined into a discrete group or a single piece unit for packaging which falls within a specified TWR.

The continuous infeed of pieces is accomplished via an automated shuttle system. The shuttle weighing system is comprised of two parts; multiple sets of scale sensors and a mechanical shuttle that transports sets of cups between the scale sensors and a buffer area, wherein the plurality of cups carrying pieces are transported from the scale sensors to the buffer area and the plurality of cups having been emptied of their contents are transported from the buffer area back to the scale sensors for refilling. The scale sensors near simultaneously or simultaneously weigh multiple cups containing pieces. The shuttle transports the weighed cups into the buffer area for aggregation into piece sets for packaging. An aggregate, in that regard, may also be comprised of contents of just one cup having one or more pieces.

The present disclosure provides a pack fill system that combines the payloads to achieve a package target weight with predefined accuracy. The system weighs and combines pieces to achieve the target weight and accuracy. In that regard, the system weighs, sorts, and combines to reduce overfill, while not going under target weight, after weighing, sorting, and combining payloads according to various embodiments of the present invention. Referring to the figures, the invention will now be described in further detail.

FIG. 1 illustrates a top perspective view of an automated continuous or near-continuous system 100 (hereinafter referred to as "the automated system 100") for sorting and combining varying density payloads, according to an embodiment of the present disclosure. The automated system 100 includes a buffer area 1200 including a work surface 700 having a plurality of holes 701 for storing cups 400 with weighed payloads. The use of the work surface 700 for inventorying the plurality of cups 400 provides the advantage of greater payload density or inventorying density when compared with the state of the art that uses many trays removed and added in a nesting fashion. The automated system 100 also includes a shuttle and scale system 250 configured for weighing and near continuously or continuously delivering the plurality of cups 400 with the payloads, to the buffer area 1200.

FIG. 2A illustrates a partial perspective view of a shuttle and scale system 250 for the automated system 100 for sorting and combining varying density payloads, of FIG. 1. The shuttle and scale system 250 includes a plurality of shuttles 202 and 203 and a plurality of scales 200 and 201. Each one of the plurality of scales 200 and 201 have been provided with an automated weighing mechanism configured for the weighing of the payloads 333. The plurality of shuttles 202 and 203 have been configured for transporting the plurality of cups 400 in and out of the buffer area 1200. The plurality of shuttles 202 and 203, in that regard, alternately transport the plurality of cups 400 containing weighed payloads 333 into a buffer area 1200, which is comprised of the work surface 700 constructed in form of a table and the inbound shuttle 202 or 203. In that regard, the buffer area 1200 is the region where the robots 500 and 501 can pick a cup 400 from and/or place a cup 400 in. The system 100 has been provided with control architecture that determines which of the plurality of cups 400 with the payloads 333 to combine in receivers 600 and 601 for deposit into a package.

Figure 2B:
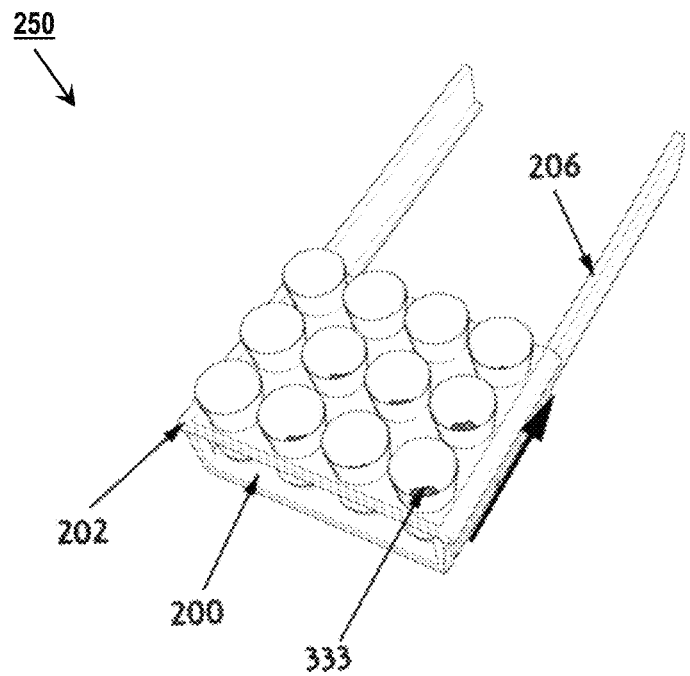
FIG. 2B illustrates a first state of the shuttle and scale system of FIG. 2A.
Figure 2C:
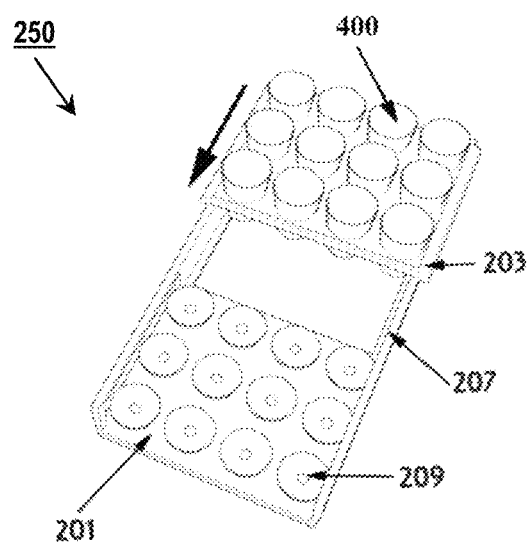
FIG. 2C illustrates a second state of the shuttle and scale system of FIG. 2A.

As illustrated in FIG. 2A, the shuttle 202, and the shuttle 203 are configured for alternatively transferring the plurality of cups 400 with the payloads 333 into the buffer area 1200 and transferring empty the plurality of cups 400 out of the buffer area 1200 back to the scale 200 or the scale 201 respectively for refilling. FIG. 2B illustrates a first state of the shuttle and scale system 250 of FIG. 2A. FIG. 2B depicts the shuttle 202, a shuttle frame 206, and the scale 200. The shuttle 202 is configured for traversing along with the shuttle frame 206 and transferring a plurality of cups 400 containing the respective payloads 333 into the buffer area 1200. FIG. 2C illustrates a second state of the shuttle and scale system 250 of FIG. 2A. FIG. 2C depicts the shuttle 203, another shuttle frame 207, and the scale 201. In FIG. 2C illustrates the shuttle 203 configured for carrying a plurality of empty cups 400 which are transported from the buffer area 1200 out to be refilled and weighed. The direction and function of shuttles 202 and 203 of the FIG. 2B and FIG. 2C, respectively, will also alternate.

The shuttle frames 206 and 207 may include varying types of precision linear actuating type mechanisms to cause translation of the shuttles 202 and 203, respectively, and monitor their positions in and out of the buffer area 1200, with a predetermined accuracy. Types of linear actuators may include a linear actuator slide, servo slide, pneumatic actuator, stepper motor, or ball screw drives, etc. The scales 200 and 201 are configured for weighing multiple items near simultaneously or simultaneously due to a design of the scale 200 and 201 and components they are comprised of, including the scale platforms 209.

FIG. 3 illustrates a perspective view of two robots 500 and 501 configured for removing and replacing cups 400 for the automated system 100 of FIG. 1. The robots (or robotic arms) 500 and 501 have been provided within the buffer area 1200. During operation, a shuttle, for example, the shuttle 202 or the shuttle 203, holds a plurality of the plurality of cups 400 containing the payloads 333 that has been weighed. The measured weight data of payloads 333 in the plurality of cups 400 is stored and maintained in a combining algorithm in a computer memory that acts as a data storage device. The robots 500 and 501 each are configured to pick up a cup 400 from the shuttle (202 or 203) and place it on the work surface 700 or deliver the payloads 333 in the receivers 600 or 601 respectively. The robots 500 and 501 may return the empty the plurality of cups 400 to the shuttle (202 or 203) after the execution of either activity, achieving a full set of the empty the plurality of cups 400 in the shuttle (202 or 203). The shuttle (202 or 203) then transports the plurality of cups 400 out of the buffer area 1200 and to the scales 201 or 202, where the process is repeated i.e. fill, weigh, and shuttle. This process is similar for the shuttle 202 and the scale 200.

Figure 4:
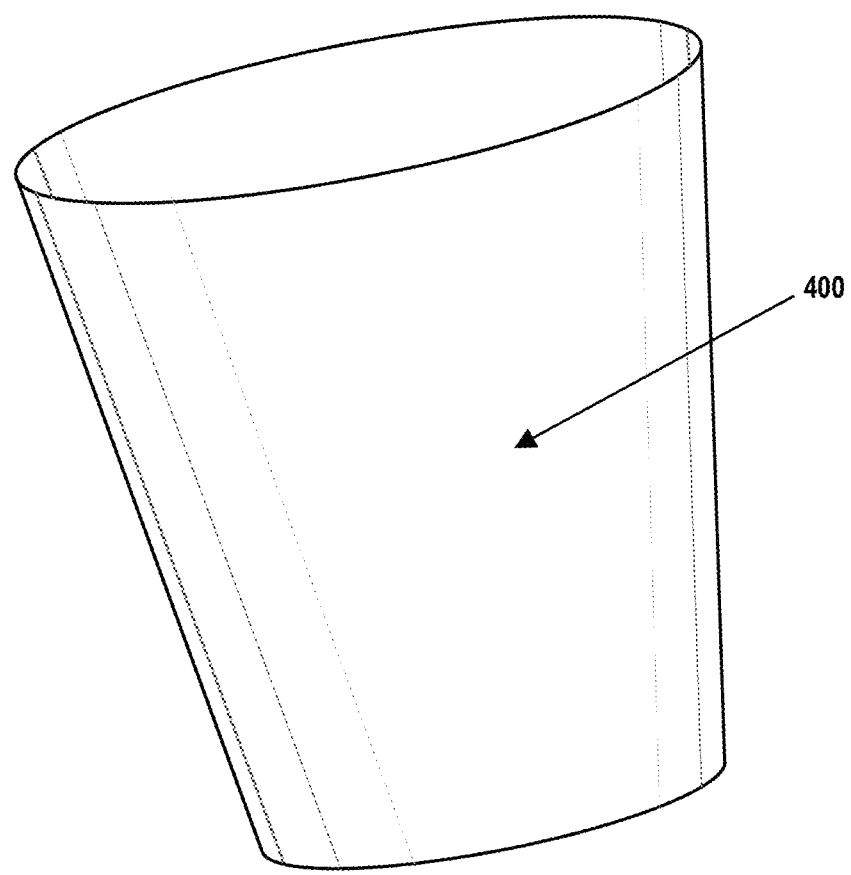
FIG. 4 illustrates a perspective view of a cup for the automated system of FIG. 1.

FIG. 4 illustrates a perspective view of a cup 400 for the automated system 100 of FIG. 1. As illustrated, the cup 400 may be configured with or without taper. The interior and exterior may or may not be comprised of groves or ridges. The cup 400 may be made from aluminum, stainless, plastic, fiberglass, carbon, polymers, alloys, or any other suitable material that is preferably lightweight yet strong enough to support varying degrees of weight. In some embodiments, the plurality of cups 400 may have varying dimensions. The plurality of cups 400 can also be designed with additional design features for better gripping, handling, and clearing, etc. as will be discussed in the following discussion. Examples of additional design features include, but are not limited to, hooks, brackets, textured, pins, cavities, recesses, a lip at top of a cup and vacuum cups, etc. Further, the plurality of cups 400 may also have design features included which assist in ejection of the payloads 333 by reducing sticking, friction, or exit delay of payloads 333. Examples of ejection assist features include texture, coatings, or cup material shape such as corrugated, bumps, points, etc.

Figure 5:
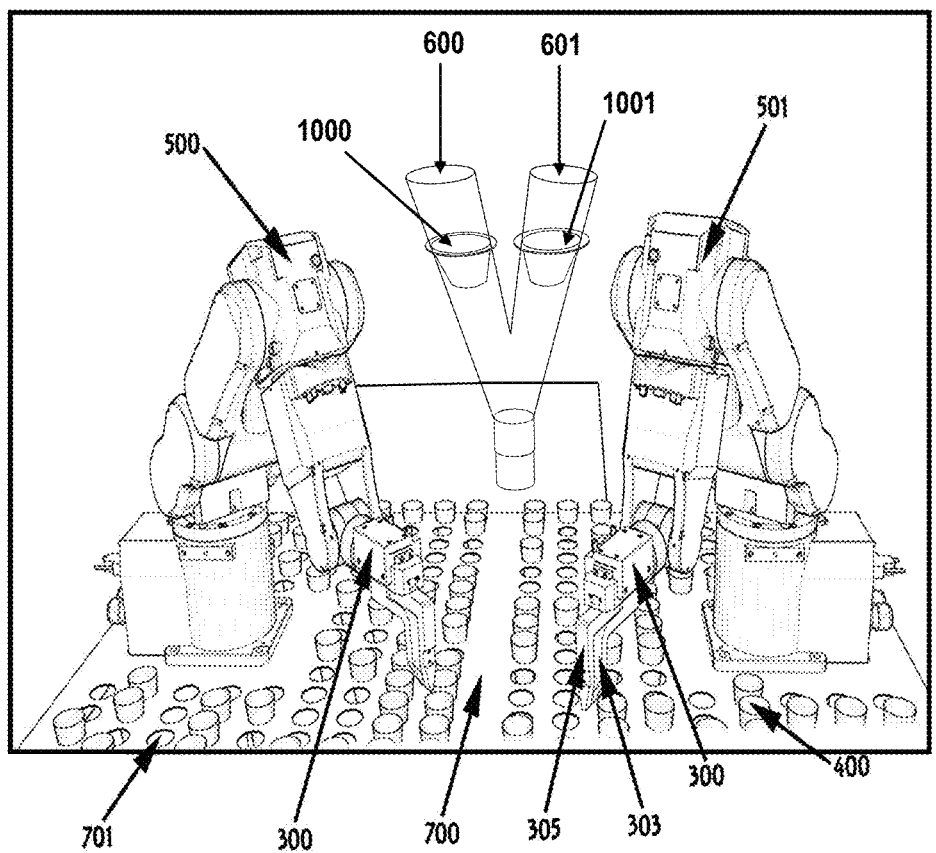
FIG. 5 illustrates a front perspective view of the automated system of FIG. 1.

FIG. 5 illustrates a front perspective view of the automated system 100 of FIG. 1. FIG. 5 illustrates the robots 500 and 501 configured for picking up and placing the plurality of cups 400 from and to the work surface 700 inventory while also transporting them to the receivers 600 or 601 for delivering the payloads 333. Upon reaching receiver 600 or 601 the robots 500 or 501 will deliver the payload 333. One or more payloads 333 are delivered into receiver 600 or 601 to make combinations that meet a predetermined Target Weight Range (TWR).

The robots 500 and 501 illustrated in FIG. 5 represents one example of the type of robot that can be used in this application. The robots 500 and 501 can deliver the cups 400 by rotating grippers 300 that are capable of achieving angles of rotation greater than 180 degrees, from vertical to upside down, and can do this while moving which simulates a throwing action. The ability to deliver or throw payloads 333 may eliminate the need for additional processing aids and mechanisms. Furthermore, the robots 500 and 501 can be utilized in differing types of configurations for this application, wherein the robot 500 and 501 are illustrated as uprightly mounted on to work surface 700.

Figure 6:
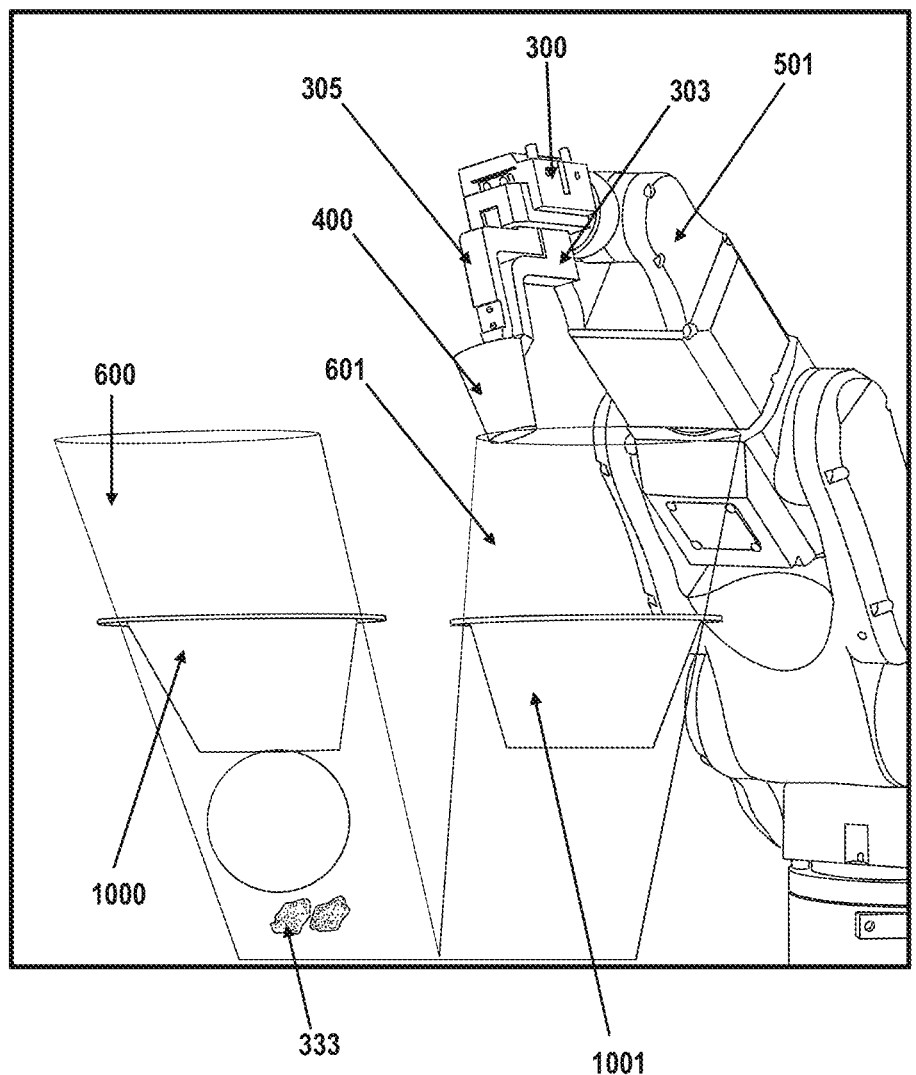
FIG. 6 illustrates a front perspective view of multiple receivers with accumulators for the automated system of FIG. 1.

FIG. 6 illustrates a front perspective view of the multiple receivers 600 and 601 with accumulators 1000 and 1001 for the automated system 100 of FIG. 1. For example, the accumulator 1001 receives a payload 333 from a cup 400 that is secured by fingers 303 and 305, where a gripper 300 applies a compression force to the fingers 303 and 305 on sidewalls of the cup 400, so that the cup 400 is held securely during robot 501 deliver activity. Furthermore, the accumulators 1000 and 1001 may also be comprised of a check scale. The check scale is built into the accumulator and verifies the weight of payloads 333 delivered into the receivers 600 or 601. The check scale can also verify if the plurality of cups 400 released full payload 333.

Figure 7:
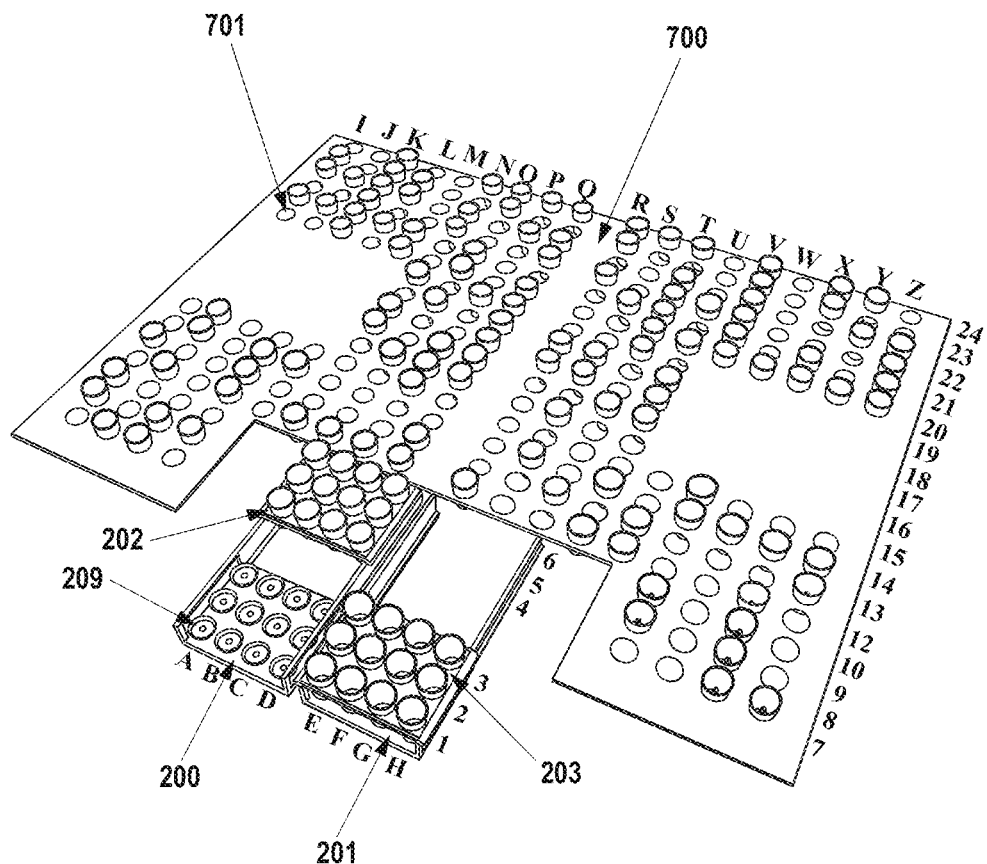
FIG. 7 illustrates a perspective view of a work surface for inventorying the plurality of cups for the automated system of FIG. 1.

FIG. 7 illustrates a perspective view of the work surface 700 for inventorying the plurality of cups 400 for the automated system 100 of FIG. 1. The work surface 700 is depicted to include the plurality of holes 701 and/or a plurality of cups 400. The plurality of holes 701 has diameters smaller than the largest diameters of the plurality of cups 400 to enable the plurality of cups 400 to be suspended, or not fully pass, through the plurality of holes 701. This enables sufficiently large surfaces of the plurality of cups 400 to protrude above the work surface 700 so that robots 500 or 501 can secure the plurality of cups 400 with the fingers 303 and 305. Location coordinates of the plurality of cups 400, with or without payloads 333, and the plurality of holes 701, with or without a cup 400, are designated by a row number 7-24 and column letter I-Z. The plurality of holes 701 of the work surface 700 is also designed so that dirt and debris are unable to collect due to an open hole design which allows dirt and debris to pass through and avoid potential interference with the plurality of cups 400 seating properly. The work surface 700 is also designed to enable the robots 500 and 501 to have a full reach to any of the plurality of cups 400.

Figure 8:
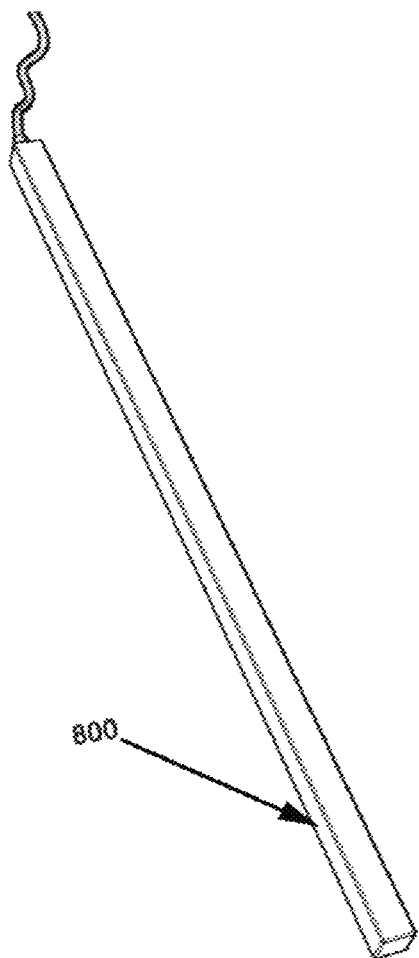
FIG. 8 illustrates an exemplary work environment lighting device for the automated system of FIG. 1.

FIG. 8 illustrates an exemplary work environment lighting device 800 for the automated system 100 of FIG. 1. The automated system 100 is envisaged to include several lighting devices 800 mounted above the buffer area 1200. The positioning and mounting angle of the lighting devices 800 provide two key functional elements to enable productivity and avoid human fatigue. In the example illustrated herein, the lighting devices 800 provide adequate saturation of light from specific angles to avoid shadowing and flickering area shading. Avoiding light shading provides operators with a clearer vision of a dynamic work environment. The automated system 100 is also envisaged to include a safety system including light curtain transmitters and receivers.

Figure 9A:
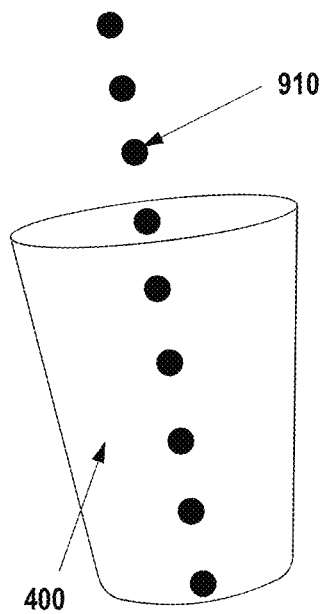
Figure 9B:
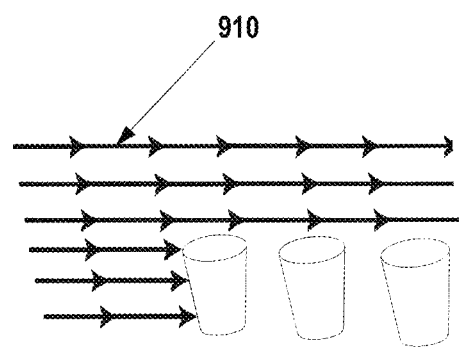
Figure 9C:
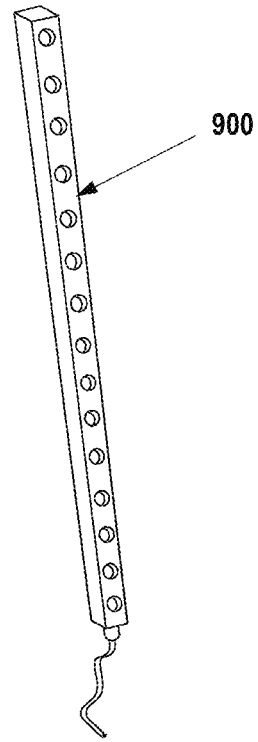

FIG. 9A is a side perspective view of beams of light curtain 910 contacting a cup 400 that is being transported by the shuttle 202 or 203. FIG. 9B is a front perspective view of a plurality of the plurality of cups 400 on the shuttle 202 or 203 moving perpendicularly through the light curtain 910 not causing the system to stop. The safety system is configured to recognize the shape and size of the shuttle 202 or 203 with the plurality of cups 400 and not trigger the automated system 100 to stop. FIG. 9C represents a transmitter or a receiver 900. The transmitters and receivers 900 would be positioned in each corner to transmit or receive light signals along the side of the unit.

Figure 9D:
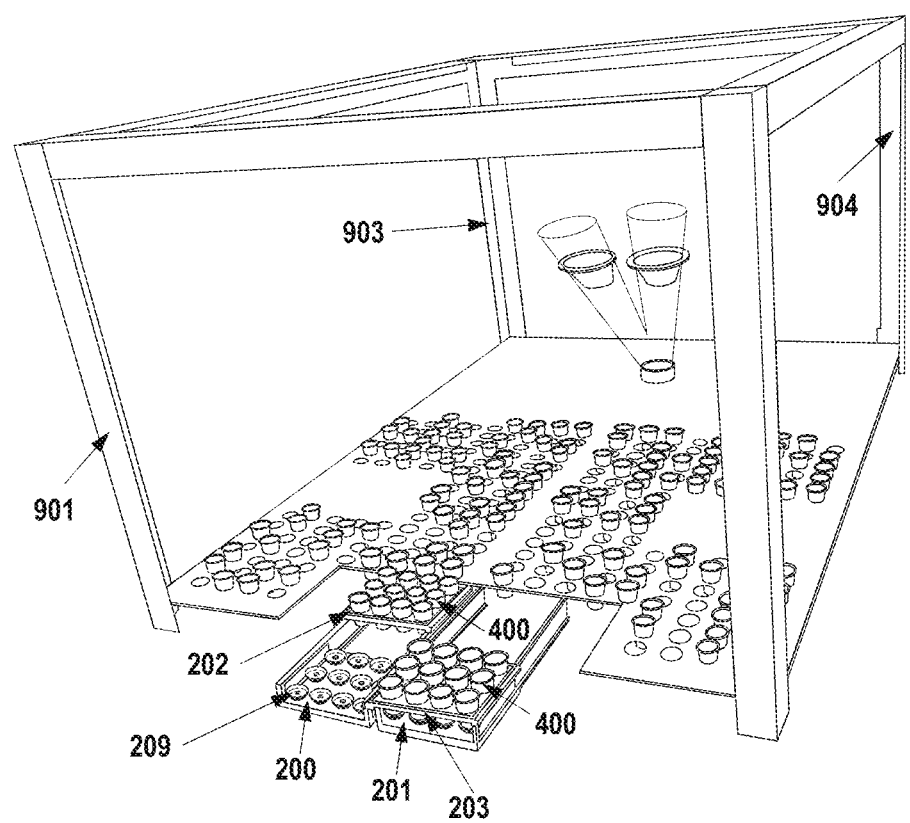

FIG. 9D illustrates mounting locations of the transmitters and receivers 900 in the buffer area 1200. FIG. 9D shows the locations 901, 902, 903, and 904 where the transmitters and receivers 900 are envisaged to be located. Illustrated herein FIG. 9D is an example of a configuration that allows shuttles 202 or 203 with the plurality of cups 400 to cross light curtain 910 while robots 500 and 501 are in motion without causing the automated system 100 to pause. For instance, the location 901 would have a transmitter that emits a signal to a receiver located at 902 and together would detect a perimeter breach along that side from the work surface 700 up to the lighting device 800. Three other pairs of transmitters and receivers 900 would be mounted and perform similarly between the sides illustrated as 902-904, 904-903, and 903-901. The perimeter safety light curtain protects the operators and system elements from harm by stopping all activity of the robots 500 and 501 when light curtain 910 is crossed.

FIG. 10A illustrates a perspective view of the scale 200 of the shuttle and scale system 250 of FIG. 2A, when engaged with the plurality of cups 400. FIG. 10A depicts the shuttle 202 over the scale 200 allowing the plurality of cups 400 to be transferred and filled with the payloads 333. The scale platforms 209 engage with the plurality of cups 400 and the net weight of the plurality of cups is determined and stored in the combining algorithm. The scale platforms 209 rise vertically to engage the plurality of cups 400 which pushes the plurality of cups 400 upwards and clear of the shuttles 202 or 203. The plurality of cups 400 is then weighed empty and then with the payloads 333. Weighing functions of the payloads 333 are performed outside of the buffer area 1200. One of the functions of the scale platforms 209 is to raise and disengage the plurality of cups 400 from the shuttles 202 and 203 frames so that the shuttles 202 or 203 do not interfere with the weighing of the plurality of cups 400.

FIG. 10B illustrates a perspective view of the scale 200 of the shuttle and scale system 250 of FIG. 2A, when disengaged with the plurality of cups 400. FIG. 10B depicts the shuttle 203 transferring the plurality of cups 400 with the payloads 333 into the buffer area 1200, where they will be delivered in receiver 600 or 601 or inventoried on to the work surface 700. Once each of these activities is completed in these positions, the shuttles 202 and 203 switch their positions and repeat the process.

FIGS. 11A and 11B illustrate top views of the automated system 100 of FIG. 1, with alternating positions of the two shuttles 202 and 203 of the shuttle and scale system 250 of FIG. 2A. FIG. 11A illustrates the shuttle 202 transferring the plurality of cups 400 with weighed payloads 333 into the buffer area 1200, simultaneously the shuttle 203 moves out of the buffer area 1200 with an empty set of the plurality of cups 400 and position over scale 201 at the respective scale platforms 209. FIG. 11B illustrates shuttles 202 and 203 "switching" positions; the shuttle 202 moves out of the buffer area 1200 with the empty cups 400 and is positioned over the respective scale platforms 209, at the scale 200. Further, the shuttle 203 is simultaneously transferring a plurality of cups 400 with weighed payloads 333 into the buffer area 1200. The process repeats these cycles to provide the continuous supply of the plurality of cups 400 with the payloads 333.

FIGS. 12A and 12B illustrate front views of the scale platforms 209, of the shuttle and scale system 250 of FIG. 10A, in a first disengaged and then an engaged position, with the respective plurality of cups 400, respectively. FIG. 12A illustrates distance gap 1210 allowing the shuttle 202 to move the plurality of cups 400 into position over the scale 200 and the respective scale platforms 209. FIG. 12B illustrates the elevated scale platforms 209 engaging the plurality of cups 400 and raising them to create a separation 1220 from the shuttle 202. The separation 1220 between the plurality of cups 400 and the shuttle 202 eliminates weighing interference due to contact between the shuttle 202 and the cup 400. The scale 200 then weighs the plurality of cups 400 when empty and then the plurality of cups 400 are then filled with the payloads 333, then the scale 200 reweighs the plurality of cups 400. FIG. 12C illustrates resumption of the disengaged position of the scale platforms 209 of the shuttle and scale system 250 of FIG. 10A. The lowering of the scale platforms 209 lower the plurality of cups 400 back onto the shuttle 202 and resumes the distance gap 1210. FIG. 12D illustrates a partially enlarged view depicting engagement of a scale platform 209 with a respective cup 400 causing disengagement of the cup 400 with the shuttle 202 of the shuttle and scale system 250 of FIG. 10A.

FIG. 13A illustrates a partial front view depicting the scale isolator platform 209 with a fixed height stem 1303, according to an embodiment of the shuttle and scale system 250. The scale platform 209 with the fixed height stem 1303 is connected to a scale sensor 1301 that is mounted onto a scale base 1302. The scale platforms 209 are connected to the scale sensors 1301 through the fixed height stems 1303, to transfer the weight of the plurality of cups 400 onto the scale sensors 1301. The scale sensor 1301 and the scale base 1302 rise together to enable the scale platforms 209 to engage with the plurality of cups 400. The scale base 1302 rises and retracts between points 1360 and 1350, equal to gap 1210. FIG. 13B illustrates an exploded view of the shuttle and scale system 250 of FIG. 13A. The scales 200 and 201 comprised of the scale base 1302 which near simultaneously or simultaneously elevating the plurality of scale sensors 1301 with the associated scale platforms 209 and the stems 1303.

FIG. 14A illustrates a partial front view depicting the scale platform 209 with an extendible stem 1450 mounted on the scale base 1302, according to another embodiment of the shuttle and scale system 250. The extendible stem 1450 extends independent of the scale sensor 1301 to raise the scale platform 209 independent of the other scale platforms 209 contained in the scale 200 or 201. FIG. 14B illustrates a partial front view depicting the scale platform 209 with the fixed height stem 1303 mounted on a dedicated elevating device 1401, according to yet another embodiment of the shuttle and scale system 250. The dedicated elevating device 1401 is capable of extending upwards with respect to the scale base 1302 that remains stationary. The dedicated elevating device 1401 is capable of independently elevating the entire assembly comprised of the scale sensor 1301, the stem 1303, and the scale platform 209. FIG. 14C illustrates an exploded view of the shuttle and scale system of FIG. 14A. FIG. 14D illustrates an exploded view of the shuttle and scale system of FIG. 14B. FIG. 14D depicts components of the assembly comprised of the scale sensor 1301, the stem 1303, and the scale platform 209 with the addition of the dedicated elevating device 1401. The dedicated elevating device 1401 raises the assembly components in unison to cause the scale platform 209 to elevate a cup 400. Each scale sensor 1301 may utilize a dedicated elevating device 1401.

FIG. 15A illustrates a top view of a parallel configuration of the scale sensors 1301 of the shuttle and scale system 250 for the automated system 100 of FIG. 1. The illustration depicts each scale sensor 1301 connected to a discrete parallel processor 1552. The discrete parallel processors 1552 is utilized to obtain streaming data from each scale sensor 1301. The discrete parallel processors 1552 sends data through connection 1502 to computer 2701. FIG. 15B illustrates a top view of a series configuration of the scale sensors 1301 of the shuttle and scale system 250 for the automated system 100 of FIG. 1. FIG. 15B illustrates a data series processor 1501, designed for sampling data from a plurality of scale sensors 1301 wired into one or more data series processor 1501. The data series processors 1501 are multichannel units, each scale sensor 1301 is connected to a discrete channel in the data series processors 1501 through connection 1503. The data series processors 1501 can handle a group of scale sensors 1301 and utilizes a round-robin method of sampling data from each group of scale sensors 1301. The round-robin method samples data from each scale sensor 1301 sequentially. The output of the data series processor 1501 is sent through connection 1502 to the system computer 2701.

FIG. 16A illustrates a perspective view of the robot 500 of FIG. 3. FIG. 16A illustrates the robot 500 with the fingers 303 and 305 attached to the gripper 300 on the robot 500 to secure the plurality of cups 400. The fingers 303 and 305 are considered a set and work together in the picking and placing of the plurality of cups 400 in this system. FIG. 16B illustrates a gripping arrangement for the robot 500 of FIG. 16A. FIG. 16B illustrates a design for firmly gripping of the plurality of cups 400 with a pin 1602 and flat parallel bars 1601. The fingers 303 and 305 may include an offset design to enable longer reach when the robots 500 or 501 are in any configuration. The finger 303 is designed with an offset and angled feature to allow for clearance when picking the plurality of cups 400 that are closely nested.

The fingers 303 and 305 can be comprised of varying materials such as high-density tool steel, stainless steel, aluminum, carbon fiber, alloy, plastic, or any other suitable material. FIG. 16C illustrates a cup 400 being held by the gripping arrangement of FIG. 16B. The depiction shows the outer finger 303 contacting the cup 400 on the outside wall surface, while the inner finger 305 contacts the cup 400 on the inside wall surface. The fingers 303 and 305 open and close along an axis dictated by the gripper 300, i.e., the fingers 303, 305 move in opposing directions to open. The gripper 300 also moves the fingers 303 and 305 towards each other with a force adequate to secure the cup 400. The applied force or pressure applied to the cup 400 through the fingers 303 and 305 is adequate to execute the cup 400 transport with minimal or no movement within the fingers 303 and 305.

FIGS. 17A and 17B illustrate side views of the gripping arrangement of FIG. 16B, in open and closed positions, respectively. FIG. 17A illustrates the fingers 303 and 305 securing the cup 400 for purposes of picking, placing, transporting, and delivering. The finger 305 is positioned at the interior of the cup 400 and the finger 303 is positioned at the exterior of the cup 400. The finger 305 has a pin 1602 that makes contact with an interior wall of the cup 400 and the finger 303 has two flat parallel bars 1601 that contact an exterior wall of the cup 400. The pin 1602 is not limited to circular cross-sections alone, but the shape of the cross-section may also include other shapes such as ellipse, ovular, triangular, and rectangular or any other polygonal geometry. The pin 1602 and the flat parallel bars 1601 work in conjunction to secure and maintain cup 400 positions relative to the fingers 303 and 305 throughout static or dynamic activities. FIG. 17B illustrates from a side perspective view of the flat parallel bars 1601 and the pin 1602.

FIG. 17C illustrates a front view of the gripping arrangement of FIG. 16B, in the closed position. FIG. 17C illustrates the pin 1602 with a cutaway view of the fingers 303 and 305 closed, the cut-away or through view illustrates the positioning of the pin 1602 relative to flat parallel bars 1601. The pin 1602 is situated between the flat parallel bars 1601. FIG. 17D illustrates a geometrical relationship between the flat parallel bars 1601 and the pin 1602 of the gripping arrangement of FIG. 16B. In FIG. 17D the pin 1602 is situated at position between center lines of the flat parallel bars 1601. FIGS. 17E and 17F illustrate geometrical relationships of the flat parallel bars 1601 and the pin 1602 of FIG. 17D, with inner and outer surfaces of the cup 400, respectively. FIG. 17E illustrates a side view of the flat parallel bars 1601 with the corresponding angle 1710 to match the exterior wall of the cup 400. FIG. 17F illustrates the pin 1602 and the flat parallel bars 1601 securing the cup 400 and making an angle 1710 with the exterior wall of the cup 400. The angle 1710 can range from 0 degrees to 45 degrees.

FIG. 18 illustrates a partial perspective view of the robot 500 of FIG. 16A, with a cup 400 held with the gripping arrangement. The plurality of holes 701 is utilized for holding the plurality of cups 400 in such a manner to allow the robots 500 or 501 to secure the plurality of cups 400 and transport to or from the plurality of holes 701. In this example, the cup 400 is being placed into the hole 701, for inventorying on the work surface 700. The robots 500 or 501 may also pick and place the plurality of cups 400 in holes located on shuttles 202 or 203.

FIG. 19 illustrates a front perspective view of the robot 500 delivering payloads 333 into the receiver 600 of the automated system 100 of FIG. 1. The robot 500, the gripper 300, the finger 303, the finger 305 all work in conjunction to cause the payload 333 to eject, deliver, throw or evacuate the cup 400 for depositing into the receiver 600. The example applies to either of the robots 500 or 501 and the receivers 600 or 601, respectively. The payloads 333 then may rest in accumulators 1000 or 1001 until they are released and dropped down into a package.

FIG. 20 illustrates a perspective view of physically inventoried cups 400 with respective payload weight values, and a location coordinate system for locating a cup 400. The plurality of cups 400 with the payloads 333, the plurality of cups 400 without payloads 333 and vacant holes 701 are tracked and located by using a system of location coordinates shown in FIG. 20, each tracked item is designated with a row number (1-24) and column letter (A-Z). The location coordinate system is applied to all locations on the work surface 700, the shuttles 202 and 203, and the scales 200 and 201. Tracking and inventory data associated with each one of the plurality of cups 400 and the plurality of hole 701 is stored in the inventory 21a, associated data includes payloads 333 weight values and coordinates. An example of payloads 333 weight value is illustrated as the value with two decimal places, i.e. 0.06 weight at position 7Z. Empty the plurality of cups 400 and holes 701 coordinate data are also stored in the inventory 21a. Each location has designated coordinates pre-programmed for the robot 500 or 501 to locate the plurality of cups 400 for pickup or locate the plurality of holes 701 for placement.

Table 1 is depicting the optimization program subroutines functions list required to run the automated system 100. The subroutines procedures list is not to be considered comprehensive or complete, but an example of subroutines which comprise a significant part of the required subroutines to run the automated system 100 as shown in FIG. 1.

TABLE 1

| Sr. No. | Procedure |
| --- | --- |
| 1. | Scale loading |
| 2. | Fill robot 1 half of workspace |

TABLE 1-continued

| Sr. No. | Procedure |
| --- | --- |
| 3. | Fill robot 2 half of workspace |
| 4. | Robot 1 & 2 synchronized use of full workspace |
| 5. | Cup of rejection |
| 6. | Check Weigher release/reject alert |
| 7. | Cup dump air assist |
| 8. | Algorithm 1 half of workspace |
| 9. | Algorithm 2 half of workspace |
| 10. | Algorithm Robot 1 & 2 synchronized use of full workspace |
| 11. | Algorithm shutdown mode |
| 12. | Partially filled work surface run mode |
| 13. | Varying gram size bags |
| 14. | Clear work surface and dump cups in recycle |
| 15. | Cleaning sequence |
| 16. | Calibration of scale, shuttle and trap doors |
| 17. | Scale shuttle control |
| 18. | Scale tare/fill/weigh/overfill alert sequence control |
| 19. | Maintenance |
| 20. | Testing and turning of system |
| 21. | Robot programming |
| 22. | Report of key metrics |
| 23. | Home page for system setup |
| 24. | Status of operation |
| 25. | Performance metrics |
| 26. | Alarm logic |
| 27. | Unused cup routine |
| 28. | Sheared arrays packaging b |
| 29. | Robot logic during shuttle |
| 30. | Robot pick and place at shuttle |
| 31. | Packaging HMI |
| 32. | Packaging bin trap door 1 & 2 robot |
| 33. | Cup filling guidance to imp |
| 34. | HMI for setting target weighing |
| 35. | Robot 1 & 2 optimal cup trap |
| 36. | Safety system logic |
| 37. | Overweight of cup fill alarm |
| 38. | HMI screen (i.e. home, cup) |

FIG. 21 illustrates an example of a combining algorithm configured to store data for the operation of the automated system 100 of FIG. 1. The combining algorithm includes data inputs and outputs to determine optimal combinations of inventoried or non-inventoried payloads 333 to meet TWR, then translating them into instructions for the robots 500 and 501, which result in the payloads 333 being deposited in a package. The combining algorithm is comprised of the following sub-functions: an inventory 21a, a combination assembly 21b, and a Robot Driver List (RDL) 21c. The sub-functions output data lists are comprised of coordinates, weight values, system elements, labels, status, and instructions. The system and programming code may differ in specific formats and designations to accomplish the same results and objectives. The combining algorithm completes evaluations, calculations, updates, filtering, and determination of the instructions for the robots 500 and 501 prior, during, or after the shuttle 202 and 203 switch positions.

A combining algorithm FIG. 21 then utilizes the inventory 21a as inputs for calculating the combination assembly 21b, which then is translated by the RDL 21c into instructions for the robots 500 and 501 to execute. Execution is illustrated in FIG. 3 which shows the robots 500 and 501 picking up the plurality of cups 400 from the shuttle 203 and placing of the plurality of cups 400 into the shuttle 203. The accumulators 1000 and 1001 receive instructions to open or close from the RDL 21c. Each combination assembly 21b set results in RDL 21c with a corresponding accumulator 1000 or 1001 open/close instruction that allows the automated system 100 to complete accumulation of the combination assembly 21b set and then release the same into the package.

The combining algorithm utilizes multiple filters and selection criteria. One example is the combination "hero"

criteria for biasing a combination assembly 21b set to include a large payload in each combination to achieve TWR. Other examples include the minimization of bag overfill and travel distances of the robots 500 and 501 and/or maximization of yield and/or throughput. The inventory 21a tracks location coordinates and status of the plurality of cups 400 and corresponding payloads 333 weight data, the empty cups 400, and the vacant holes 701 on the work surface 700. Weight data is acquired from the scales 200 and 201. Coordinate data is updated after the combining algorithm shown in FIG. 21 completes the calculation cycle. Further, the output of inventory 21a provides the input data to the combination assembly 21b.

The combination assembly 21b utilizes the output of the inventory 21a as input. The results of combination assembly 21b calculations are an output list of the plurality of cups 400 and respective payloads 333 which are ordered in a manner so that when deposited in the receivers 600 or 601 by the robots 500 and 501 achieve the TWR in each package. The ordering may include one or more the plurality of cups 400 with the payloads 333 designated for deposit into receiver 600 or 601 and the packages. The output also includes payload weight value, which robot will transport the payload, and the total weight of deposit to be made in the accumulators 1000 or 1001 before the filling package. The combination assembly 21b output also includes the data associated with the plurality of cups 400, required for tracking. Further, the output of combination assembly 21b provides the input data to the RDL 21c.

Further, the RDL 21c translates the combination assembly 21b output into instructions for the robots 500 and 501. These instructions provide the robots 500 and 501 a complete list of all activities related to system depositing the plurality of cups 400 with the payloads 333 into the package, maintenance, and testing. The RDL 21c utilizes combination assembly 21b output data as input along with other optimization filters and evaluation criteria. Instructions can include the plurality of cups 400 pick-ups, placement, and delivery location. The RDL 21c also instructs the accumulators 1000 and 1001 when to open and close. Further, the RDL 21c and combination assembly 21b may vary as per the design and package filling criteria. Examples used in the combining algorithm of FIG. 22 descriptions are to illustrate how the continuous combination packaging system may work, but due to illustration constraints, not all permutations, combinations, and configurations of combining algorithm of FIG. 22 and the activities of the robots 500 and 501 could be listed or illustrated here.

FIG. 22 illustrates a process flow diagram for inventorying the plurality of cups 400 in the buffer area 1200, according to an embodiment of the present disclosure. The plurality of cups 400 with the payloads 333 on the shuttles 202 and 203 entering the buffer area 1200 have been weighed. The payloads weight data is input into the inventory 21a, the inventory 21a output is then input into the combination assembly 21b for calculations and combination sets are determined which are then forwarded to RDL 21c. Each time the shuttles 202 and 203 alternate positions, this process repeats.

FIG. 23 illustrates a process flow diagram generating combinations of payloads 333 for delivery into the receivers 600 and 601 of the automated system 100 of FIG. 1, according to an embodiment of the present disclosure. The combination assembly 21b receives input from inventory 21a. It then sorts and calculates combination sets that achieve TWR, then applies filters to the sets which adjust for any number of system conditions, and then sends the combination assembly 21b output to the RDL 21c for translation to machine-readable instructions for the robots 500 and 501. The combination assembly 21b will then wait for the next shuttle switch and weight data set to be analyzed. Then the process repeats.

FIG. 24 illustrates a process flow diagram for modifying and validating the RDL 21c, according to an embodiment of the present disclosure. The RDL 21c receives updated data from the combination assembly 21b. The RDL 21c is then updated. Next, designations for the receivers 600 and 601 and position sequencing for the accumulators 1000 and 1001 are applied. The data is filtered, sorted, and translated into an instruction list for the robots 500 and 501. The RDL 21c is tested to ensure feasibility, then it is validated and finally, it is transmitted to a robot controller 2730 for execution. The shuttles 202 and 203 switches and the scales 200 or 201, accordingly, determine the weight of next the plurality of cups 400 sets, then cycle repeats. The RDL 21c is an equivalent to a list of instructions that a system would use to make a step by step moves, or complete actions that result in the achievement of a series of tasks.

FIG. 25 illustrates an environment diagram for enablement of an operator to operate, control and/or monitor the automated system 100 of FIG. 1, using a Human Machine Interface (HMI) 2702. FIG. 25 further illustrates the computer 2701, the scale parallel and series processors 1552 or 1501, and the RDL 21c. The HMI 2702 provides data, metrics, and status information, plus provides the ability to control system functions. The HMI 2702 allows operators to monitor system performance, be alerted to required actions and tasks, make inputs, modify settings, and evaluate key indicators to make critical performance decisions, monitor safety systems, review performance metrics, control system power and running functions. Computer 2701 communicates with a plurality of devices and an internal and external system of the automated system 100 shown in the FIG. 1. Scale parallel and series processors 1552 and 1501 both have output functions that provide weight data to the computer 2701 acting as an optimization processor, and can receive control inputs. The robots 500 and 501 utilize one or more controllers 2730 which interface with the RDL 21c. The RDL 21c may be integral to computer 2701 or an independent piece of hardware. Human Machine Interface (HMI) 2702 hardware may have a touch screen, keyboard, voice command, or other type of communication method.

FIGS. 26A and 26B illustrate top perspective views two independent segments of the buffer area 1200, where the two robots 500 and 501 work independently and without overlap, within confines of their respective segments, according to an embodiment of the present disclosure. Each closed system as depicted with a bold black outline is comprised of one robot 500 or 501, one-half of the buffer area including the plurality of cups 400 and the plurality of holes 701, plus one receiver 600 or 601. The optimization program of Table 1 utilizes the combining algorithm of FIG. 21 to execute RDL 21c by the robots 500 and 501 operating as two separate closed systems. The robots 500 and 501 picks, place and deliver the plurality of cups 400 within their respective halves of the shuttles 202 and 203, the work surface 700 and the receivers 600 or 601. The terminology closed signifies that the robots 500 and 501 do not share the plurality of cups 400 or pick, place or deliver the plurality of cups 400 located in the respective area of another robot 500 or 501 of the automated system 100. Each closed system creates its outputs. The two closed systems operate separately within the physical structure of the automated system 100 as shown in FIG. 1.

FIG. 26A illustrates an example of the robot 500 in work areas of the automated system 100 for picking, placing, and delivering the plurality of cups 400. The example includes the shuttle 202 in the buffer area 1200 carrying in the plurality of cups 400 with the payloads 333 and a half designated for the robot 500, the half of the shuttle 203 in a bold outline will be utilized when shuttles alternate positions. FIG. 26B illustrates an example of the robot 501 in the work area of the automated system 100 for picking, placing, and delivering the plurality of cups 400. The example includes the shuttle 203 in the buffer area 1200 carrying in the plurality of cups 400 with the payloads 333 and a half designated for the robot 501, the half of shuttle 202 in the bold outline will be utilized when shuttles alternate positions. Design features may include an option for the robots 500 and 501 for picking, placing, and delivering in the opposing robot locations in very application-specific instances.

FIG. 27 illustrates a top perspective view of an integrated buffer area 1200, according to an embodiment of the present disclosure. FIG. 27 illustrates one closed system as depicted with a bold black outline with the two robots 500 and 501 operating within the automated system 100 described in FIG. 1. The automated system 100 utilizes the optimization program of Table 1 with the combining algorithm of FIG. 21 to execute the RDL 21c by the robots 500 and 501 operating as an integrated system. The robots 500 and 501 will overlap the buffer area 1200 to pick, place, and deliver the plurality of cups 400 irrespective of where the plurality of cups 400 coordinates reside. The shuttles 202 and 203 alternate supplying the plurality of cups 400 with the payloads 333 into the buffer area 1200, which are accessible by both the robots 500 and 501. Irrespective of which of the robots 500 or 501, the plurality of cups 400 with the payloads 333 are picked from any location on the shuttles 202 or 203, then placed in any available hole 701 on the work surface 700 or delivered in either of the receivers 600 or 601. The combining algorithm of FIG. 22 utilizes the entire automated system 100 of FIG. 1 to achieve TWR when filling the packages. The automated system 100 utilizes the robots 500 and 501 capability to "overlap" within the work surface 700 and the shuttles 202 or 203, share and contribute together to contribute to the combination assembly 21b set options resulting in the RDL 21c that instructs the activities of the robots 500 and 501.

FIGS. 28A and 28B illustrate two exemplary states of the integrated buffer area 1200 of FIG. 27. The buffer area 1200 is comprised of the plurality of cups 400 on the work surface 700 and the shuttles 202 or 203 when positioned in the bolded area. The shuttles 202 and 203 are not considered part of the buffer area 1200 when positioned outside of the bold outlined area. FIG. 28A illustrates the work surface 700 and the shuttle 202 included and the shuttle 203 not included in the buffer area 1200, FIG. 28B illustrates the work surface 700 and the shuttle 203 included and the shuttle 202 not included in the buffer area 1200. The buffer area 1200 contains a number of the plurality of cups 400 both empty and with the payloads 333. Initially, all cups are empty, but as the automated system 100 operates, incoming the plurality of cups 400 with the payloads 333 on the shuttle 202 or 203 that does not meet TWR individually are exchanged with empty cups 400 on the work surface 700 which causes an accumulation of the plurality of cups 400 with the payloads 333. The number of the plurality of cups 400 with the payloads on the work surface 700 will also decline when the plurality of cups 400 with the payloads 333 is used to complete a combination assembly 21b set with an incoming the plurality of cups 400 with the payloads 333 on the shuttle 202 or 203 to achieve TWR.

Further, the buffer area 1200 is designed with a statistically significant number of the plurality of cups 400. This enables the capability to achieve combination assembly 21b sets more frequently after the operation reaches a steady state, thus enabling the filling operation of the packages. The statistically significant quantity of the plurality of cups 400 with the payloads 333 also enables the system to fill packages with greater fill weight accuracy and a reduced standard deviation.

Further, the buffer area 1200 with the plurality of cups 400 with the payloads 333 that are inventoried and accessible and then used in calculations for the combination assembly 21b, determines the combination assembly 21b sets and the physical payloads 333 combinations delivered to packages. The buffer area 1200 quantity of the plurality of cups 400 with the payloads 333 is designed to improve the probability of making the combination assembly 21b sets which achieve TWR, minimizing package overfill and minimize recycle of the payloads 333. The buffer area 1200 may also provide a large enough range of varying weight options for the combination assembly 21b to achieve a package fill weight average or mean biased toward the lower control limit of TWR.

Furthermore, the buffer area 1200 decouples the scale sensor 1301 set size and the buffer area 1200 inventory set size. The scales 200 and 201 nominal sets of scale sensors 1301 can populate an unlimited quantity of buffer area 1200 inventory spaces, creating a ratio greater than 1:1. This is enabled by unimpeded robot retrieval capability and data processing for tracking. This system can potentially have a buffer area set or quantity of inventoried cups 400 with the payloads 333 multiple times greater than the number of scale sensors 1301 for weighing the inputs to buffer area inventory.

FIG. 29 illustrates a process flow diagram for transfer of payload arriving into the buffer area 1200, for inventorying onto the work surface 700 or delivering into the receiver 600 or 601, according to an embodiment of the present disclosure. FIG. 29 illustrates the incoming shuttle cups process flow diagram with robot instruction logic. The incoming shuttle 202 or 203 with the plurality of cups 400 will either be transported directly to the receiver 600 or 601 for delivering or placed in a hole 701 on the work surface 700. If taken to the receiver 600 or 601, the empty cup may be returned to the shuttle 202 or 203. If placed in the hole 701, of the work surface 700, then another cup 400 with payload 333 on the work surface 700 is picked and utilized for a combination assembly set, delivered in the receiver 600 or 601, and then returned empty to the shuttle 202 or 203. The combination assembly 21b has all this predetermined information of the incoming shuttles arriving in the buffer area 1200 with a refilled set of the plurality of cups 400. The cycle is then repeated for another cup 400 containing payload 333 on the shuttles 202 or 203.

FIG. 30 illustrates a perspective view of the automated system 100, depicting direct delivery 3200 of the payload 333 of FIG. 29, into the receiver 600 and then the cup 400 is returned 3250 empty to the hole of origin on the shuttle 202. Direct delivery 3200 of the entire contents of the cup 400 with the payloads 333 may individually or be combined with another the plurality of cups 400 with the payloads 333 by combination assembly 21b to meet TWR requirement.

FIG. 31 illustrates a perspective view of the automated system 100, depicting inventorying 3300 of the payload 333 of FIG. 29, onto the work surface 700. The combination assembly 21b determined the plurality of cups 400 with the payloads 333 that did not meet TWR requirements independently or in any other combination with a cup 400 with payload 333 on the work surface 700. Following the inventorying 3300 and placing of the plurality of cups 400 onto the work surface 700, the RDL 21c directs the robots 500 or 501 to move 3310 over to another location on the work surface 700 and pick a cup 400 with another payload 333, which is then delivered 3320 into the receiver 600, the empty cup 400 is then returned 3250 to the shuttle 202 for refilling. Further, the combination assembly 21b may also determine that a combination requires a cup 400 with a payload 333 located on the work surface 700 and upon being delivered 3320 it is then returned empty back to the hole 701 on the work surface 700 where it resided in before being picked up and delivered.

FIG. 32A illustrates a process for direct delivery of a payload 333 that individually meets the TWR, into the receiver 600 or 601, according to an embodiment of the present disclosure. FIG. 32A shows the steps of the shuttle 202 or 203 having the plurality of cups 400 with payload 333 which individually meets TWR. The steps include: "Start" with RDL 21c instruction for the robots 500 or 501 to pick up the cup 400 at the shuttle 202 or 203 location PX (i.e. coordinates; P=row number and X represents letter column ID), after that the cup 400 is transported to the receiver 600 or 601. In the next step, the robot 500 or 501 delivers the payload 333 into the receiver 600 or 601, and, in the final step, the robot 500 or 501 returns the empty cup 400 to the original location PX on the shuttle 202 or 203.

FIG. 32B illustrates a process for delivery of a payload 333 that does not individually or in combination with another payload 333, meets the TWR, into the receiver 600 or 601, according to an embodiment of the present disclosure. The process "Start" with the RDL 21c instruction for the robot 500 or 501 to pick the cup 400 from the shuttle 202 or 203 PX coordinate or location. The next step is to transport the cup 400 to the work surface 700 and place in the hole 701, the next step is to pick another cup 400 with another payload 333 from another work surface location. Further, the next step is to transport the other cup 400 to the receiver 600 or 601, after this the next step is to deliver the payload 333 in the receiver 600 or 601 and the final step is to return the empty cup 400 to the shuttle PX location.

FIG. 33 illustrates an environment diagram for the implementation of the RDL 21c, according to an embodiment of the present disclosure. The algorithm calculations and translations occur in the computer 2701 and are input to the robot controller 2730. The RDL 21c is comprised of an "RDL library" which contains all coordinate system activity command translations. Libraries are created for each unique robotic system implemented for the automated system 100 as shown in FIG. 1. A unique robotic system can be for example; defined as different models of robots or manufacturers, but not limited to these examples. The RDL 21c translates combination assembly 21b requirements into a list of instructions for the robots 500 and 501 and/or commands that are executed. The RDL 21c may also dictate the activity of many ancillary system devices, including but not limited to the accumulator 1000 or 1001 for payloads accumulation before depositing in the package. RDL 21c may instruct the accumulator 1000 or 1001 to open or close.

FIGS. 34A, 34B, and 34C illustrate a pictorial representation of weighing of the payload 333 with a taring step involving weighing of an empty cup 400, according to an embodiment of the present disclosure. FIG. 34A illustrates weighing (taring) cup 400 on the scale platform 209 containing no payload 333. Further, FIG. 34B shows the addition of payload 333 to the plurality of cups 400. Further in the FIG. 34C illustrates the cumulative weighing of the plurality of cups 400 and the payloads 333. The scale sensor 1301, processor 1501 or 1552 with or without the computer 2701 then calculates the net weight of payload 333 by subtracting the plurality of cups 400 weight obtained in FIG. 34A from the cumulative weight obtained in FIG. 34C.

FIGS. 35A and 35B illustrate a pictorial representation of weighing of the payload 333 without a taring step, involving the weighing of a filled cup of known weight, according to an embodiment of the present disclosure. A "constant" weight cup or a previously weighed cup 400 weight is subtracted from the gross combined weight of cup 400 and payload 333. FIG. 35A illustrates a cup 400 of a known weight containing payload 333 being weighed. FIG. 35B illustrates the calculation step which requires no physical change to the system. Payload 333 net weight is calculated by subtracting the weight of the cup 400 from the cumulative weight of the cup 400 and the payload 333.

FIG. 36 illustrates a delivery assist nozzle 3801 provided within the gripping arrangement of FIG. 16B. Gas 3850 is routed through an internal gas channel 3820 provided within the finger 305 and exits at the delivery assist nozzle 3801. The internal gas channel 3820 delivers gas 3850 to the delivery assist nozzle 3801, the gas 3850 enters cup 400 to clear out payloads 333 and improve the delivery performance. The internal gas channel 3820 is a design feature in the finger 305. The feature may be comprised of a gas 3850 exiting the finger 305 in one or a plurality of locations anywhere on the structure. The gas 3850 type may be air, oxygen, nitrogen, steam, CO2 (Carbon-di-Oxide). The internal gas channel 3820 can provide a continuous flow or burst of gas 3850 out of the delivery assist nozzle 3801 and into interiors of the plurality of cups 400. The delivery assist nozzle 3801 which supplies the gas 3850 may be designed with varying sizes and shapes to disperse existing gas 3850 with differing shape, volume, and velocity. The gas 3850 provides pressure and impact force to the payloads 333 in such a manner as to assist payloads 333 exiting or ejecting from the plurality of cups 400 during the payload delivery. The gas 3850 is intended to flow into the plurality of cups 400 along the interior wall and the bottom to cause a dislodging of the payloads 333. The gas 3850 may also be redirected or rebound off the interior sidewalls of the plurality of cups 400 and/or to the bottom to force payloads 333 out of the plurality of cups 400.

FIG. 37 illustrates a front perspective view of a gas-assisted receiver 600, according to an embodiment of the present disclosure. The gas assistance 4010 in flushing the receivers 600 or 601 when accumulator 1000 or 1001 opens to purge payloads 333. A manifold 4060 design feature supplies and distributes gas assistance 4010 through a series of orifices, nozzles or holes within the interior of circumferences of the receivers 600 and 601. The gas assistance 4010 pressure and velocity provides the force to purge the receiver 600 or 601 cavities after the accumulator 1000 or 1001 opens.

FIGS. 38A and 38B illustrate two exemplary designs of the receiver 600 or 601, according to several embodiments of the present disclosure. FIG. 38A shows an individual receiver 600 with an accumulator 1000 that allows payloads 333 to be held and then released into a package 4110. Further, FIG. 38B shows multiple receivers 600 designed as one unit called a multi-receiver 4140. The multiple receivers 600 with an inline accumulator 1000 is connected to one body which transfers payloads 333 into an exit tube.

FIG. 39 illustrates a front perspective view of an automated system 100 for sorting and combining varying density payloads, employing one or more of a conveyor 4160 and a turntable 4680, according to yet another embodiment of the present disclosure. FIG. 39 illustrates sequentially placed and conveyed plurality of cups 400 with the payloads 333 combining system according to various embodiments of the present disclosure. The plurality of cups 400 on the shuttle 202 or 203 can be filled with the payloads 333 at the scales 200 or 201 positions. After filling and weighing, the plurality of cups 400 with the payloads 333 is transported by the shuttles 202 or 203 into the system and accessible by the robots 500 or 501.

The combining algorithm is shown in FIG. 21 determines whether incoming cups 400 with the payloads 333 are moved via the robot 500 or 501 incoming transfer 4630 to conveyor 4610 or turntable 4680 where they may be accumulated. The plurality of cups 400 with the payloads 333 on conveyor 4610 are sequenced as per the combining algorithm for picking and delivering 4650 by the robot 503. The Combining algorithm of the FIG. 21 predetermines the number of the plurality of cups 400 with the payloads 333 that are required and their sequencing. The combination assembly 21b determines the package 4110 contents which may be comprised of one or more payloads 333. Utilization of the plurality of cups 400 on the turntable 4680 occurs when combination assembly 21b determines a combination set requires an additional cup 400 with the payloads 333 weight to be combined with an incoming cup 400 with other payloads 333 to meet TWR. The RDL 21c instructs robots 500, 501, and 503 where to pick, place, and deliver the plurality of cups 400.

The turntable 4680 and incoming full shuttles 202 or 203 performs similar functionality as the buffer area 1200. The plurality of cups 400 with the payloads 333 on the conveyor 4610 is sequenced as determined by the combination assembly 21b. The combination assembly 21b outputs are used in RDL 21c for determining instructions for the robot 503 picking and delivering 4650 of the plurality of cups 400 payloads 333 into receiver 600 which then fill packages 4110. The robot 503 executes picking and delivering of the plurality of cups 400, then transfers empty cups 400 onto the conveyor 4620. The conveyor 4620 stages empty cups 400 for the refill to outgoing shuttles 202 or 203 for the refilling of the plurality of cups 400. After the shuttles 202 or 203 are full of empty cups, it transfers them to the positions of the scales 200 or 201, and the cycle repeats.

FIG. 40 illustrates a manual filling of cups 400, according to several embodiments of the present disclosure. FIG. 40 illustrates the manual filling of the plurality of cups 400 with the payloads 333 on the shuttles 202 or 203 according to various embodiments of the present disclosure. FIG. 40 shows a person located at the scales 200 and 201, loading the plurality of cups 400 on the shuttles 202 or 203 with the payloads 333.

FIGS. 41A and 41B illustrate two embodiments of a rail system for translation of the shuttles 202 or 203 and mechanical engagement with the scales 200 or 201 of the shuttle and scale system 250 for the automated system 100, according to several embodiments of the present disclosure. The scales 200 and 201, plus some or all their components may remain stationary, the scale platforms 209 moves vertically due to the downward force of the plurality of cups 400 which activates scale sensors 1301. FIG. 41A is one example of a continuous track 4810 which transmits the shuttle 202 or 203 the plurality of cups 400 from buffer area 1200 and onto the scales 200 or 201. The track 4810 is designed to move shuttles 202 or 203 having the plurality of cups 400 into position directly mechanically engaging with their respective scale platforms 209 on the scales 200 or 201, causing the plurality of cups 400 to raise up and clear of contact with shuttle 202 or 203. FIG. 41B illustrates another option for the transmitting of the plurality of cups 400 on the shuttles 202 and 203 from the buffer area 1200 and onto the scales 200 or 201. In this option, there are one or a plurality of tracks 4820 enabling shuttles 202 or 203 to be horizontally positioned over the scales 200 or 201 and then be vertically lowered by a plurality of vertical tracks 4830, causing the plurality of cups 400 to mechanically engage with scales 200 or 201 on the scale platforms 209 on the scales 200 or 201. All options complete cycles by returning refilled the plurality of cups 400 with the payloads 333 back to buffer area 1200.

FIG. 42 illustrates the scales 200 and 201, each using a foundation 1050, according to several embodiments of the present disclosure. The foundation 1050 isolates the respective scale bases 1302 and the scale sensors 1301 of the scales 200 and 201 from electrical and mechanical noise which can interfere with the accuracy of the weighing process. Isolation of the plurality of cups 400 from the automated system 100 of the FIG. 1, occurs when the plurality of cups 400 engage with the scales 200 or 201 on the scale platforms 209 and raises up and out of shuttles 202 or 203, thus creating separation 1220. The separation 1220 prevents system transmission of vibrational and impact forces from negatively impacting scale sensors 1301 effectiveness to weigh the plurality of cups 400 with and without payloads 333. The foundation 1050 may also be comprised of insulators installed between scales 200 and 201 and/or a mounting surface (i.e. floor, wall, or ceiling). The foundation 1050 may also be comprised of dense and heavy material, like stone, or springs and/or shock absorbers to reduce vibration transmitted to scales 200 and 201. The foundation 1050 may also include an electromagnetic insulation componentry.

In one embodiment, a combination and packaging system weighs, sorts, and combines payloads that have a work station having a plurality of holes for storing cups with the payloads and a shuttle and scale system for weighing and delivering the payloads to the work station. The system also has at least one robot for picking and delivering the payloads into a receiver with an accumulator wherein the robot is delivering one or more payloads to meet a target weight range predefined in the system. The system may also have scales with an automated weighing mechanism and a traversing shuttle that moves cups in and out of the buffer area. The system may provide continuous and/or near-continuous operations enabled by uninterrupted payload supply, cup transferring, and statistically significant inventory buffer size to ensure a combination assembly possibility. The system may provide greater buffer cup inventory storage than scale sensor quantity, enabled by decoupling of scale sensors and buffer inventory which provides an unlimited accumulation of weighed payloads inventory and data storage enabled by robot unimpeded retrieval capability.

The system may provide a continuous output through one cup in and one cup out principle, enabled by a robot that may return an empty cup to shuttle before picking up another full cup from the shuttle and high accuracy due to continuous and/or near-continuous piece replenishment and statistically significant buffer inventory size further due to a dynamic algorithm the system gets updated near continuously or continuously when each new payload is introduced to the system. The system ensures that a production/throughput begins immediately upon arrival of a first cup payload into the system. The system may reduce the recycling of the payloads due to the continuous introduction of payloads with random and unique weight and may eliminate multiple handling operations by taking payloads directly from shuttles to receiver tubes. The system may have an automatic clearing of cup payloads, enabled by continuous utilization or recycling of all cups in the system.

In one embodiment, the system may include an automated scales engaged with cups that are enabled by the cup and shuttle design and configuration in a way that when force is applied to the bottom of the cup it raises out of shuttle thereby separating cup from the shuttle and thus allowing unhindered weighing. The automated scale engaged with cups, enabled by near-simultaneous or simultaneous elevation of scale sensors. The shuttle and scale system may provide a continuous infeed system enabled by simultaneous switching of an inbound cups with the payloads and outbound shuttle with empty cups.

The automated scale of the system may engage with cups, enabled by an independent scale sensor raising mechanism that elevates scale sensors up to the cup independent of other scale sensors within a scale system or scale raising all scale sensors simultaneously to the plurality of cups. The automated scale of the system may also engage with cups, enabled by mechanically lowering of shuttle cups onto scale sensors, thus forcing cups out of shuttle for unhindered weighing.

The system may include an algorithm updates/recalculates optimal combination before and/or after new payloads are introduced, enabled by the robot driver list (RDL) creating a plurality of auxiliary executions. The system may include an independent translation combination algorithm that outputs robot executable instructions and standardizes the method of translating optimization program output to robot instructions, enabled by RDL having a converter that utilizes command library-specific robot model. In the system, a combination of payloads can be achieved by utilizing any cups inventoried on a shuttle or work surface, enabled by the design of a non-sequentially queued system or mechanical system. The shuttles continuously provide payloads, enabled by shuttle sequencing and timing which never allows a gap of incoming payloads required by robot transport to maintain consistent output. The system also may have an RDL containing execution instructions for robots and provides a plurality of auxiliary executions while optimization is paused.

The system may have a robot end of arm tooling (EOAT) that provides a stable, repeatable and limited motion method for securing, transporting and turning over a cup, enabled by a 3-point contact design where two long parallel bars apply distributed pressure on the exterior wall while interior pressure point is applied vertically and horizontally relative to parallel bars.

The system may provide a one-touch feed of pieces from entering the system to the exit system. The system also may have a scale platform which is designed for maintaining low noise, enabled by cup separation from the shuttle.

The disclosure also contemplates a method for weighing, sorting, and combining various payloads, in which the method may weigh individual payload by a weighing or scale mechanism and transport the payloads to a work area by a shuttle system. One or more robots may then pick one or more cups with the payloads and deliver one or more payload to a receiver which may include an accumulator and may include a check scale to verify payload weight, wherein the one or more robots are instructed to pick one or more payload to achieve a target weight range predefined in the system. The one or more payloads may be then transferred for packing.

Various modifications to these embodiments are apparent to those skilled in the art, from the description and the accompanying drawings. The principles associated with the various embodiments described herein may be applied to other embodiments. Therefore, the description is not intended to be limited to the embodiments shown along with the accompanying drawings but is to be providing broadest scope of consistent with the principles and the novel and inventive features disclosed or suggested herein. Accordingly, the disclosure is anticipated to hold on to all other such alternatives, modifications, and variations that fall within the scope of the present disclosure and appended claims.

The invention claimed is:

1. An automated continuous or near-continuous system for sorting and combining varying density payloads, the system comprising:
    a buffer area including a work surface having a plurality of holes for storing a plurality of cups with weighed payloads;
    a shuttle and scale system configured for weighing and near continuously or continuously delivering the plurality of cups with the payloads, to the buffer area;
    at least one robot provided within the buffer area, wherein the at least one robot is configured for picking a cup carrying a payload, from either one of the shuttle and scale system and the work surface, and transporting the payload from the cup into an accumulator; and
    a controller connected with a computer memory maintaining a combining algorithm, wherein the controller is configured for controlling operations of the shuttle and scale system and the at least one robot, in correlation with data stored in the combining algorithm;
    wherein the at least one robot is configured for delivering one or more of the payloads into the accumulator to achieve a predetermined Target Weight Range (TWR).

2. The automated system according to claim 1, wherein a ratio of a number of locations for inventorying the plurality of cups in the buffer area to a number of weighing locations in one or more scales of the shuttle and scale system, is greater than 1:1.

3. The automated system according to claim 1, wherein the plurality of holes of the work surface, have diameters smaller than largest diameters of the plurality of cups to enable the plurality of cups to be suspended through the plurality of holes.

4. The automated system according to claim 1, wherein the shuttle and scale system includes a plurality of scales and a plurality of shuttles, each one of the plurality of scales provided with an automated weighing mechanism configured for weighing of the payload, and the plurality of shuttles being configured for transporting the plurality of cups in and out of the buffer area.

5. The automated system according to claim 4, wherein the automated weighing mechanism includes a scale platform and a scale sensor mounted on a scale base, the scale platform being configured for elevating the cup from a corresponding shuttle, thereby separating the cup from the shuttle and thus allowing unhindered weighing of the payload by the scale sensor.

6. The automated system according to claim 5, wherein the scale platform is connected with the scale sensor through a fixed height stem, the scale sensor being mounted over a scale base common to a plurality of scale platforms.

7. The automated system as claimed in claim 5, wherein the scale platform is connected with the scale sensor through an extendible stem adapted to extend independent of the scale sensor, to elevate the scale platform independent of other scale platforms.

8. The automated system as claimed in claim 5, wherein the scale platform is connected with the scale sensor through a fixed height stem, the scale sensor being mounted over a dedicated elevating device capable of elevating the scale platform independent of other scale platforms.

9. The automated system as claimed in claim 5, wherein a plurality of scale sensors of a scale are connected in one or more of a series configuration, a parallel configuration, and a series-parallel configuration.

10. The automated system according to claim 5, wherein the scale base has been located on a foundation configured to isolate the scale base and the scale sensor from electrical and mechanical noise generated by a plurality of sources.

11. The automated system according to claim 4, wherein the shuttle and scale system includes one or more continuous tracks designed to move the plurality of shuttles to directly mechanically engage with the respective plurality of scales.

12. The automated system according to claim 4, wherein the shuttle and scale system includes one or more tracks designed to move the plurality of shuttles, horizontally, to be positioned over the plurality of respective scales and then be vertically lowered by a plurality of vertical tracks to mechanically engage with the respective plurality of scales.

13. The automated system according to claim 1, wherein the at least one robot is further configured for returning an empty cup to one or more of the work surface and the shuttle and scale system, after transporting the payload into the accumulator, before picking another cup, carrying another payload, from either one of the shuttle and scale system and the work surface.

14. The automated system according to claim 1, wherein the buffer area includes a plurality of robots with designated independent segments of the buffer area, wherein the plurality of robots is configured to operate within their respective designated segments, without overlap.

15. The automated system according to claim 1, wherein the buffer area includes a plurality of robots configured to operate within an integrated space of the buffer area, with overlap.

16. The automated system according to claim 1, wherein the at least one robot includes a gripper with an internal gas channel configured to deliver gas into the plurality of cups, through a delivery assist nozzle, to assist ejection of the plurality of respective payloads from the plurality of cups.

17. The automated system according to claim 1, wherein the accumulator is configured to receive the one or more of the payloads through a receiver, the receiver being gas-assisted for flushing of the receiver and emptying of the accumulator once the predetermined TWR has been achieved.

18. The automated system according to claim 1, wherein the accumulator includes a check scale configured to measure the weight of the payload delivered into the accumulator.

19. The automated system according to claim 1, wherein the controller is further configured for updating the data in the combining algorithm with an introduction of a new payload.

20. The automated system according to claim 1, wherein the combining algorithm includes an inventory, a combination assembly and a Robot Driver List (RDL), the RDL including an RDL library corresponding to all coordinate system activity command translations, the RDL library being capable of translating requirement of the combination assembly into a list of instructions for execution by a plurality of robots of distinct design characteristics.

21. The automated system according to claim 20, wherein the controller is further configured for executing instructions in correlation with a Robot Driver List (RDL), stored in the combining algorithm, creating a plurality of auxiliary executions.

22. The automated system according to claim 20, wherein the RDL includes machine-readable instructions for the controller and a plurality of auxiliary executions while optimization is paused.

23. The automated system according to claim 1, wherein the controller is further configured to generate combinations of the one or more payloads, to be delivered into the accumulator, by designs stored in the combining algorithm of non-sequentially queued systems or non-mechanically limited systems.

24. The automated system according to claim 1, wherein controller is further configured for operating the at least one robot and the scale and shuttle system, in correlation with shuttle sequencing and timing data stored in the combining algorithm.

25. The automated system according to claim 1, wherein an End of Arm Tooling (EOAT) of the at least one robot, includes a 3-point contact design including two parallel bars configured to apply distributed pressure on an exterior wall of a cup, and a pin configured to apply distributed pressure on an interior wall relative to exterior parallel bars.

26. The automated system according to claim 1, wherein the buffer area comprises one or more of a conveyor and a turntable carrying the plurality of cups.

27. A method for sorting and combining varying density payloads, the method comprising steps of:
weighing each one of a plurality of payloads, provided in a plurality of respective cups, by a plurality of automated weighing mechanisms of a plurality of scales;
transporting the plurality of weighed payloads to a buffer area by a plurality of shuttles, the buffer area including a work surface having a plurality of holes for storing the plurality of cups with payloads;
picking one or more cups having one or more respective payloads, from either one of the plurality of shuttles and the work surface, by at least one robot, wherein the one or more payloads are selected in correlation with a predetermined Target Weight Range (TWR) provided in a combining algorithm;
delivering the one or more payloads into an accumulator, by the at least one robot; and
transporting the accumulated one or more payloads for packing.

28. The method according to claim 27, wherein the step of weighing each one of the plurality of payloads includes a taring step involving weighing of the plurality of respective cups when empty.

29. The method according to claim 27, wherein the step of weighing the each one of the plurality of payloads includes weighing of the plurality of cups of known weight, the net weight of each one of the plurality of payloads being determined by subtracting the known weight of a cup from cumulative weight of the cup and a respective payload.

* * * * *